US006807851B2

(12) United States Patent
Wakahara et al.

(10) Patent No.: US 6,807,851 B2
(45) Date of Patent: Oct. 26, 2004

(54) LEAK-CHECK APPARATUS OF FUEL-VAPOR-PROCESSING SYSTEM, FUEL-TEMPERATURE ESTIMATION APPARATUS AND FUEL-TEMPERATURE-SENSOR DIAGNOSIS APPARATUS

(75) Inventors: Keiji Wakahara, Inazawa (JP); Syujiro Morinaga, Takahama (JP); Yoshinori Maegawa, Obu (JP); Makoto Miwa, Kariya (JP)

(73) Assignee: Denso Corporation, Kariya (JP)

( * ) Notice: Subject to any disclaimer, the term of this patent is extended or adjusted under 35 U.S.C. 154(b) by 161 days.

(21) Appl. No.: 10/201,911

(22) Filed: Jul. 25, 2002

(65) Prior Publication Data

US 2003/0019286 A1 Jan. 30, 2003

(30) Foreign Application Priority Data

| | | |
|---|---|---|
| Jul. 25, 2001 | (JP) | 2001-223764 |
| Jul. 27, 2001 | (JP) | 2001-226914 |
| Aug. 9, 2001 | (JP) | 2001-241509 |
| Aug. 20, 2001 | (JP) | 2001-249345 |
| Sep. 4, 2001 | (JP) | 2001-266638 |

(51) Int. Cl.[7] .......................... G01M 19/00; G01M 3/04
(52) U.S. Cl. ............................ 73/118.1; 73/40; 73/49.7
(58) Field of Search ................................ 73/40, 46, 47, 73/49.7, 116, 117.2, 117.3, 118.1

(56) References Cited

U.S. PATENT DOCUMENTS

| | | | |
|---|---|---|---|
| 5,263,462 | A | 11/1993 | Reddy |
| 5,317,909 | A | 6/1994 | Yamada et al. |
| 6,082,337 | A | 7/2000 | Fujimoto et al. |

FOREIGN PATENT DOCUMENTS

| | | |
|---|---|---|
| JP | 6-81727 | 3/1994 |

*Primary Examiner*—Edward Lefkowitz
*Assistant Examiner*—Jermaine Jenkins
(74) *Attorney, Agent, or Firm*—Nixon & Vanderhye P.C.

(57) ABSTRACT

A fuel-vapor-processing system for an engine has a canister for accumulating fuel evaporation gas. The system has a leak-check apparatus for checking a leak on passages. The leak-check apparatus includes a leak-check means for carrying out leak-check processing when the engine if in a stopped state. The leak-check means operates only if a predetermined condition is satisfied. It is thus possible to reduce the number of times the leak-check processing is carried out and, hence, possible to reduce power consumption. For example, only if a relatively small leak is detected when the engine is in a running state, the leak-check processing is carried out in a stopped state to verify existence of such a leak. In the leak-check processing, the temperature of fuel, detected by a sensor or an estimated value, may be taken into consideration.

9 Claims, 37 Drawing Sheets

LEAK-CHECK APPARATUS OF FUEL-VAPOR-PROCESSING SYSTEM, FUEL-TEMPERATURE ESTIMATION APPARATUS AND FUEL-TEMPERATURE-SENSOR DIAGNOSIS APPARATUS

CROSS REFERENCE TO RELATED APPLICATION

This application is based on Japanese Patent Applications No. 2001-223764 filed on Jul. 25, 2001, No. 2001-226914 filed on Jul. 27, 2001, No. 2001-241509 filed on Aug. 9, 2001, No. 2001-249345 filed on Aug. 20, 2001, and No. 2001-266638 filed on Sep. 4, 2001 the contents of which are incorporated herein by reference.

BACKGROUND OF THE INVENTION

1. Field of the Invention

The present invention relates to a leak-check apparatus of a fuel-vapor-processing system, a fuel-temperature estimation apparatus and a fuel-temperature-sensor diagnosis apparatus.

2. Description of Related Art

U.S. Pat. No. 6,082,337 (JP-A-11-101162) discloses an apparatus, which is used for checking a leak on a passage of a fuel-vapor-processing system during a running state of the engine. In a running state of the engine, however, the level of fuel in a fuel tank varies. It is thus difficult to check a leak with a high degree of precision during a running state of the engine.

On the other hand, JP-A-6-81727 (Japan Patent No. 2,745,991) discloses leak-check processing, which is carried out after the engine is stopped. However, leak-check processing, which is carried out after the engine is stopped, exhausts the battery.

U.S. Pat. No. 5,263,462 discloses an apparatus, which is used for detecting a pressure in the passage when the temperature of the fuel tank increases by a predetermined quantity, and used for checking a leak of the same system on the basis of this pressure. When the ambient temperature is low, however, the temperature of fuel in the fuel tank may not increase. Thus, the number of times the leak-check processing is carried out decreases.

In the leak-check processing, a leak is checked by hermetically sealing the passage of the system. Thus, when the passage of the system is opened after the leak-check processing, a flow is generated in the system due to a difference in pressure between the system and the atmosphere. If a flow is generated in a canister, for example, fuel vapor transits to an undesirable state in some cases.

In leak-check processing, detection of a small leak is also demanded. In the case of a small leak, however, it takes a long time to generate a detectable change in pressure. Thus, in order to detect a small leak, a long check time is required. During such a long check time, however, it is quite within the bounds of possibility that the operating condition of the engine changes. It is thus difficult to detect a small leak.

JP-A-6-81727 discloses a leak-check apparatus provided with a sensor for detecting a temperature of fuel in the fuel tank. This apparatus finds a difference in fuel temperature between a stopped state of the engine and a start of the engine. If the difference in fuel temperature is found greater than a predetermined value, a leak is checked on the basis of an internal pressure of the fuel tank. However, the fuel-temperature sensor increases the number of components and brings about an increase in assembly man-hour.

SUMMARY OF THE INVENTION

It is thus an object of the present invention to provide an improved fuel-vapor-processing system capable of solving the problems raised by the conventional technology.

It is another object of the present invention to provide a leak-check apparatus capable of detecting a leak in a fuel-vapor-processing system with a high degree of precision and reducing the amount of consumed power generated by the battery in a stopped state of the engine.

It is a further object of the present invention to provide the fuel-vapor-processing system with a leak-check apparatus capable of carrying out leak-check processing at a proper frequency.

It is a still further object of the present invention to provide the fuel-vapor-processing system with a leak-check apparatus capable of making it difficult for air to flow into the system after leak-check processing.

It is a still further object of the present invention to provide the fuel-vapor-processing system with a leak-check apparatus capable of executing a leak-check procedure over a long period of time.

It is a still further object of the present invention to provide a fuel-temperature estimation apparatus for estimating a temperature of fuel in the fuel tank.

It is a still further object of the present invention to provide the fuel-vapor-processing system with a leak-check apparatus for estimating a temperature of fuel in the fuel tank and checking a leak in the fuel-vapor-processing system on the basis of the estimated temperature of the fuel.

It is a still further object of the present invention to provide a diagnosis apparatus for diagnosing a fuel-temperature sensor for detecting a temperature of fuel in the fuel tank.

According to a first aspect of the present invention, only if a preliminary leak is determined to exist in the fuel-vapor-processing system by an engine-running-state leak-check function of an engine-running-state leak-check means, is an engine-stopped-state leak-check function of an engine-stopped-state leak-check means executed so that a leak in a fuel-vapor-processing system can be detected and the power consumption in a stopped state of the engine can be reduced.

A small leak detected by the engine-running-state leak-check means may be regarded as a preliminary leak in the fuel-vapor-processing system and, when the engine-running-state leak-check means detects a preliminary leaks, the engine-stopped-state leak-check means may then confirm the leak.

It is also possible to provide a configuration wherein, when the engine-stopped-state leak-check means detects a leak in the fuel-vapor-processing system, only the engine-running-state leak-check means determines whether a normal condition has been restored in the fuel-vapor-processing system.

Thus, once a leak has been determined to exist in the fuel-vapor-processing system, only the engine-running-state leak-check means carries out leak-check processing in the fuel-vapor-processing system so that it is possible to reduce the amount of power consumed by an ECU in a stopped state of the engine.

According to a second aspect of the present invention, in the above configuration, a pressure in the fuel-vapor-processing system is detected within a leak-check period following termination of the running state of the engine and leak-check processing is carried out on the basis of the detected pressure. Thus, even if the temperature of fuel in the fuel tank increases only slightly after the running state of the engine is stopped, a condition for execution of the leak-check processing becomes easier to satisfy. As a result, leak-check processing can be carried out if necessary after the running state of the engine is stopped so that the frequency of the leak-check processing can be increased.

According to a third aspect of the present invention, the pressure of the fuel-vapor-processing system is limited to values lower than a predetermined limit during a leak-check period. Thus, when an open-air opening/closing valve of the canister is opened to expose the fuel-vapor-processing system to the atmosphere after the leak-check processing is finished, gas can be prevented from forcibly flowing into the canister and the fuel component in the canister can thus be prevented from being blown to the atmosphere.

According to a fourth aspect of the present invention, when the running state of the engine is stopped in the course of leak-check processing, a leak-check means continues an operation to supply power to components required for continuing the leak-check processing so that the leak-check processing can be carried out to its end. By doing so, even if there are more chances that the running state of the engine is stopped in the course of leak-check processing due to the fact that a long leak-check period is required for detecting a small leak, the leak-check processing is continued even after the running state of the engine is stopped so that it is possible to determine whether a leak exists in the fuel-vapor-processing system. Thus, the number of times the leak-check processing is carried out can be increased. As a result, detection of a small leak and early detection of a leak can be accomplished at the same time.

According to a fifth aspect of the present invention, there is provided a fuel-temperature estimation apparatus comprising:

a fuel-temperature-increase estimation means for estimating an increase in fuel temperature in the fuel tank in a running state of the engine on the basis of a state of the operation;

a fuel-temperature-decrease estimation means for estimating a decrease in fuel temperature in the fuel tank on the basis of a vehicle speed and/or an intake-air temperature as well as information (such as an ambient-air temperature) having correlation with the vehicle speed and the intake-air temperature wherein the decrease is caused by a cooling effect (or an outgoing-radiation effect); and a fuel-temperature estimation means for updating the present estimated value of the fuel temperature on the basis of a fuel-temperature increase estimated by the fuel-temperature-increase estimation means and a fuel-temperature decrease estimated by the fuel-temperature-decrease estimation means.

In this configuration, it is thus possible to determine a temperature of fuel in the fuel tank in a running state of the engine without the need to provide a fuel-temperature sensor.

The fuel-temperature-increase estimation means may estimate an increase in fuel temperature in the fuel tank wherein the increase is caused by radiated heat propagating into the fuel tank. As an alternative, the fuel-temperature-increase estimation means may estimate an increase in fuel temperature in the fuel tank on the basis of a signal output by an exhaust-temperature sensor. As another alternative, the fuel-temperature-increase estimation means may estimate an increase in fuel temperature in the fuel tank on the basis of the engine's revolution speed and/or load including an intake-pipe pressure, an intake air volume and a throttle opening. In general, the amount of exhaust-gas heat increases in proportion to the engine's revolution speed and load. Thus, a fuel-temperature increase caused by exhaust-gas heat can be estimated on the basis of the engine's revolution speed and load.

A so-called increase in fuel temperature in a fuel return system is caused by return fuel in addition to exhaust-gas heat. The return fuel is fuel returned from a fuel injection valve to the fuel tank. An increase in fuel temperature in the fuel return system may also be estimated by considering these 2 major causes, namely, the exhaust-gas heat and the return fuel. In this way, an increase in fuel temperature can be estimated with a high degree of precision. It is to be noted that, in a fuel return system where no fuel is returned from the fuel injection valve to the fuel tank, an increase in fuel temperature can thus be estimated by considering only an effect of the exhaust-gas heat, without the need to take a fuel-temperature increase caused by return fuel into account.

As a further alternative, a fuel-temperature increase caused by heat generated by a fuel pump may also be estimated. In this case, the amount of heat generated by the fuel pump can be estimated from power supplied to the fuel pump.

Even if the amounts of heat received and radiated by fuel in the fuel tank are equal to each other, a fuel-temperature change may vary in dependence on the amount of residual heat in the fuel tank. For example, the fuel-temperature increase caused by, among others, exhaust-gas heat tends to rise for a small amount of residual heat in the fuel tank. In addition, for a high temperature of fuel in the fuel tank, the difference in temperature between the running resistance wind (or outside air) and the fuel is big. In this case, the fuel-temperature decrease caused by a cooling effect (or an outgoing-radiation effect) tends to increase. For a low temperature of fuel in the fuel tank, on the other hand, the fuel-temperature increase caused by, among others, exhaust-gas heat tends to rise relatively. The present estimated value of the fuel temperature can be corrected by a correction means on the basis of the amount of fuel left in the fuel tank and/or the previous estimated value of the fuel temperature. In this way, the temperature of fuel can be estimated with a higher degree of precision.

A fuel-temperature decrease caused by dissipated heat during a stopped state of the engine is estimated on the basis of the lapse of time since a previous stopped state of the engine till the present start of the engine and an ambient temperature or information having a correlation with the ambient temperature. An example of such information is an intake-air temperature. Then, an initial value of the fuel temperature at the present start of the engine can be estimated by subtracting the fuel-temperature decrease caused by dissipated heat during the stopped state of the engine from the fuel temperature's estimated value estimated for the previous stopped state of the engine. If the fuel temperature's initial value estimated in this way is lower than the ambient temperature (or the intake-air temperature), the initial value of the fuel temperature can be set at the ambient temperature (or the intake-air temperature).

The fuel temperature's value estimated in a stopped state of the engine may be updated on the basis of the lapse of time since the termination of the engine operation or information having a correlation with the lapse of time. An example of such information is a decrease in cooling-water temperature after the termination of the engine operation. The fuel temperature's value estimated in a stopped state of the engine may be updated on the basis of the lapse of time since the termination of the engine operation and the ambient temperature or information having a correlation with the lapse of time and the ambient temperature. The present estimated value of the fuel temperature may be corrected on the basis of the amount of fuel left in the fuel tank.

It is possible to provide a configuration comprising a fuel-temperature estimation apparatus for estimating a temperature of fuel in the fuel tank during a running state of the engine and a fuel-temperature estimation apparatus for estimating a temperature of fuel in the fuel tank in a stopped state of the engine. The former and the latter apparatus are referred to hereafter as an engine-running-state fuel-temperature estimation apparatus and an engine-stopped-state fuel-temperature estimation apparatus respectively. With such a configuration, a temperature of fuel can be estimated during both a running state of the engine and a stopped state of the engine.

According to a sixth aspect of the present invention, an estimated value of the fuel temperature is used as a leak-check execution condition criterion parameter and/or a leak-check parameter. Without providing a fuel-temperature sensor, a leak in the fuel-vapor-processing system can thus be checked by consideration of the fuel tank's fuel temperature estimated during a running state of the engine or in a stopped state of the engine.

In this case, a leak in the fuel-vapor-processing system can be checked on the basis of a relation between the change in fuel-temperature value estimated in a stopped state of the engine and the change in fuel-tank internal pressure in the stopped state. In a stopped state of the engine, the temperature of fuel in the fuel tank gradually decreases with the lapse of time due to dissipation of heat. In the stopped state, evaporation gas in the spatial portion of the fuel tank condenses gradually, causing the amount of the evaporation gas to gradually decrease as well. Thus, if the fuel-vapor-processing system including the fuel tank is hermetically sealed, the internal pressure of the fuel tank gradually goes down with the lapse of time, indicating that the fuel-vapor-processing system is in a normal state with no leak. If there is a leak in the fuel-vapor-processing system, on the other hand, the internal pressure of the fuel tank does not change, remaining at a value close to the atmospheric pressure even if the temperature of fuel in the fuel tank decreases. For this reason, a leak in the fuel-vapor-processing system can be checked on the basis of a relation between the change in fuel-temperature value estimated in a stopped state of the engine and the change in fuel-tank internal pressure in the stopped state.

For example, a leak in the fuel-vapor-processing system may be checked on the basis of a change in fuel-tank internal pressure during a period, which starts when the check-leak processing is commenced in a stopped state of the engine and ends when the fuel temperature's value estimated in the stopped state decreases to a predetermined value. That is, a leak or no leak is determined to exist in the fuel-vapor-processing system if the internal pressure of the fuel tank decreases only by a quantity smaller or greater respectively than a criterion value when the fuel temperature's value estimated in the stopped state of the engine decreases to the predetermined value.

It is to be noted that a leak in the fuel-vapor-processing system may also be checked on the basis of a decreasing gradient of the estimated value in a predetermined period of time and a variation gradient of the internal pressure in the same predetermined period of time, wherein the decreasing gradient is defined as a rate of decrease in fuel-temperature estimated value whereas the variation gradient is defined as a rate of change in fuel-tank internal pressure.

If the temperature of fuel in the fuel tank is low at the start of processing to check a leak in the fuel-vapor-processing system in a stopped state of the engine, that is, if the temperature of fuel in the fuel tank is close to the ambient temperature, the temperature of fuel decreases thereafter only by a small quantity. Thus, the change in fuel-tank-internal-pressure also becomes smaller as well so that the difference in internal-pressure change between a leaked state and the normal state is small. As a result, it is difficult to distinguish a leaked state and the normal state from each other.

In order to solve this problem, a condition requiring the fuel temperature's value estimated immediately before or immediately after termination of the engine operation to be higher than the ambient temperature by at least a predetermined difference may be set as one of conditions for execution of the leak-check processing. By setting such a condition as a condition for execution of the leak-check processing, it is possible to assure a sufficient decrease in fuel temperature (or a sufficient rate of decrease in fuel temperature) during the leak-check processing carried out in a stopped state of the engine. Thus, it is possible to clearly distinguish a change in fuel-tank-internal-pressure (or a rate of change in fuel-tank-internal-pressure) in a leaked state from a change in fuel-tank-internal-pressure (or a rate of change in fuel-tank-internal-pressure) in a normal state. As a result, it is possible to determine whether a leak exists in the fuel-vapor-processing system with a high degree of precision.

According to a seventh aspect of the present invention, a fuel-temperature sensor is diagnosed for existence/non-existence of an abnormality on the basis of a relation between an estimated value of the fuel temperature and a temperature value detected by the fuel-temperature sensor. If the difference between an estimated value of the fuel temperature and a temperature value detected by the fuel-temperature sensor is beyond a range of the normal state, for example, the result of the diagnosis of the fuel-temperature can be set to indicate that the sensor is abnormal. As an alternative, the fuel-temperature sensor is diagnosed for existence/non-existence of an abnormality on the basis of a relation between a change in fuel-temperature estimated value and a change in fuel-temperature-sensor detected value. This is because the estimated value of the fuel temperature varies in dependence on how an initial value of the estimated fuel temperature is set. By using the change in fuel-temperature estimated value in place of the estimated value of the fuel temperature, this problem can be solved. This is because the change in fuel-temperature estimated value is all but independent of how an initial value of the estimated fuel temperature is set. Thus, by diagnosing the fuel-temperature sensor for existence/non-existence of an abnormality on the basis of a relation between a change in fuel-temperature estimated value and a change in fuel-temperature-sensor detected value, the fuel-temperature sensor can be diagnosed for existence/non-existence of an abnormality with a high degree of precision even if the initial value of the estimated fuel temperature changes more or less.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

PREFERRED EMBODIMENT OF THE INVENTION

First Embodiment

Figure 1:
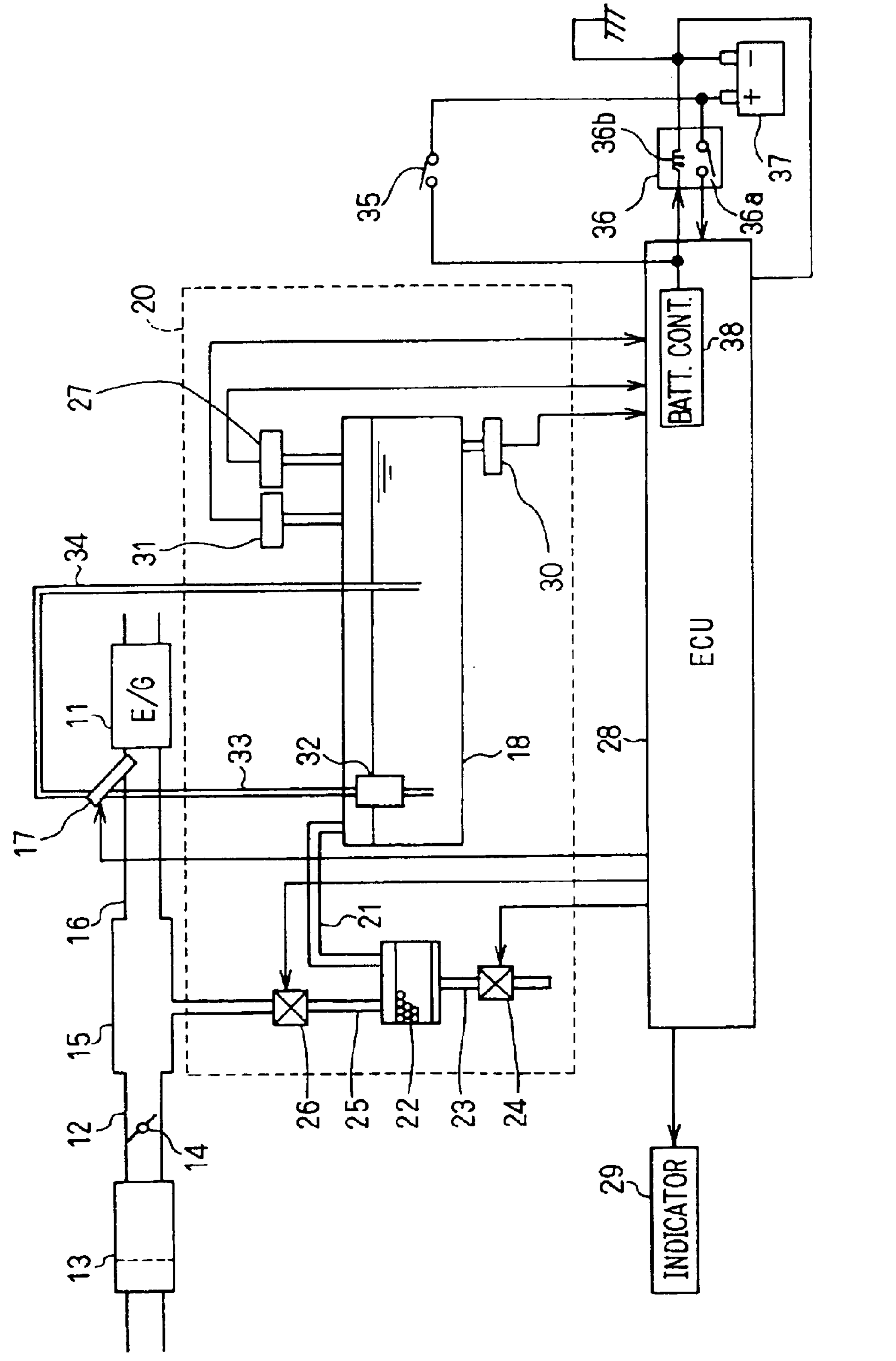
FIG. 1 is a block diagram showing a fuel-vapor-processing system in a first embodiment of the present invention.

The following description explains an overall configuration of a fuel-vapor-processing system, which is implemented by a first embodiment of the present invention, by referring to FIG. 1 showing the configuration in a plain and simple manner. An air cleaner 13 is provided on the upstream side of an intake pipe 12 of the engine 11. Air passing through the air cleaner 13 flows into each cylinder of the engine 11 by way of a throttle valve 14, a surge tank 15 and an intake manifold 16. On the intake manifold 16 of each cylinder, a fuel injection valve 17 is provided. Fuel is supplied to each fuel injection valve 17 by a fuel pump 32 provided in a fuel tank 18 by way of a fuel pipe 33. A pressure regulator is provided on a delivery pipe not shown in the figure. Excess fuel is returned to the fuel tank 18 by way of a return pipe 34.

Next, the configuration of the fuel-vapor-processing system 20 is explained. The fuel tank 18 is connected to a canister 22 by a gas passage 21. The canister 22 accommodates an absorbent made of typically active carbon. Used for absorbing gas (evaporated fuel), the absorbent itself is not shown in the figure. A fresh air passage 23 serving as a passage for fresh air is connected to a fresh air hole at the bottom of the canister 22. On the fresh air passage 23, a canister valve 24 is provided.

The canister valve 24 is an electromagnetic valve. When the canister valve 24 is put in an unenergized state, the fresh air passage 23 connected to the canister 22 is exposed to outside air. When the canister valve 24 is put in an energized state, on the other hand, the fresh air passage 23 connected to the canister 22 is closed.

Used for purging evaporated fuel absorbed into the canister 22 to the intake pipe 12, a purge passage 25 is provided between the canister 22 and a surge tank 15. Used for adjusting a purge flow rate, a purge valve 26 is provided at a position on the purge passage 23. The purge valve 26 is also an electromagnetic valve. The duty cycle of the purge valve 26 is adjusted to control the purge flow rate of evaporated fuel purged from the canister 22 to the intake pipe 12.

A tank-internal-pressure sensor 27 is provided in the fuel tank 18, which is made of resin. The tank-internal-pressure sensor 27 is used for detecting an internal pressure of the fuel tank 18. When the fuel-vapor-processing system extending from the inside of the fuel tank 18 to the purge valve 26 is hermetically sealed, the internal pressure of the fuel tank 18 is equal to the internal pressures of other members of the fuel-vapor-processing system. Thus, in this state, an internal pressure detected by the tank-internal-pressure sensor 27 in the fuel tank 18 can be regarded as the internal pressure of the fuel-vapor-processing system. A fuel-level sensor 31 is used for detecting a fuel level FL.

A signal generated by the tank-internal-pressure sensor 27 is supplied to an engine control circuit 28, which is abbreviated hereafter to an ECU 28. The ECU 28 is based on a microcomputer. The ECU 28 executes fuel-injection control, ignition control, purge control and other kinds of control by execution of a fuel-injection control program, an ignition control program, a purge control program and other control programs. These control programs are stored in the microcomputer's ROM not shown in the figure. In addition, the ECU 28 determines the existence/non-existence of a leak in the fuel-vapor-processing system by execution of a fuel-vapor-processing-system leak-check program stored in the ROM and represented by flowcharts shown in FIGS. 3 to 5. When a leak is detected, an indicator 29 is turned on to inform the driver of the existence of the leak. It is to be noted that, since the ECU 28 executes the fuel-vapor-processing-system leak-check program also after the engine 11 is stopped as will be described later, an operation to supply power to the ECU 28 needs to be continued also after the driver turns off an ignition switch 35. The ECU 28 has a power-supply control means 38 used for detaching a main relay 36 from a battery 37 upon completion of execution of the fuel-vapor-processing-system leak-check program. The main relay 36 includes a contact 36*a* and a coil 36*b*.

Figure 2:
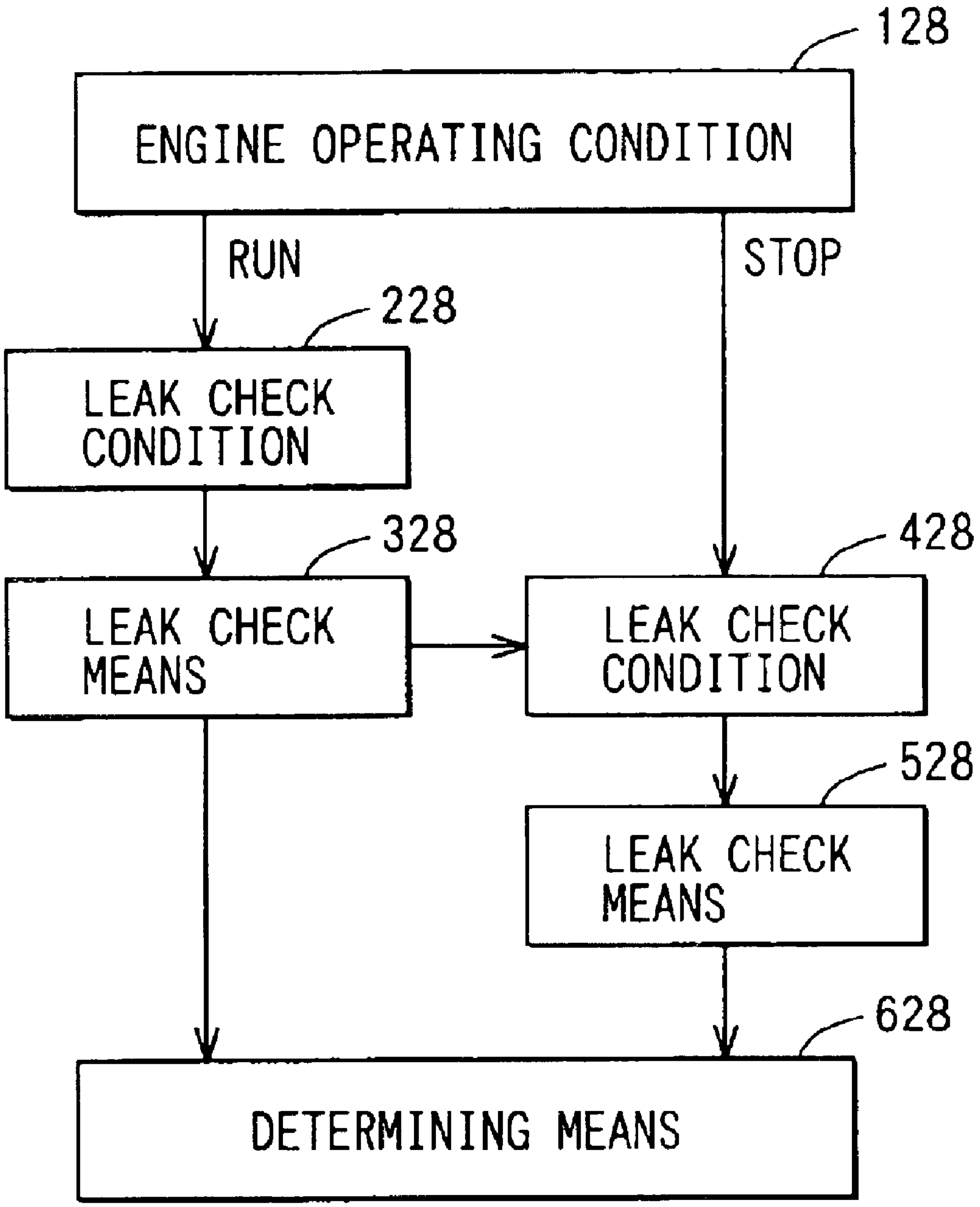
FIG. 2 is a functional block diagram showing a leak-check apparatus implemented by the first embodiment of the present invention.

FIG. 2 is a diagram showing an outline of processing to check a leak in the fuel-vapor-processing system. An engine-operation-state determination unit 128 determines whether the engine is in a running or stopped state. If the engine is determined in a running state, an engine-running-state-execution-condition determination unit 228 determines whether a condition for execution of the fuel-vapor-processing-system leak-check program in a running state is satisfied. If the execution condition is satisfied, an engine-running-state-leak-check means 328 executes a leak-check program for determining whether a leak exists in the fuel-vapor-processing system in the running state of the engine, and determines whether a leak exists in the fuel-vapor-processing system. An existing leak may be determined to be an abnormality caused by a big leak or determined to be an abnormality caused by a small leak.

A normalcy/abnormality determination unit 628 receives a result of determination from the fuel pump 328. If the result of determination indicates a big-leak abnormality, the indicator 29 is turned on. If the result of determination indicates a small-leak abnormality, on the other hand, the indicator 29 is not turned on. The result of determination is also supplied to an engine-stopped-state leak-check-execution-condition determination means 428.

When the engine is in a stopped state, the engine-stopped-state leak-check-execution-condition determination means 428 determines whether a condition for execution of the fuel-vapor-processing-system leak-check program is satisfied. The engine-stopped-state leak-check-execution-condition determination means 428 also determines whether a condition for execution of the fuel-vapor-processing-system leak-check program in a stopped state is satisfied on the basis of a determination result output by the fuel pump 328. An engine-stopped-state leak-check means 528 determines whether a leak exists in the fuel-vapor-processing system in a stopped state, and supplies a result of determination to the normalcy/abnormality determination means 628. If the result of determination indicates a normal state, the normalcy/abnormality determination means 628 turns off the indicator 29. If the result of determination indicates an abnormality, on the other hand, the indicator 29 is turned on.

As described above, this embodiment executes the fuel-vapor-processing-system leak-check program in both stopped and running states in order to reduce power consumption in a stopped state and improve precision to detect a small-leak abnormality. The following description explains details of this embodiment by referring to flowcharts shown in FIGS. 3 to 5. In the following description, the fuel-vapor-processing-system leak-check program for a stopped state is called a tank-internal-pressure monitor program and the fuel-vapor-processing-system leak-check program for a running state is referred to as a negative-pressure monitor program.

At a step S101, an engine revolution speed Ne is examined to determine whether the speed Ne is higher than 0 rpm. This determination corresponds to a block 128 shown in FIG. 2. Instead of determining whether the speed Ne is higher than 0 rpm, the state of the ignition switch can also be examined to determine whether the engine is in a stopped or running state. If the engine is determined to be in a stopped state, the flow of the routine goes on to junction D to execute the tank-internal-pressure monitor program.

If the engine is determined to be in a running state, on the other hand, the flow of the routine goes on to a step S102. At the step S102, a flag FLG1 indicating completion of leak-check processing by execution of the negative-pressure monitor program is examined to determine whether the flag FLG1 is reset to 0. If the flag FLG1 is set at 1, the execution of this routine is ended. If the leak-check-completion flag FLG1 is reset to 0, on the other hand, the flow of the routine goes on to a step S103 to determine whether a condition for execution of the leak-check processing is satisfied. The condition for execution of the leak-check processing is determined to be satisfied if the operating state of the engine is stable. The stability of the engine's operating condition can be examined by typically checking the intake airflow, the intake-air temperature and the lapse of time since a start of the engine or by determination of whether air-fuel-ratio feedback control is being executed. If the condition for execution of the leak-check processing is determined to be unsatisfied, the execution of this routine is ended without carrying out leak-check processing.

If the condition for execution of the leak-check processing is determined to be satisfied, on the other hand, the flow of the routine goes on to a step S104 at which the canister valve 24 is closed. Then, at the next steps S105 and S106, the purge valve 26 is gradually opened. As the purge valve 26 is opened to a predetermined opening, a negative pressure is introduced into the fuel-vapor-processing system. The purge valve 26 is gradually opened in order to reduce an effect on drivability and to soften an air flow in the fuel-vapor-processing system at the introduction of the negative pressure.

In detail, at the step S106, the opening of the purge valve 26 is examined to determine whether the purge valve 26 has been opened to the predetermined opening. Then, at the next step S107, the flow of the routine enters a state of waiting for the fuel-vapor-processing system's pressure P1 detected by the tank-internal-pressure sensor 27 to decrease to a predetermined level Pth. Subsequently, at the next step S108, the purge valve 26 is closed to hermetically seal the fuel-vapor-processing system. Then, at the next step S109, an internal pressure P1a of the fuel-vapor-processing system is input and stored in a RAM shown in none of the figures. Subsequently, at the next step S110, the pressure P1a is examined to determine whether the pressure P1a is equal to or lower than an allowable lower limit pressure P1L. If the pressure P1a is determined to be equal to or lower than the allowable lower limit pressure P1L, that is, the introduced negative pressure is too big, the flow of the routine goes on to a step S132 of the flowchart shown in FIG. 4 without carrying out the leak-check processing at the subsequent steps. This is because the leak-check processing cannot be carried out with a high degree of precision. At the step S132, the canister valve 24 is opened to terminate the hermetically sealed state of the fuel-vapor-processing system.

If the pressure P1a is determined to be higher than the allowable lower limit pressure P1L, on the other hand, the flow of the routine goes on to steps S111 and S112 to wait for a first pressure-change determination period T1 to lapse. Then, at the next step S113, the fuel-vapor-processing system's pressure P1b at the end of the first pressure-change determination period T1 is input and a difference DPT1 between the pressures P1a and P1b is found and stored in the RAM shown in none of the figures. The pressure difference DPT1 is a change in fuel-vapor-processing-system pressure during the first pressure-change determination period T1.

Subsequently, at the next step S114, the pressure difference DPT1 is compared with a criterion value L determined in advance. The criterion value L is a pressure change assumed to be caused by gas generation during the first pressure-change determination period T1 or a value smaller than the pressure change. Thus, if the pressure difference DPT1 is found smaller than the criterion value L, no leak is determined to exist in the fuel-vapor-processing system. In this case, the flow of the routine goes on to a step S135 of the flowchart shown in FIG. 4 to determine that the state of the fuel-vapor-processing system is normal. Then, at the next step S136, a normal-determination counter is incremented by 1. Subsequently, at the next step S137, the normal-determination counter is examined to determine whether the contents of the normal-determination counter are greater than a predetermined value C1. If the contents of the normal-determination counter are found greater than the predetermined value C1, the flow of the routine goes on to a step S138 at which the indicator 29 is turned off. If the contents of the normal-determination counter are not greater than the predetermined value C1, on the other hand, the flow of the routine goes on to a step S131. At the step S131, the leak-check-completion flag FLG1 indicating completion of leak-check processing is set at 1. Subsequently, at the next step S132, the canister valve 24 is opened and then the flow of the routine goes back to the normal purge control.

If the pressure difference DPT1 is determined to be equal to or greater than the criterion value L, on the other hand, the fuel-vapor-processing system is sustained continuously in the hermetically sealed state. This is because it is quite within the bounds of possibility that a leak exists in the fuel-vapor-processing system. In this case, the flow of the routine goes on to a step S115. At the step S115 and a step S116, timer processing is carried out to wait for a predetermined wait time Tm to lapse.

As the predetermined wait time Tm lapses, a second pressure-change determination period is started. At a step S117, a minimum value Pmin of the internal pressure of the fuel-vapor-processing system is stored. During the second pressure-change determination period, the minimum value Pmin is updated from time to time. Then, at the next step S118, a maximum value Pmax of the internal pressure of the fuel-vapor-processing system is stored. During the second pressure-change determination period, the maximum value Pmax is also updated from time to time.

Subsequently, at the next step S119, the minimum value Pmin is examined to determine whether Pmin is in a predetermined pressure range Prng1, that is, a range in which it is quite within the bounds of possibility that a leak exists in the fuel-vapor-processing system. If the minimum value Pmin is beyond the predetermined pressure range Prng1, the flow of the routine goes on to the step S135 at which the fuel-vapor-processing system is determined to be in a normal state. In the processing described above, if the minimum pressure Pmin of the fuel-vapor-processing system is beyond the predetermined pressure range Prng1 at the beginning of the second pressure-change determination period, the fuel-vapor-processing system is determined to be normal.

Subsequently, at the next step S120, the maximum value Pmax is examined to determine whether Pmax is in a predetermined pressure range Prng2, that is, a range in which it is quite within the bounds of possibility that a leak exists in the fuel-vapor-processing system. If the maximum value Pmax is beyond the predetermined pressure range Prng2, the flow of the routine goes on to the step S135.

If the maximum value Pmax is within the predetermined pressure range Prng2, on the other hand, the flow of the routine goes on to a step S121. At the step S121 and a step S122, the second pressure-change determination period T2 is measured by using a timer. The steps S117 to S120 are executed repeatedly till the second pressure-change determination period T2 lapses. As the second pressure-change determination period T2 lapses, the flow of the routine goes on to a step S123 to compute a difference DPT2 between the maximum value Pmax and the minimum value Pmin and store the difference DPT2 in the RAM. Then, at the next step S124, a tank internal temperature Ta and a fuel level FL are input from the tank-internal-pressure sensor 27 and the fuel-level sensor 31 respectively and stored in the RAM. Subsequently, at the next steps S125 to S138, processing is carried out to determine whether the state of the fuel-vapor-processing system is normal or abnormal and determine a degree of an abnormality if the state of the fuel-vapor-processing system is determined to be abnormal. This embodiment distinguishes an abnormality caused by a leak through a hole with a diameter of about 0.5 mm in the fuel-vapor-processing system from an abnormality caused by a leak through a hole with a diameter of about 1.0 mm. Specifically, at the step S125, a difference between the pressure changes DPT1 and DPT2 is computed and examined to determine whether the difference is greater than a criterion value K1.

The criterion value K1 is a criterion as to whether an abnormality caused by a leak through a hole with a diameter of about 1.0 mm. The criterion value K1 is greater than a criterion value K2 to be described later.

Figure 6:
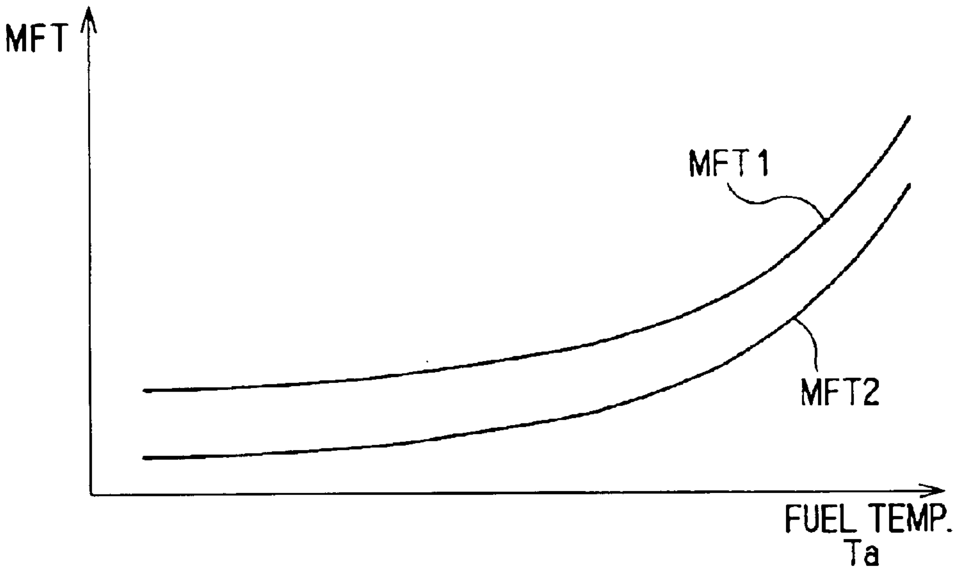
FIG. 6 is a diagram showing graphs representing a correction-coefficient map used in the first embodiment of the present invention.
Figure 7:
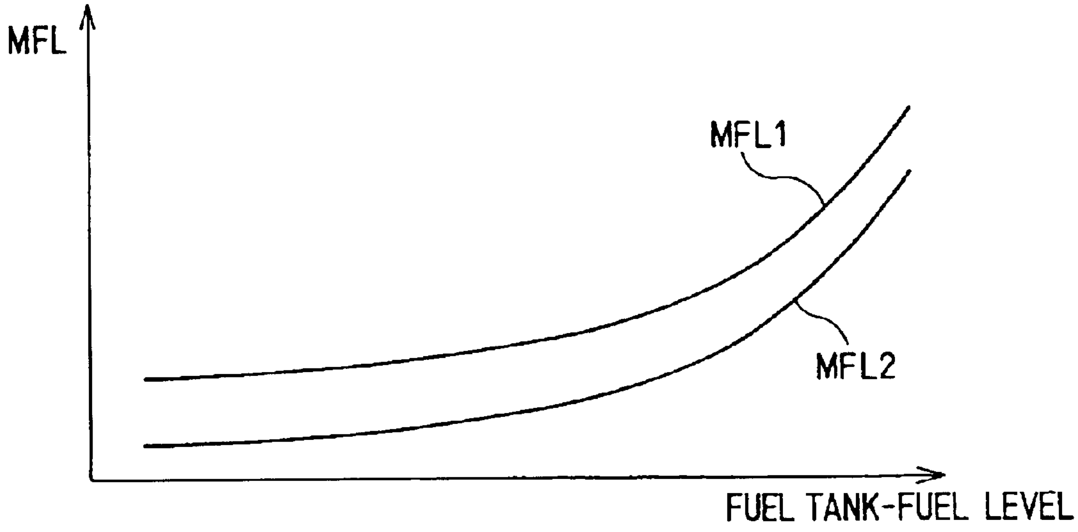
FIG. 7 is a diagram showing graphs representing another correction-coefficient map used in the first embodiment of the present invention.

FIG. 6 is a diagram showing a map for determining a correction coefficient MFT from a fuel temperature Ta while FIG. 7 is a diagram showing a map for determining a correction coefficient MFL from a fuel level FL. The criterion value K1 is corrected into a value proper for a fuel temperature Ta and a fuel level FL by multiplication of K1 by correction coefficients MFT and MFL found from the maps for the fuel temperature Ta and the fuel level FL respectively. The map shown in FIG. 6 is used to find a correction coefficient MFT1 for the negative-pressure monitor program and a correction coefficient MFT2 for the tank-internal-pressure monitor program. Since the negative-pressure monitor program is executed to check a leak in a running state of the engine, the effect of the fuel temperature is greater than the effect of the fuel temperature in the engine's stopped state, a leak in which is checked by execution of the tank-internal-pressure monitor program. For this reason, the correction coefficient MFT1 is set at a value greater than the correction coefficient MFT2. Both the correction coefficients MFT increase as the fuel temperature Ta rises. As for the correction coefficients MFT for the fuel level FL, the correction coefficient MFL1 for the negative-pressure monitor program also has values greater than the correction coefficient MFL2 for the tank-internal-pressure monitor program as shown in FIG. 7. Both the correction coefficients MFL increase as the fuel level FL decreases to provide a larger spatial volume in the fuel tank.

If a determination result obtained at the step S125 indicates that the difference between DPT1 and DPT2 is greater than the criterion value K1, the flow of the routine goes on to a step S126 to confirm the existence of an abnormality caused by a leak through a hole with a diameter of at least about 1.0 mm. The flow of the routine to this step indicates that the pressure in the fuel-vapor-processing system abruptly changes toward the atmospheric pressure during the first pressure determination period and is sustained at a level close to the atmospheric pressure during the second pressure determination period. Then, at the next step S127, the contents of counter 2 are incremented. Counter 2 is a counter with an initial value set at 0 and the contents incremented by 1 each time such an abnormality is detected.

Subsequently, at the next step S128, the contents of counter 2 are examined to determine whether the contents have exceeded a predetermined value C2. If the contents of counter 2 are found greater than the predetermined value C2, the flow of the routine goes on to a step S129 at which the indicator 29 is turned on. Then, the flow of the routine goes on to a step S130. If the contents of counter 2 are not greater than the predetermined value C2, on the other hand, the flow of the routine goes on directly to the step S130 at which counter 1 is cleared. Then, the flow of the routine goes on to a step S131. At the step S131, the leak-check-completion flag FLG1 is set at 1. Subsequently, at the next step S132, the canister valve 24 is opened and then the flow of the routine goes back to the normal purge control.

If a determination result obtained at the step S125 indicates that the difference (DPT1−DPT2) in the fuel tank is equal to or smaller than the criterion value K1, on the other hand, the flow of the routine goes on to a step S133. At this step S133, the difference (DPT1−DPT2) in the fuel tank is examined to determine whether the difference is greater than the criterion value K2 in order to determine existence of an abnormality caused by a leak through a hole with a diameter of at least 0.5 mm. The criterion value K2 is also corrected into a value proper for a fuel temperature Ta and a fuel level FL by multiplication of K2 by correction coefficients MFT and MFL found from the maps shown in FIGS. 6 and 7 for the fuel temperature Ta and the fuel level FL respectively. If a determination result obtained at the step S133 indicates that the difference (DPT1−DPT2) in the fuel tank is equal to or smaller than the criterion value K2, the flow of the routine goes on to a step S135.

If the determination result obtained at the step S133 indicates that the difference (DPT1−DPT2) in the fuel tank is greater than the criterion value K2, on the other hand, the flow of the routine goes on to a step S134 to confirm the existence of an abnormality caused by a leak through a hole with a diameter of at least about 0.5 mm. This preliminary result of fault determination is stored in the RAM. Then, at the next step S131, the leak-check-completion flag FLG1 is set at 1. Subsequently, at the next step S132, the canister valve 24 is opened and then the flow of the routine goes back to the normal purge control.

It is to be noted that, at the steps S125 and S133, a ratio of the pressure change DPT1 to the pressure change DPT2 can also be compared with predetermined values to determine the existence or nonexistence of a leak in the fuel-vapor-processing system.

In the program for checking a leak in the fuel-vapor-processing system as described above, during a period between the first pressure change determination and the second pressure change determination, the fuel-vapor-processing system is hermetically sealed. Thus, the second pressure change determination can be carried out under the same condition. Thus, an effect of generated fuel vapor on the change in pressure can be cancelled from a second pressure change determination result. As a result, existence of a leak in the fuel-vapor-processing system can be determined with a high degree of precision.

In addition, if the pressure in the fuel-vapor-processing system during a second pressure change determination period is beyond a predetermined pressure range, the determination of a change in pressure is ended immediately. Thus, in a normal state, fast leak-check processing can be carried out without wasteful determination of a change in pressure.

It is to be noted that it is also possible to set a pressure determination period of detecting a pressure in the fuel-vapor-processing system at a point of time in place of the second pressure-change determination period. In addition, while only 2 pressure-change determination periods are set during a hermetically sealed period of the fuel-vapor-processing system, 3 or more pressure-change determination periods can also be set.

Moreover, while pressure changes DPT1 and DPT2 are examined for determination in this embodiment, rates of change in pressure can also be used in place of the changes in pressure. As an alternative, it is also possible to use a time for a change in pressure to reach a predetermined change in pressure as measured by a timer as an indicator of the change in pressure in each of the pressure-change determination periods. Furthermore, successive pressure-change determination periods can also be set continuously without providing a wait period Tm between 2 consecutive pressure-change determination periods.

In the fuel-vapor-processing system's typical configuration shown in FIG. 1, an internal pressure of the fuel tank 18 is detected by the tank-internal-pressure sensor 27. It is to be noted that, in place of an internal pressure, typically, a pressure of the gas passage 21 can also be detected. As an alternative, a sensor can be used for detecting a pressure at a location between the fuel tank 18 and the purge valve 26 in the fuel-vapor-processing system.

Figure 5:
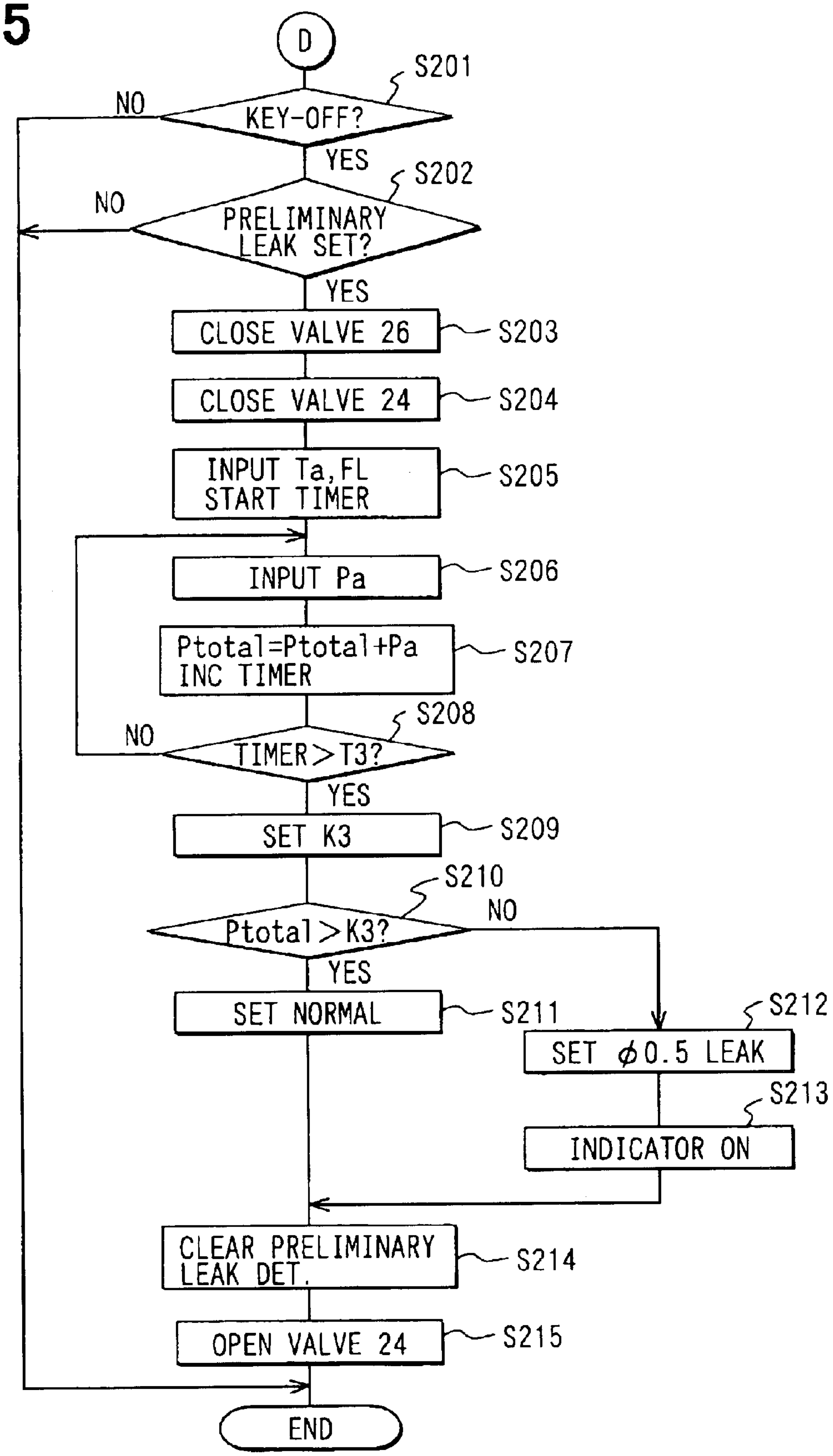
FIG. 5 shows another continuation flowchart representing the leak-check processing implemented by the first embodiment of the present invention.

By referring to the flowchart shown in FIG. 5, the following description explains leak-check processing carried out by execution of the tank-internal-pressure monitor program. At a step S201, the ignition switch 35 is examined to determine whether the ignition switch 35 is on or off. If the ignition switch 35 is not off, the execution of the routine, that is, the execution of the tank-internal-pressure monitor program, is ended without doing anything. If the ignition switch 35 is off, on the other hand, the flow of the routine goes on to a step S202 to determine whether the negative-pressure monitor program has determined preliminarily the existence of a leak. If the negative-pressure monitor program did not determine preliminarily the existence of a leak, the execution of the routine, that is, the execution of the tank-internal-pressure monitor program, is ended. In this way, the amount of power consumed by the ECU 28 in the stopped state of the engine can be reduced.

If the negative-pressure monitor program has determined preliminarily the existence of a leak, on the other hand, the flow of the routine goes on to a step S203 at which the purge valve 26 is closed. Then, at the next step S204, the canister valve 24 is closed. In this state, the fuel-vapor-processing system is hermetically sealed. Subsequently, at the next step S205, a tank internal temperature Ta as well as a fuel level FL are input and a counting operation of a timer is started. Subsequently, at the next step S206, a pressure Pa of the fuel-vapor-processing system is input from the tank-internal-pressure sensor 27. Then, at the next step S207, the amount of fuel evaporating since the fuel-vapor-processing system was hermetically sealed is computed. The amount of evaporating fuel is found as a cumulative value Ptotal of the tank-internal-pressure Pa. In addition, the contents of the timer are incremented at that time. Subsequently, the flow of the routine goes on to a step S208 to determine whether the contents of the timer have exceeded a predetermined value T3. If the contents of the timer are found smaller than the predetermined value T3, the flow of the routine goes back to the step S206 to repeat the processing of this step and the steps S207 and S208. Typically, the contents of the timer exceed the predetermined value T3 in 5 minutes. In this case, the flow of the routine goes on to a step S209.

At the step S209, a criterion value K3 for checking a leak is set. The criterion value K3 is computed by multiplying correction coefficients MFT and MFL shown in FIGS. 6 and 7. The flow of the routine then goes on to the next step S210 to determine whether the cumulative pressure Ptotal has exceeded the criterion value K3. If the cumulative pressure Ptotal has not exceeded the criterion value K3, the flow of the routine goes on to a step S212 at which the state of the fuel-vapor-processing system is determined to be abnormal. Then, at the next step S213, the indicator 29 is turned on. If the cumulative pressure Ptotal has exceeded the criterion value K3, on the other hand, the flow of the routine goes on to a step S211 at which the state of the fuel-vapor-processing system is determined to be normal. Then, at the next step S214, the preliminary leak determination is canceled. Subsequently, at the next step S215, the canister valve 24 is opened. Then, also at the step S215, the setting of the main relay 36 is changed over to disconnect the ECU 28 from the battery 37.

As described above, in this embodiment, only when a leak is preliminarily determined by execution of the negative-pressure monitor program, is the program activated. Thus, the amount of power consumed during a stopped state of the engine can be reduced. In addition, the negative-pressure monitor program turns on the indicator 29 only when the contents of counter 2 exceed the predetermined value C2. Therefore, a leak can be detected with a high degree of efficiency. In addition, by executing the tank internal-pressure monitor program to check existence of a leak in conjunction with leak-check processing based on the negative-pressure monitor program, it is possible to check a leak caused by a hole with a diameter of about 0.5 mm with a high degree of precision.

In this way, by execution of the tank-internal-pressure monitor program in conjunction with the negative-pressure monitor program, it is possible to reduce the amount of power consumed in a stopped state of the engine and to prevent incorrect detection of a leak.

Figure 8:
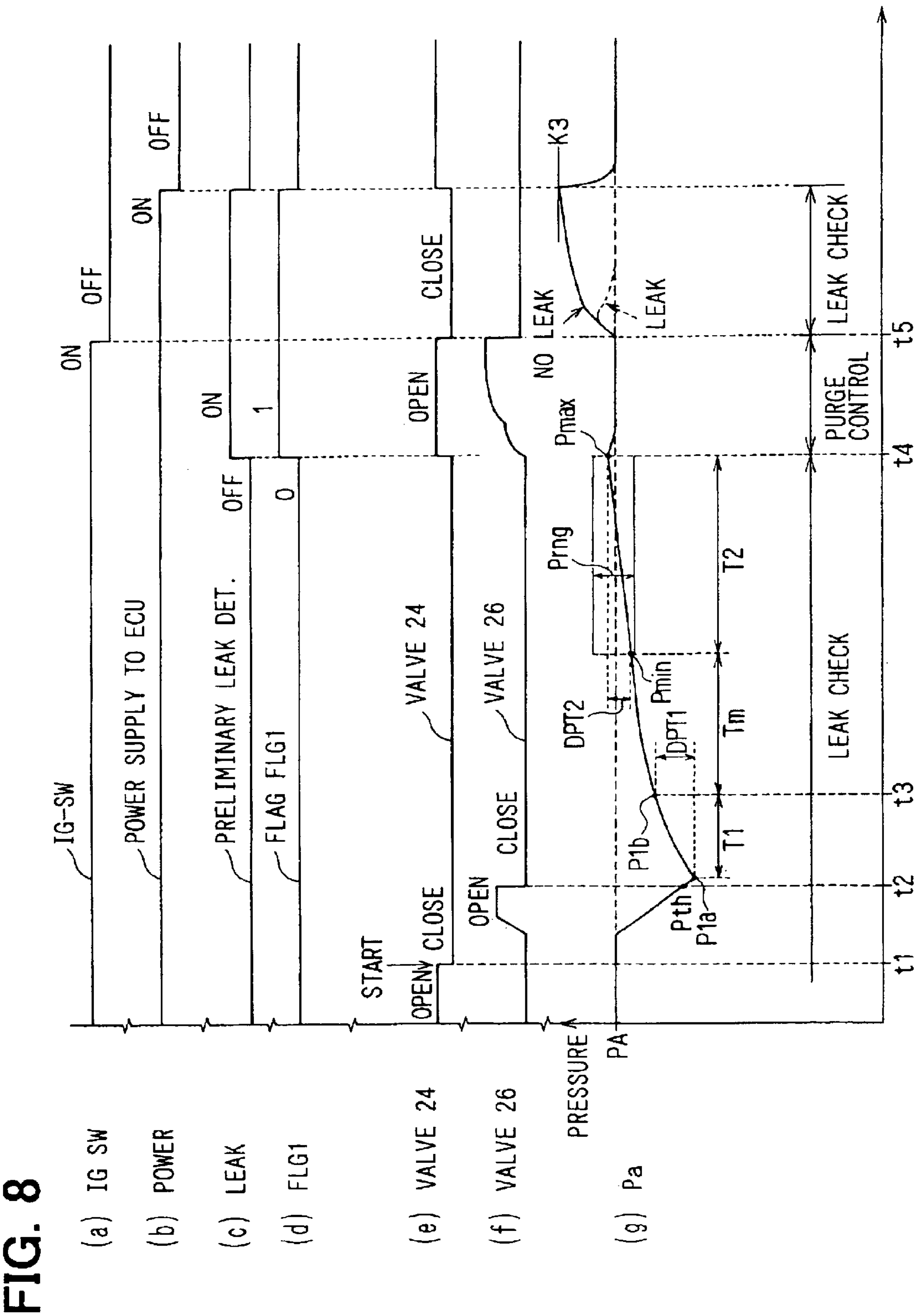
FIG. 8 shows time charts of leak-check operations according to the first embodiment of the present invention.

Typical operations of the embodiment are explained by referring to time charts shown in FIG. 8. Assume that leak-check conditions for execution of the negative-pressure monitor program are satisfied at a time t1. In this case, the canister valve 24 is closed. Later on, the purge valve 26 is gradually opened. As a result, the pressure of the fuel-vapor-processing system decreases from the atmospheric pressure PA. When the pressure becomes equal to a predetermined negative pressure Pth at a time t2, the purge valve 26 is closed to hermetically seal the fuel-vapor-processing system. In a first pressure-change determination period T1, a minimum value P1a and a maximum value P1b are stored. At a time t3, a difference DPT1=P1b−P1a is found. If this difference DPT1 is found greater than a predetermined value L, a transition to a wait period Tm occurs. During a second pressure-change determination period T2, a maximum value Pmax and a minimum value Pmin are updated. At a time t4, DPT2(Pmax−Pmin) and a deviation of the change in pressure (DPT1−DPT2) are found. If the deviation (DPT1−DPT2) is found greater than the criterion value K2, the state of the fuel-vapor-processing system is determined to be abnormal and, at the same time, the leak-check-completion flag FLG1 is set at 1 before terminating the execution of the negative-pressure monitor program. At that time, the canister valve 24 is opened and then the flow of the routine goes back to the normal purge control.

When the ignition switch 35 is turned off at a time t5, leak-check processing is carried out by execution of the tank-internal-pressure monitor program. In leak-check processing carried out in a stopped state of the engine, the canister valve 24 and the purge valve 26 are closed to hermetically seal the fuel-vapor-processing system. A leak in the fuel-vapor-processing system is determined from a monitored increase in internal pressure. A solid line shown in the figure represents changes in tank-internal-pressure in the existence of no leak. In the existence of a leak, on the other hand, changes in tank-internal-pressure are represented by a dotted line.

Figure 3:
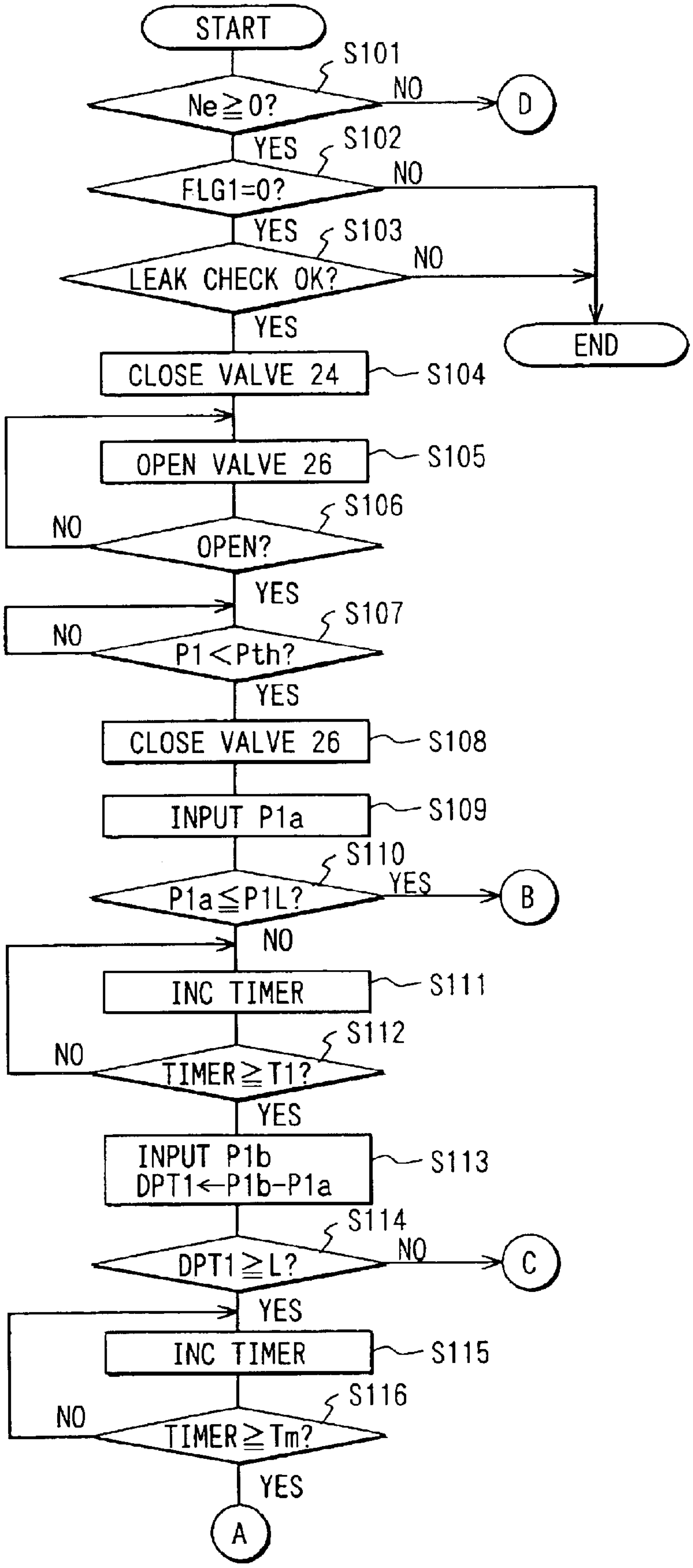
FIG. 3 shows a flowchart representing leak-check processing implemented by the first embodiment of the present invention.
Figure 4:
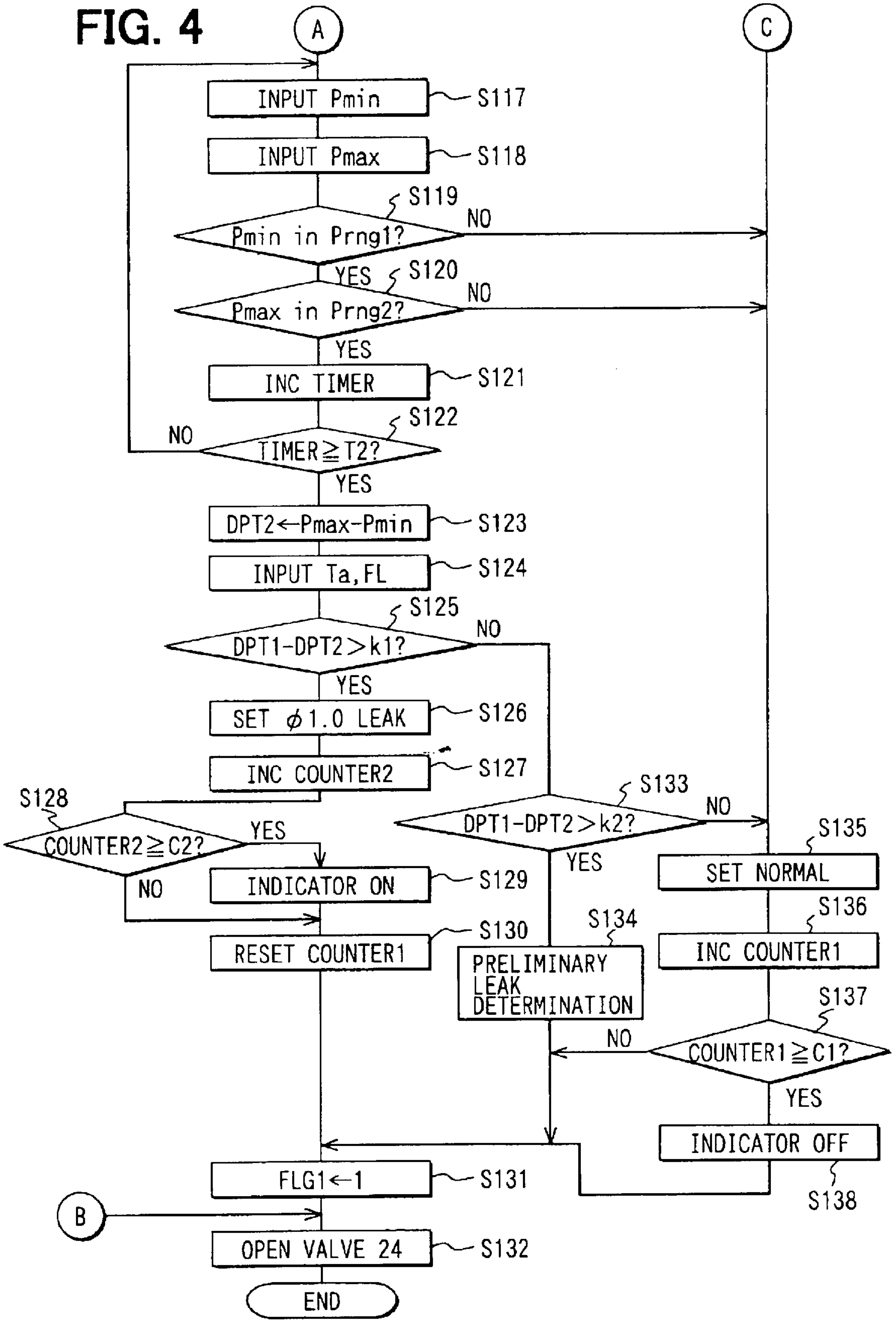
FIG. 4 shows a continuation flowchart representing the leak-check processing implemented by the first embodiment of the present invention.

In this embodiment, functions of an engine-running-state leak-check means are represented by the flowcharts shown in FIGS. 3 and 4, and functions of an engine-stopped-state leak-check means are represented by the flowchart shown in FIG. 5. Functions of a leak-magnitude detection means are represented by the steps S125 and S133 of the flowchart shown in FIG. 5. A function of an engine-running-state execution-condition determination means is represented by the step S103 of the flowchart shown in FIG. 3. A function of a negative-pressure-introducing means is represented by the step S105 of the flowchart shown in FIG. 3. A function of an engine-running-state hermetical-sealing means is represented by the step S108 of the flowchart shown in FIG. 3. A function of an engine-stopped-state execution-condition determination means is represented by the step S201 of the flowchart shown in FIG. 5. A function of a pressure-detecting means is carried out by the tank-internal-pressure sensor 27. A function of an engine-stopped-state hermetical-sealing means is represented by the steps S203 and S204 of the flowchart shown in FIG. 5. Functions of a fuel-residue detection means and a fuel-temperature detection means are represented by the step S205 of the flowchart shown in FIG. 5.

Next, other embodiments are explained. In the following description, other embodiment's elements identical with those of the first embodiment are denoted by the same reference numerals as the first embodiment and the explanation of such elements is not repeated.

Second Embodiment

In this embodiment, in order to reduce the consumption of power generated by the battery 37 in a stopped state of the engine, the frequency at which the leak-check program is executed in the stopped state of the engine is decreased.

Figure 9:
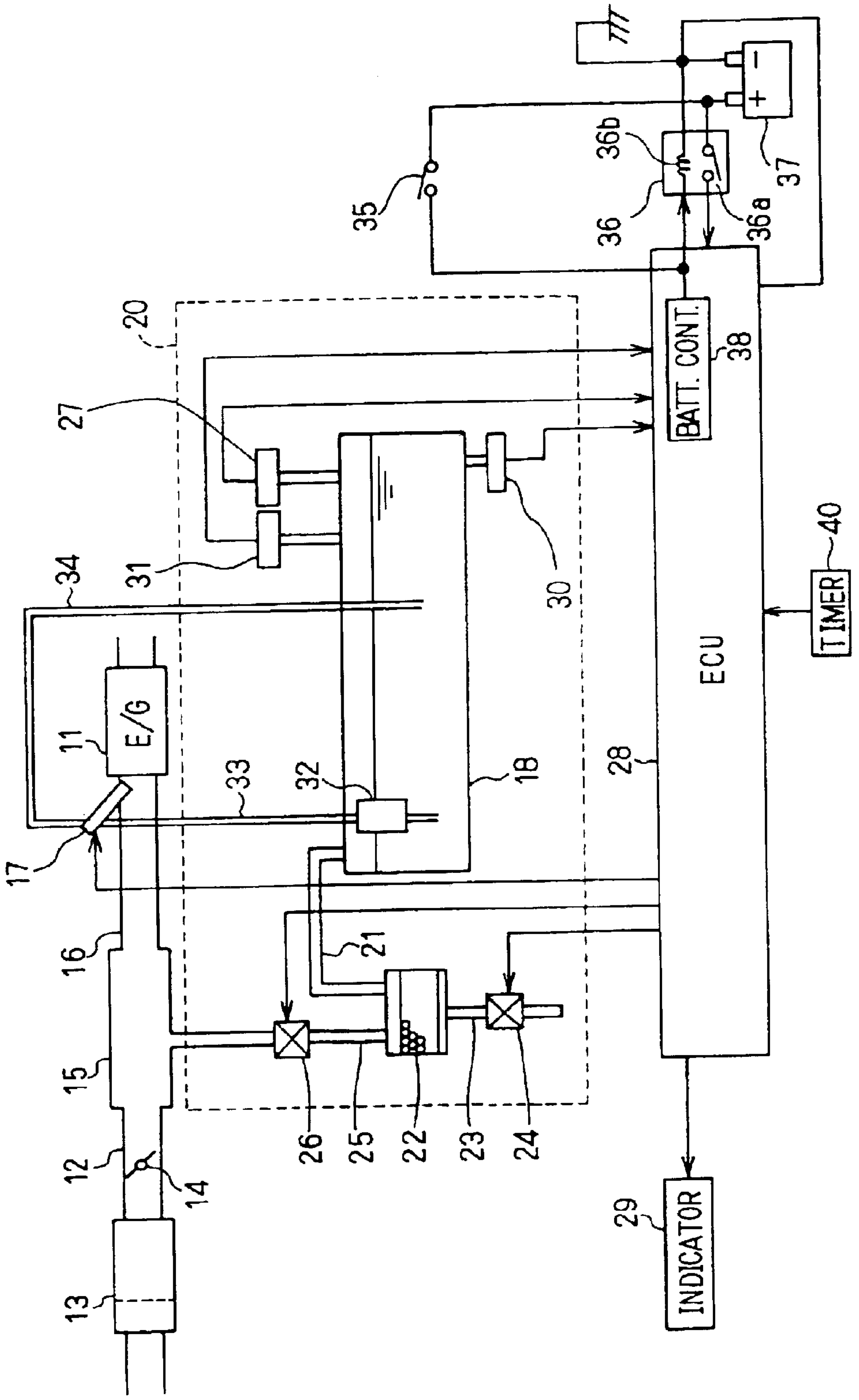
FIG. 9 is a block diagram showing a fuel-vapor-processing system in a second embodiment of the present invention.
Figure 10:
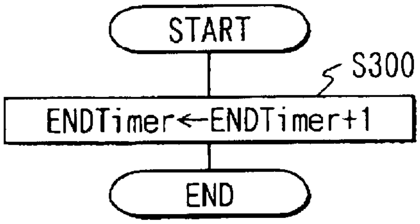
FIG. 10 shows a flowchart representing leak-check processing implemented by the second embodiment of the present invention.

FIG. 9 is a diagram showing the configuration of a system, which is implemented by this embodiment, in a simple and plain manner. The embodiment includes an additional leak-check-undone timer 40 for verifying the state of execution of the engine-stopped-state leak-check program. Unlike other components consuming power generated by the battery 37, the leak-check-undone timer 40 is driven by a small mount of power not generated by the battery 37. An example of the other components is the ECU 28. A flowchart shown in FIG. 10 represents count processing of the leak-check-undone timer 40. The count processing represented by this flowchart is carried out typically once 1 minute. At a step S300, a previous timer value ENDTimer is incremented by 1 and used as the present timer value ENDTimer. Then, the execution of processing represented by this routine is ended.

Figure 11:
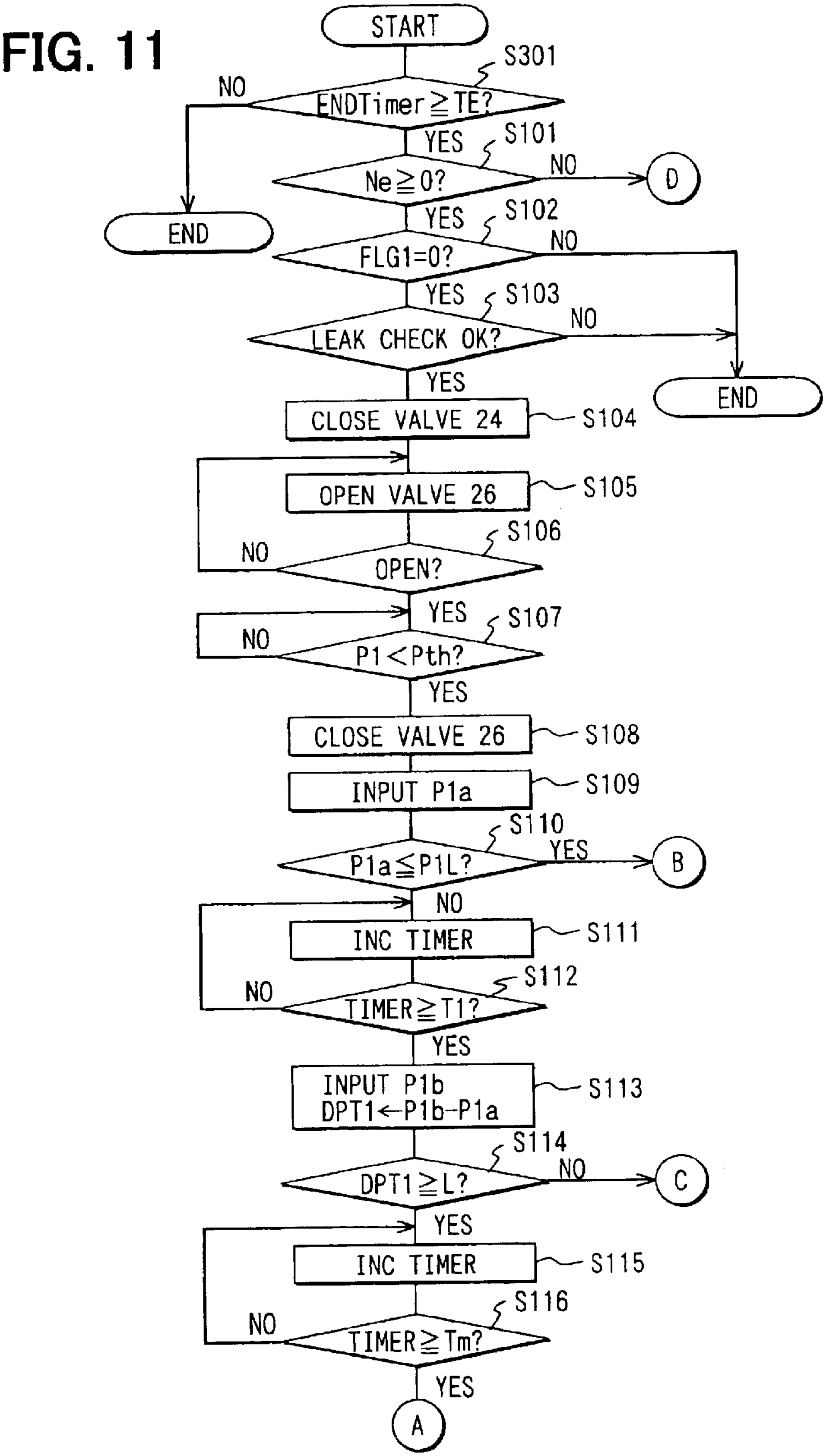
FIG. 11 shows another flowchart representing leak-check processing implemented by the second embodiment of the present invention.
Figure 12:
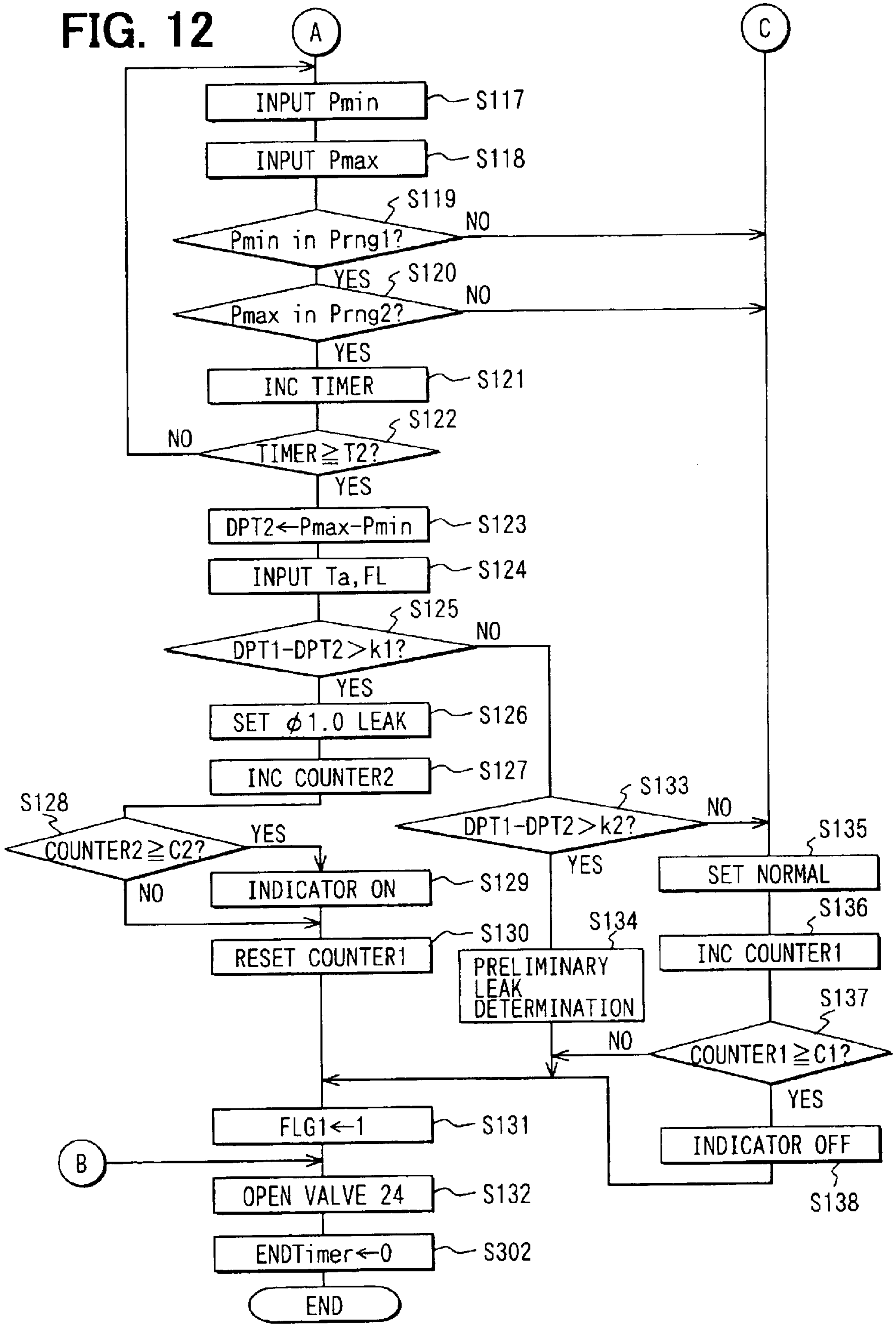
FIG. 12 shows a continuation flowchart representing the leak-check processing implemented by the second embodiment of the present invention.
Figure 13:
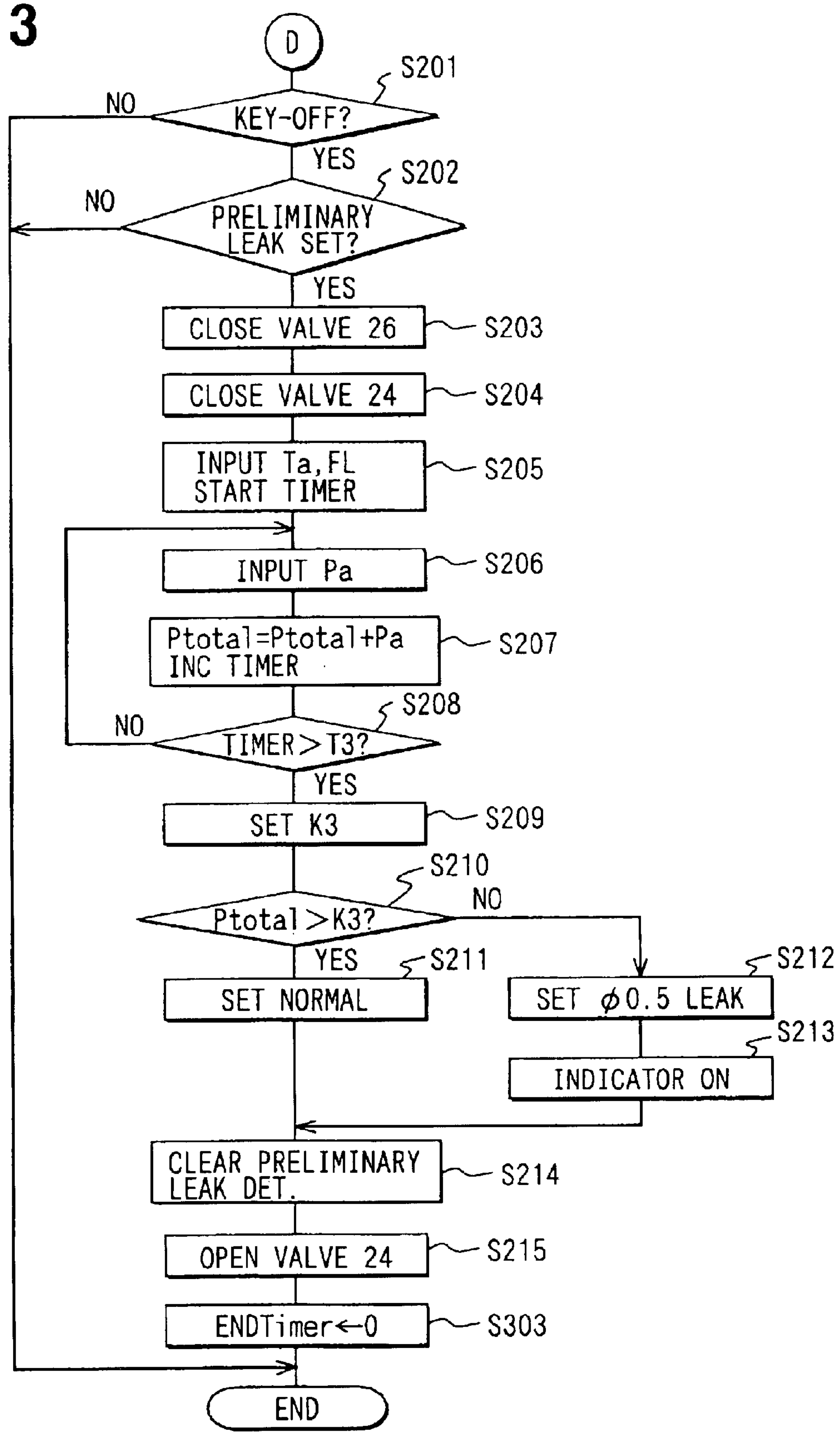
FIG. 13 shows another continuation flowchart representing the leak-check processing implemented by the second embodiment of the present invention.

By referring to flowcharts shown in FIGS. 11 to 13, the following description explains an engine-running-state leak-check program and an engine-stopped-state leak-check program, which are executed by resorting to the leak-check-undone timer 40. At a step S301, the timer value ENDTimer is examined to determine whether the timer value ENDTimer is at least equal to a predetermined value TE. Examples of the predetermined value TE are 24 hours and 1 week. TE is set at different values in dependence on the purpose of the execution of the programs. If the timer value ENDTimer is found smaller than the predetermined value TE, the execution of this routine is ended without executing the negative-pressure monitor program as the engine-running-state leak-check program. If the timer value ENDTimer is found at least equal to the predetermined value TE, on the other hand, the processing is continued as is the case with the first embodiment.

In this embodiment, at the last step S302 of the negative-pressure monitor program, the timer value ENDTimer is reset at 0 before the execution of the negative-pressure monitor program is ended.

Also at the last step S303 of the tank-internal-pressure monitor program, the timer value ENDTimer is reset at 0 before the execution of the tank-internal-pressure monitor program is ended.

In this embodiment, in order to reduce the consumption of power generated by the battery 37 in a stopped state of the engine due to the use of the ECU 28, the frequency at which the tank-internal-pressure monitor program is executed in the stopped state of the engine is controlled by using the leak-check-undone timer 40 As described above. In this way, each time the engine is stopped, the tank-internal-pressure monitor program is prevented from being activated. As a result, it is possible to reduce the amount of power consumed in a stopped state of the engine.

In this embodiment, functions of a first leak-check-allowing timer are represented by the steps S300, S301, S302 and S303.

Third Embodiment

In the first and second embodiments, the tank-internal-pressure monitor program is executed in order to restore the normal state. For this reason, it is feared that the ECU 28 inevitably consumes power generated by the battery 37.

In order to solve this problem, in this embodiment, only the negative-pressure monitor program executed in the running state of the engine determines the state of the normal-state restoration for the purpose of reducing the amount of power consumed in a stopped state of the engine 11.

Figure 14:
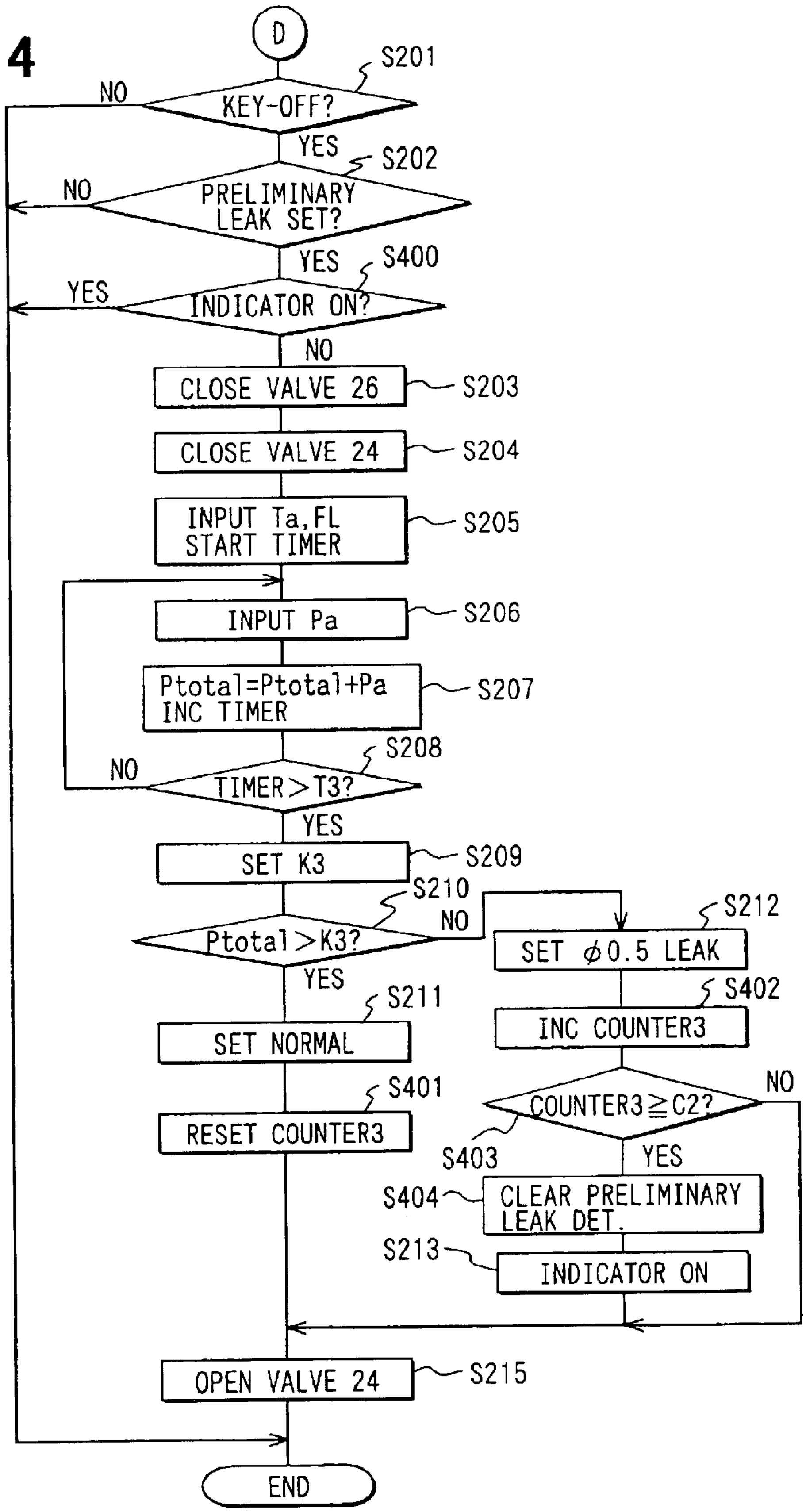
FIG. 14 shows a flowchart representing leak-check processing implemented by a third embodiment of the present invention.

FIG. 14 is a flowchart representing the tank-internal-pressure monitor program provided by this embodiment. At a step S400, the indicator 29 is examined to determine whether the indicator 29 has been turned on due to a leak through a hole with a diameter of about 0.5 or 1.0 mm. If the indicator 29 has been turned on, by consideration of the power consumption by the ECU 28, the execution of this routine is ended without executing the tank-internal-pressure monitor program. If the indicator 29 has not been tuned on, on the other hand, processing of a step S203 and subsequent steps is carried out in order to implement leak-check processing by execution of the tank-internal-pressure monitor program. Then, at the next step S401, the contents of counter 3 for counting the number of 0.5 mm-diameter leaks are reset at 0.

At a step S402, the contents of counter 3 are incremented by 1 before the flow of the routine goes on to a step S403. At the step S403, the contents of counter 3 are examined to determine whether the contents have exceeded the predetermined value C2. If the contents of counter 3 have not exceeded the predetermined value C2, the flow of the routine bypasses steps S404 and S213, going on to a step S215. If the contents of counter 3 have exceeded the predetermined value C2, on the other hand, the flow of the routine goes on to the step S404 at which the preliminary leak determination is invalidated. The flow of the routine then goes on to the step S213. At the step S213, the indicator 29 is turned on. Then, at the next step S215, the canister valve 24 is opened before the execution of this routine is ended.

As described above, in this embodiment, the execution of the tank-internal-pressure monitor program is avoided when the indicator 29 is ON. Thus, the mount of power consumed by the ECU 28 activated in a stopped state of the engine can be reduced.

In this embodiment, the processing carried out at the step S400 of the flowchart shown in FIG. 14 is determination processing to implement determination of a normal state in the fuel-vapor-processing system by only the engine-running-state leak-check means in the case of a leak detected by the engine-stopped-state leak-check means described above.

Fourth Embodiment

When the timer ENDTimer is greater than a predetermined value TE1, which is greater than the predetermined value TE used in the second embodiment, the execution condition is made more lenient in order to make the leak-check program more apt to execution.

Figure 15:
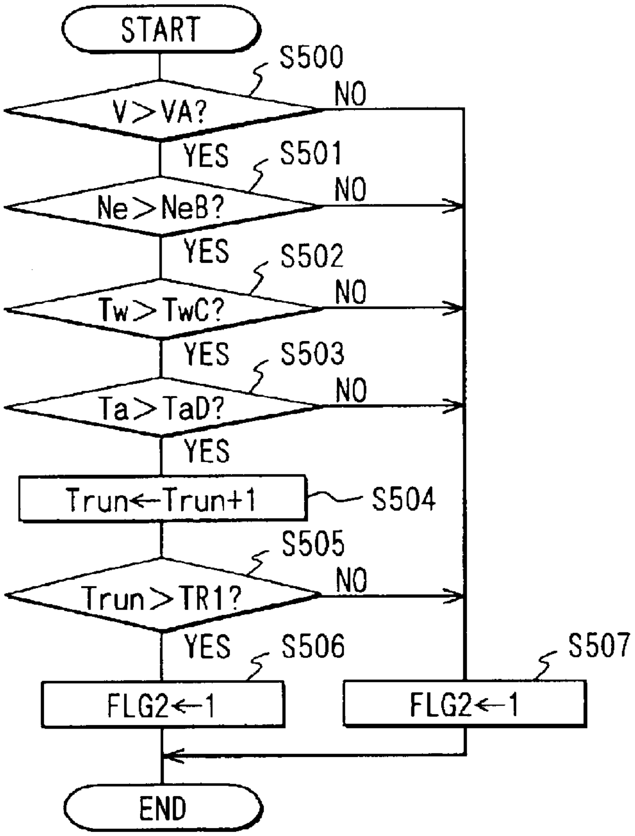
FIG. 15 shows a flowchart representing leak-check processing implemented by a fourth embodiment of the present invention.

FIG. 15 shows a flowchart representing processing to determine whether conditions for execution of the tank-internal-pressure monitor program are satisfied and to set a leak-check-allowing flag FLG2 allowing the tank-internal-pressure monitor program to be executed on the basis of a result of the determination. At a step S500, the vehicle speed V detected by a car-speed sensor or the like is examined to determine whether the speed V is at least equal to a predetermined value VA. The car-speed sensor itself is shown in none of the figures. At a step S501, the revolution speed Ne of the engine is examined to determine whether the engine's speed Ne is at least equal to a predetermined value NeB. At a step S502, the temperature Tw of the cooling water is examined to determine whether the cooling water's temperature Tw is at least equal to a predetermined value TwC. At a step S503, the internal temperature Ta of the fuel tank is examined to determine whether the internal temperature Ta is at least equal to a predetermined value TaD. If all the conditions are satisfied, the flow of the routine goes on to a step S504.

At the step S504, a continuation timer Trun is incremented by 1 and then the flow of the routine goes on to a step S505. The continuation timer Trun is a timer for counting the number of states in which the operating conditions of the steps S500 to S503 are satisfied. At the step S505, the continuation timer Trun is examined to determine whether the timer Trun has exceeded a predetermined value TR1. If the continuation timer Trun has exceeded the predetermined value TR1, the flow of the routine goes on to a step S506 at which the leak-check-allowing flag FLG2 is set at 1 to allow the tank-internal-pressure monitor program to be executed. Then, the execution of the routine is ended. If any one of the operating conditions of the steps S500 to S503 is not satisfied or the continuation timer Trun is found equal to or smaller than the predetermined value TR1 at the step S505, on the other hand, the flow of the routine goes on to a step S507 at which the leak-check-allowing flag FLG2 is reset to 0. Then, the execution of the routine is ended.

In this way, in the flowchart shown in FIG. 15, from the engine-running-state history of the engine 11, the leak-check-allowing flag FLG2 may be set to indicate that the conditions for execution of the tank-internal-pressure monitor program as a leak-check program are satisfied.

Figure 16:
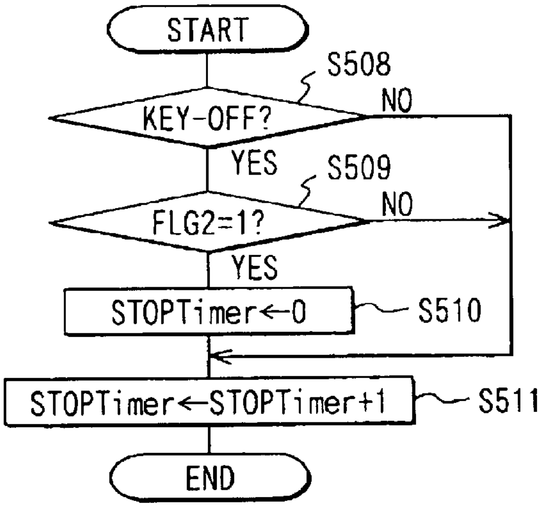
FIG. 16 shows another flowchart representing leak-check processing implemented by the fourth embodiment of the present invention.

A flowchart shown in FIG. 16 represents processing to set a post-leak-check-end timer STOPTimer for terminating the leak-check processing by execution of the tank-internal-pressure monitor program. At a step S508 of the flowchart shown in FIG. 16, the ignition switch 35 is examined to determine whether the switch 35 has been turned off. At a step S509, the leak-check-allowing flag FLG2 is examined to determine whether the leak-check-allowing flag FLG2 has been set at 1. As described above, the leak-check-allowing flag FLG2 is set at 1 or reset to 0 at the step S506 or S507 respectively of the flowchart shown in FIG. 15. If the leak-check-allowing flag FLG2 is set at 1, the flow of the routine goes on to a step S510 at which the post-leak-check-end timer STOPTimer is reset to 0. Then, the flow of the routine goes on to a step S511. If the ignition switch 35 has not been turned off or if the leak-check-allowing flag FLG2 has not been set at 1, on the other hand, the flow of the routine goes on to the step S511 at which the post-leak-check-end timer STOPTimer is incremented by 1. Finally, the execution of this routine is ended.

Figure 17:
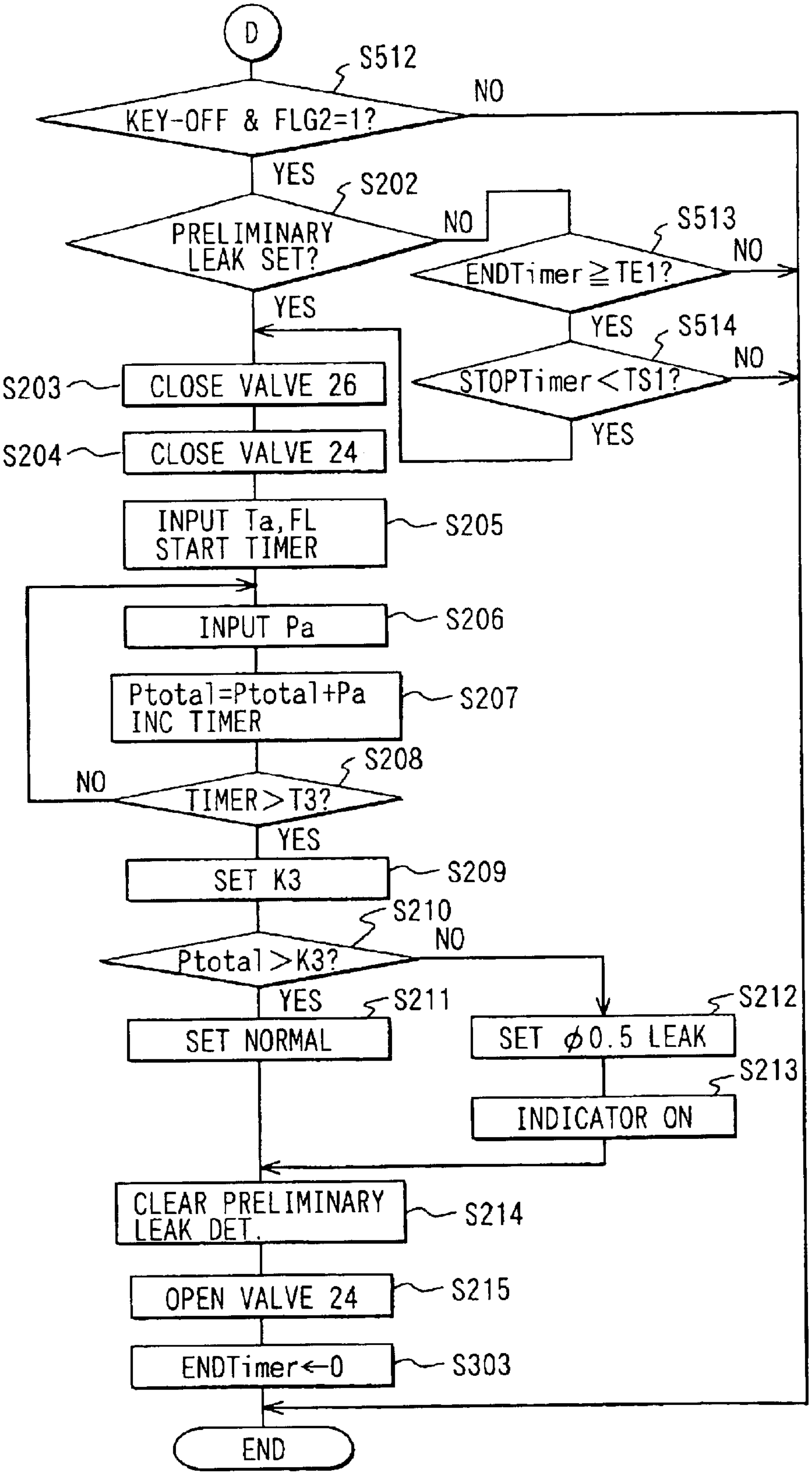
FIG. 17 shows a further flowchart representing leak-check processing implemented by the fourth embodiment of the present invention.

FIG. 17 shows an explanatory flowchart representing the tank-internal-pressure monitor program. At a step S512, the ignition switch 35 is examined to determine whether the ignition switch 35 has been turned off and the leak-check-allowing flag FLG2 is examined to determine whether the leak-check-allowing flag FLG2 has been set at 1.

At a step S513, the timer ENDtimer is examined to determined whether the timer ENDtimer is greater than the predetermined value TE1. As described earlier, the timer ENDtimer is incremented by 1 in the processing represented by the flowchart shown in FIG. 10 for the second embodiment. Also as described earlier, the predetermined value TE1 is greater than the predetermined value TE used in the second embodiment. If the timer ENDtimer is found greater than the predetermined value TE1, the flow of the processing goes on to a step S514. At the step S514, the timer STOPTimer is examined to determine whether the timer STOPTimer is equal to or smaller than a predetermined value TS1. As described above, the timer STOPTimer is manipulated by processing represented by the flowchart shown in FIG. 16. If the timer STOPTimer is found equal to or smaller than the predetermined value TS1, the flow of the routine goes on to a step S203. If any one of the conditions of the steps S513 and S514 is not satisfied, the execution of this routine is terminated without invoking the tank-internal-pressure monitor program. Typically, the predetermined value TE1 is set at 1 week and the predetermined value TS1 is set at 30 minutes.

As described above, as an operating history in a running state of the engine 11, if the conditions of the steps S500 to S503 and the condition requiring that the timer ENDTimer must be at least equal to the predetermined value TE1 are satisfied, the tank-internal-pressure monitor program is executed even if the processing to check a leak through a hole with a diameter of about 0.5 mm is not carried out. In this way, if the processing to check a leak in the fuel-vapor-processing system is not carried out even after the lapse of a predetermined time, the tank-internal-pressure monitor program can be executed forcibly.

In this embodiment, a function of a second leak-check-allowing timer is represented by the flowchart shown in FIG. 15.

Fifth Embodiment

Figure 18:
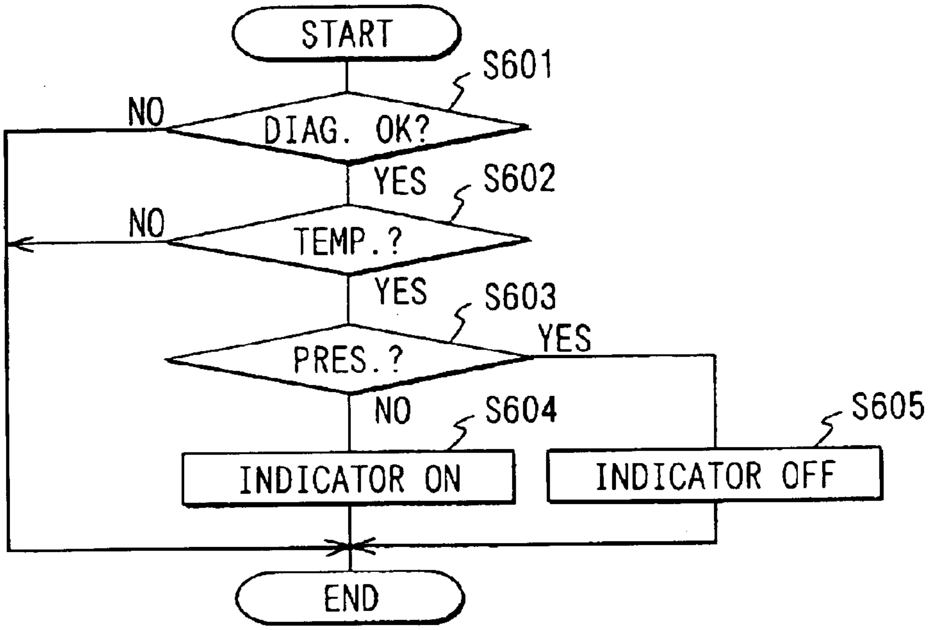
FIG. 18 shows a flowchart representing leak-check processing implemented by a fifth embodiment of the present invention.

In this embodiment, the tank-internal-pressure monitor program adopts a method of determining a leak in the fuel-vapor-processing system on the basis of a temperature and a pressure, which are detected after the engine 11 has put in a stopped state. The tank-internal-pressure monitor program of this embodiment is explained by referring to a flowchart shown in FIG. 18. At a step S601, conditions for execution of the tank-internal-pressure monitor program are examined to determine whether the conditions are satisfied. The conditions for execution of the tank-internal-pressure monitor program include a fuel temperature higher than a predetermined value and an ambient temperature lower than a predetermined value. As for the running history, it is possible to apply, among others, conditions of a running time longer than a predetermined value and a cumulative value of the engine revolution speed Ne greater than a predetermined value. If any one of the conditions for execution of the tank-internal-pressure monitor program is not satisfied, the execution of this routine is ended without doing anything.

If the conditions for execution of the tank-internal-pressure monitor program are satisfied, the flow of the routine goes on to a step S602 to carry out processing of this step and the subsequent steps in order to execute the tank-internal-pressure monitor program of this embodiment. First of all, at the step S602, the temperature Ta of fuel in the fuel tank 18 is examined to determine whether the temperature Ta is at least equal to a predetermined value. If the temperature Ta of fuel in the fuel tank 18 is found equal to or lower than the predetermined value, the execution of this routine is ended without doing anything because the temperature switch has not been set.

If the temperature Ta of fuel in the fuel tank 18 is found equal to or higher than the predetermined value, on the other hand, the flow of the routine goes on to a step S603 provided that the temperature switch has been set. At the step S603, a pressure switch is examined to determine whether the switch has been set. The pressure switch is set if a tank-internal-pressure Pa detected by the tank-internal-pressure sensor 27 exceeds a predetermined value. A set state of the pressure switch indicates that there is no leak in the fuel-vapor-processing system. In this case, the flow of the routine goes on to a step S605 at which the indicator 29 is turned off. On the other hand, a reset state of the pressure switch indicates that there is a leak in the fuel-vapor-processing system. In this case, the flow of the routine goes on to a step S604 at which the indicator 29 is turned on.

As described above, the tank-internal-pressure monitor program of this embodiment checks a leak in the fuel-vapor-processing system by detecting a temperature and a pressure. Such a tank-internal-pressure monitor program can also be used in the first to fourth embodiments.

Sixth Embodiment

Figure 19:
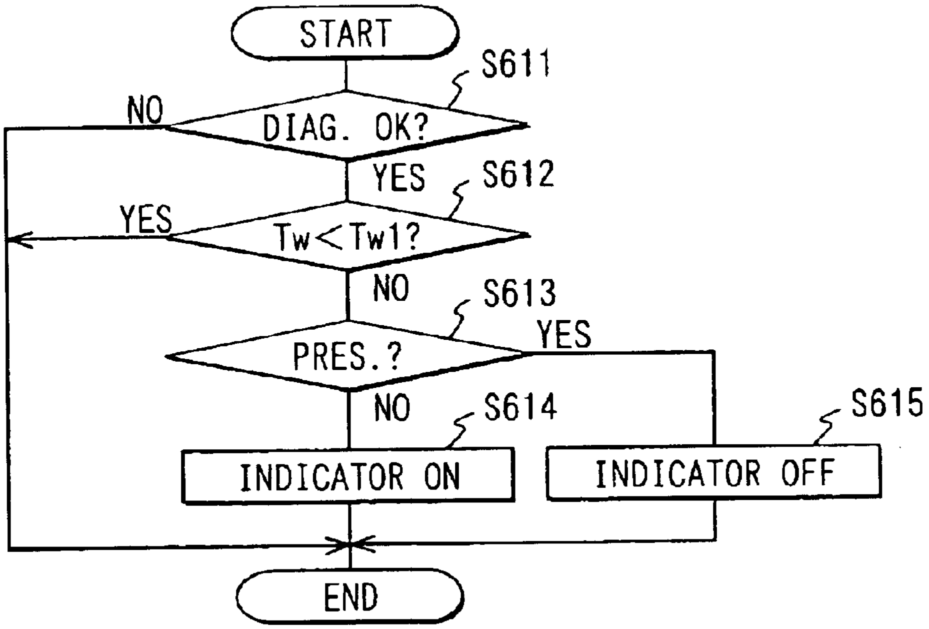
FIG. 19 shows a flowchart representing leak-check processing implemented by a sixth embodiment of the present invention.

A tank-internal-pressure monitor program of this embodiment is explained by referring to a flowchart shown in FIG. 19.

The flowchart begins with a step S611 to determine whether conditions for execution of the tank-internal-pressure monitor program are satisfied. The conditions for execution of the tank-internal-pressure monitor program include a fuel temperature higher than a predetermined value and an ambient temperature lower than a predetermined value. As for the running history, it is possible to apply, among others, conditions of a running time longer than a predetermined value and a cumulative value of the engine revolution speed Ne greater than a predetermined value. If any one of the conditions for execution of the tank-internal-pressure monitor program is not satisfied, the execution of this routine is ended without doing anything.

If the conditions for execution of the tank-internal-pressure monitor program are satisfied, the flow of the routine goes on to a step S612 to carry out processing of this step and the subsequent steps in order to execute the tank-internal-pressure monitor program of this embodiment. At the step S612, the cooling-water temperature Tw, which is the temperature of the cooling water of the engine 11, is examined to determine whether the temperature Tw is lower than a predetermined value Tw1. If the cooling-water temperature Tw is found lower than the predetermined value Tw1, the execution of this routine is ended without doing anything. If the cooling-water temperature Tw is found at least equal to the predetermined value Tw1, on the other hand, the flow of the routine goes on to a step S613. At the step S613, the pressure switch is examined to determine whether the switch has been set. The pressure switch is set if a tank-internal-pressure Pa detected by the tank-internal-pressure sensor 27 exceeds a predetermined value. A set state of the pressure switch indicates that there is no leak in the fuel-vapor-processing system. In this case, the flow of the routine goes on to a step S615 at which the indicator 29 is turned off. On the other hand, a reset state of the pressure switch indicates that there is a leak in the fuel-vapor-processing system. In this case, the flow of the routine goes on to a step S614 at which the indicator 29 is turned on.

As described above, the tank-internal-pressure monitor program of this embodiment checks a leak in the fuel-vapor-processing system by detecting a cooling-water temperature Tw of the engine 11 in place of a tank internal temperature Ta in the fifth embodiment. Such a tank-internal-pressure monitor program can also be used in the first to fourth embodiments.

It is to be noted that, as an alternative, the internal pressure of the fuel tank is raised to a predetermined level by using a pressure-applying pump, the internal pressure of the fuel tank is monitored and then processing to check a leak in the fuel-vapor-processing system is carried out on the basis of the monitored internal pressure.

Seventh Embodiment

Figure 20:
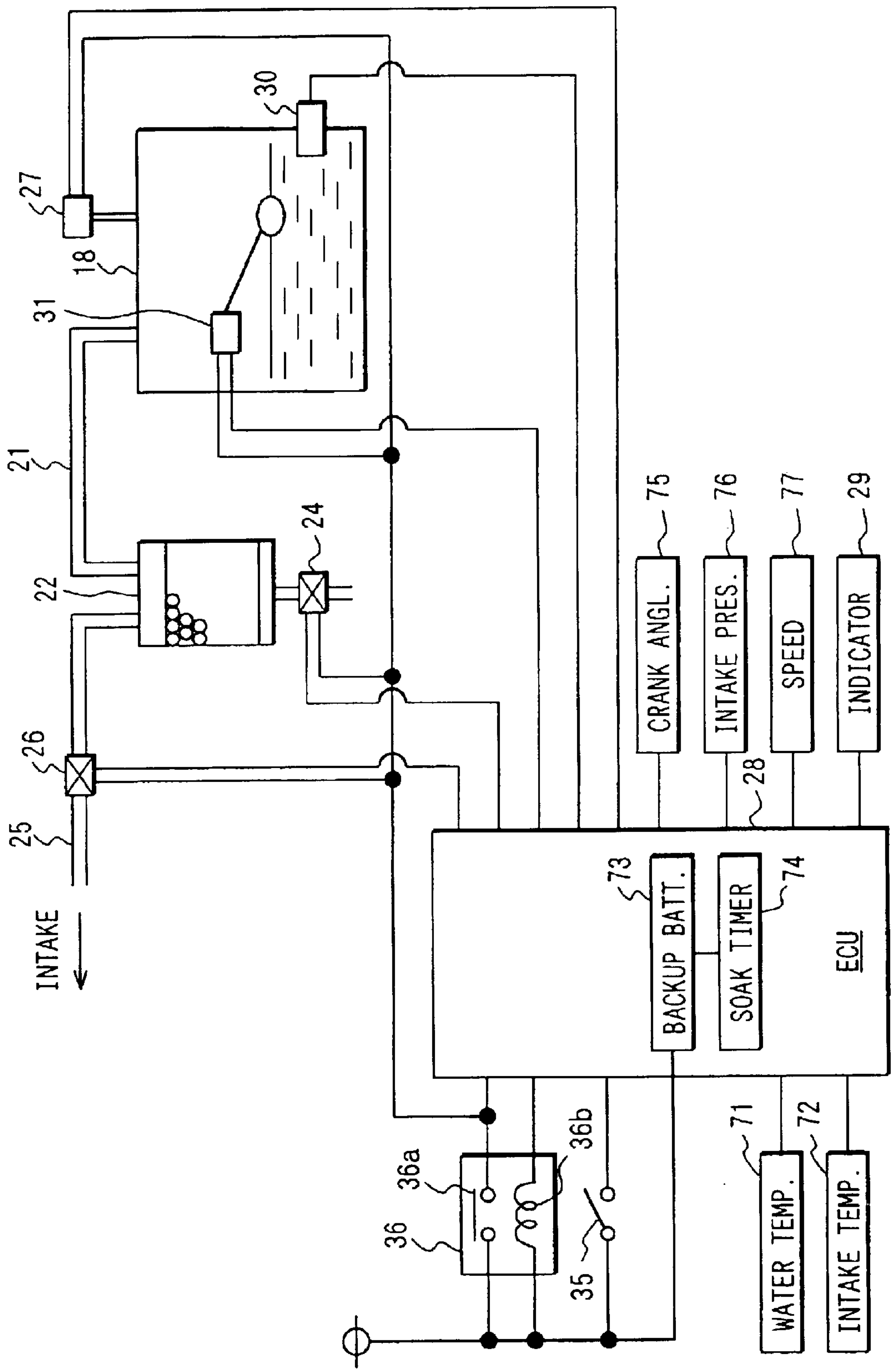
FIG. 20 is a block diagram showing a fuel-vapor-processing system in a seventh embodiment of the present invention.

FIG. 20 is a diagram showing the configuration of a seventh embodiment. As shown in the figure, the seventh embodiment includes a water-temperature sensor 71 and an intake-air-temperature sensor 72. The ECU 28 has an embedded backup battery 73. The ECU 28 also includes an embedded soak timer 74 driven to operated by backup battery 73. After the engine is put in a stopped state, that is, after the ignition switch 35 is turned off, the soak timer 74 begins a counting operation to measure the lapse of time since the start of the sopped state. A crank-angle sensor 75 detects the rotation speed Ne of the engine. An intake-pressure sensor 76 detects the pressure of intake air. A speed sensor 77 detects the speed of the vehicle.

Figure 23:
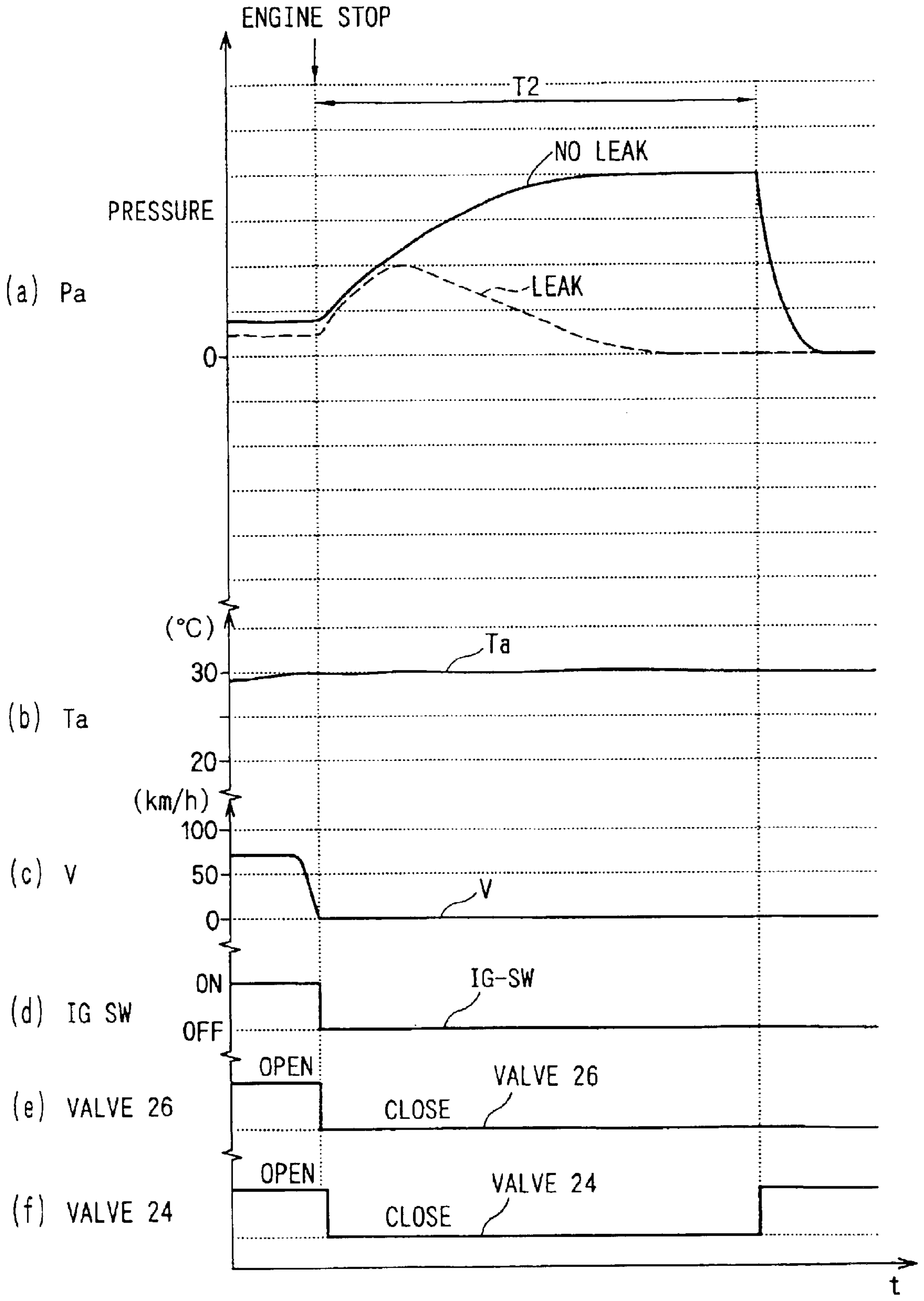
FIG. 23 shows time charts of leak-check operations according to the seventh embodiment of the present invention.

By referring to FIGS. 23 to 26, the following description explains a technique to check a leak after the running state of the engine is stopped. As shown in FIG. 23, after the engine is put in a stopped state, that is, after the ignition switch 35 is turned off, the purge valve 26 and the canister valve 24 are closed to hermetically seal the fuel-vapor-processing system. Right after the engine is put in a stopped state, the temperature of the exhaust system is high. Thus, the temperature of fuel in the fuel tank 18 is sustained by heat dissipated by the exhaust system at a level making evaporation gas easy to generate. Accordingly, since the amount of generated evaporation gas rises, the increase in pressure in the fuel-vapor-processing system, that is, the tank-pressure increase caused by the generation of the evaporation gas, also rises as well provided that there is no leak in the fuel-vapor-processing system, which has been hermetically sealed after the engine is put in a stopped state.

If there is a leak in the fuel-vapor-processing system even if the fuel-vapor-processing system is hermetically sealed, on the other hand, evaporation gas leaks to outside air through a leak hole of the fuel-vapor-processing system so that the increase in pressure in the fuel-vapor-processing system, that is, the increase in tank pressure, becomes smaller. As a result, the internal pressure of the fuel tank drops to a level close to the atmospheric pressure in a relatively short period of time.

Figure 24:
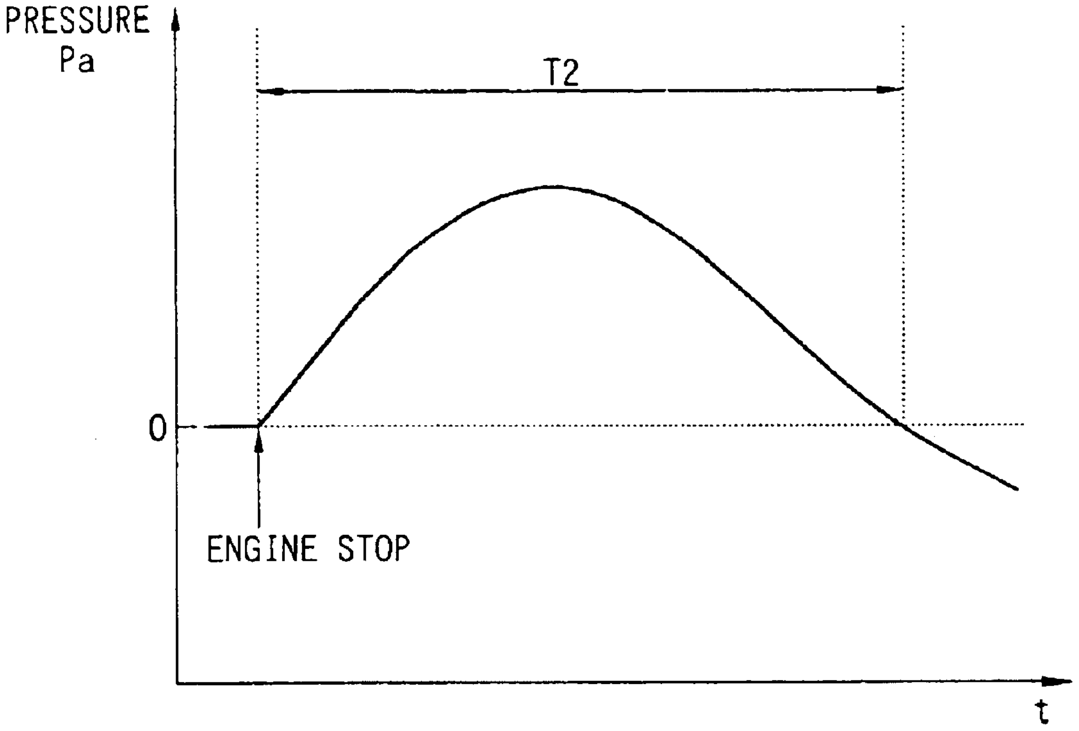
FIG. 24 is a diagram showing a graph representing a leak-check period in the seventh embodiment of the present invention.
Figure 25:
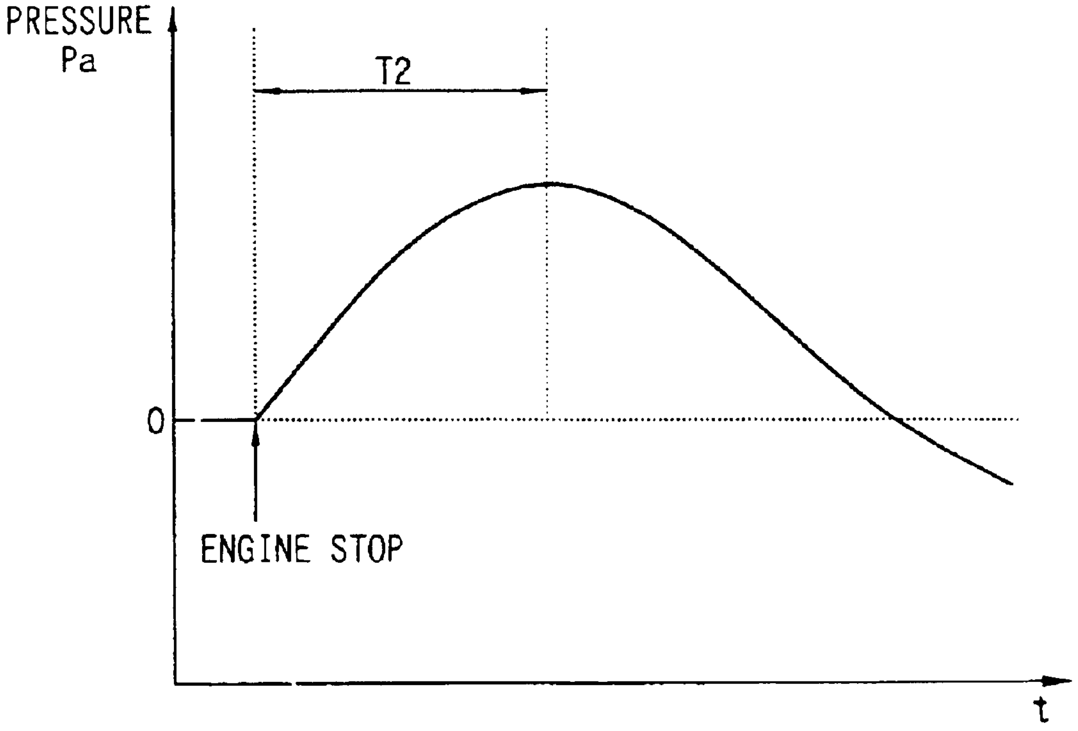
FIG. 25 is a diagram showing another graph representing a leak-check period in the seventh embodiment of the present invention.

The hermetically sealed state of the fuel-vapor-processing system is sustained during the leak-check period T2. As shown in FIG. 24, the length of the leak-check period T2 is set at a value equal to a period during which the tank-internal-pressure after the start of the stopped state of the engine in a no-leak condition is positive, or a value smaller than the length of the period of such a positive internal pressure. As an alternative, the length of the leak-check period T2 can be set at a value equal to a period during which the tank-internal-pressure after the start of the stopped state of the engine in a no-leak condition is increasing to a maximum, or a value smaller than the length of the period of such a rising internal pressure as shown in FIG. 25.

In this embodiment, in order to numerically express changes in tank-internal-pressure in a leak-check period, the tank-internal-pressure detected by the tank-internal-pressure sensor 27 during the leak-check period as a gauge pressure relative to the atmospheric pressure is cumulated during a predetermined processing period. At the end of the leak-check processing, the cumulated value of the tank-internal-pressure is compared with a leak criterion value to determine whether a leak exists. In this case, a gauge pressure relative to the atmospheric pressure is a pressure measured with the atmospheric pressure taken as a reference, that is, a difference obtained as a result of subtracting the atmospheric pressure from an absolute pressure (absolute pressure−atmospheric pressure).

Figure 26:
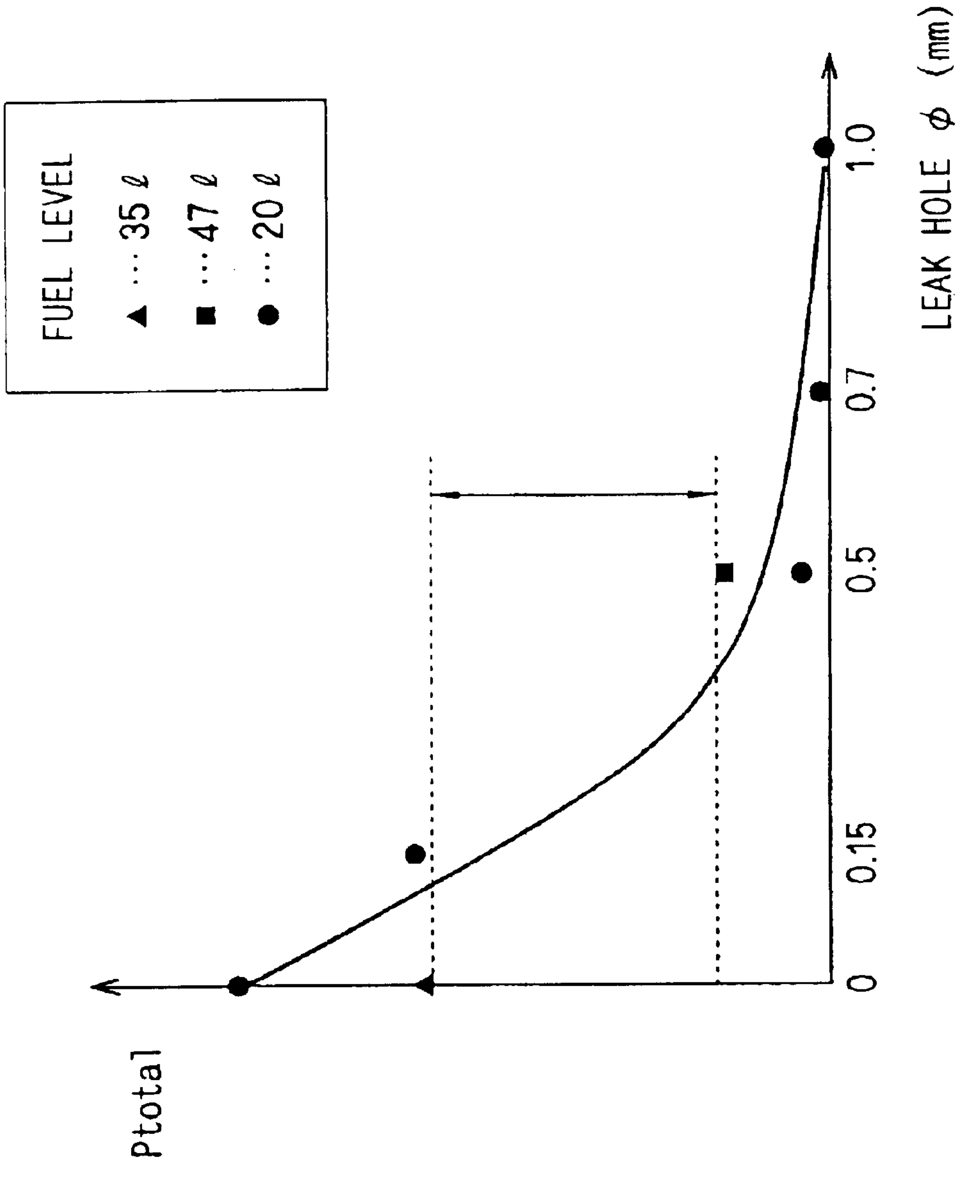
FIG. 26 is a diagram showing a graph representing leak criteria used in the seventh embodiment of the present invention.

FIG. 26 is a diagram showing a graph showing a relation among the cumulative value of the tank-internal-pressure, the diameter of the leak hole and the amount of residual fuel FL in the fuel tank 18. The graph is obtained as a result of measurement. In the case of an infinitesimal leak through a hole with a diameter of 0.15 mm, the cumulative values of the tank-internal-pressure are within a range of variations in tank-internal-pressure cumulative value measured for a no-leak case. It is thus necessary to consider quantities such as the residual fuel left in order to detect an infinitesimal leak through a hole with a diameter of 0.15 mm.

On the other hand, the upper limit of a range of tank-internal-pressure cumulative value variations measured for leaks through holes with a diameter greater than 0.5 mm is completely separated away from the lower limit of a range of tank-internal-pressure cumulative value variations measured for the no-leak case. Thus, in order to detect an infinitesimal leak through a hole with a diameter of at least 0.5 mm, it is necessary to merely set a leak criterion value in a range between the upper limit of a range of tank-internal-pressure cumulative value variations measured for leaks through holes with a diameter greater than 0.5 mm and the lower limit of a range of tank-internal-pressure cumulative value variations measured for the no-leak case. It is desirable to set the leak criterion value in the middle of the range between the upper and lower limits. By providing such a leak criterion value, it is possible to determine the existence of a leak through a hole with a diameter of at least 0.5 mm with a high degree of precision without being affected by the amount of residual fuel. In detail, if the cumulative value of the tank-internal-pressure is smaller than the leak criterion value, a leak through a hole with a diameter of at least 0.5 mm is determined to exist. If the cumulative value of the tank-internal-pressure is greater than the leak criterion value, on the other hand, no leak is determined to exist in the fuel-vapor-processing system.

Figure 21:
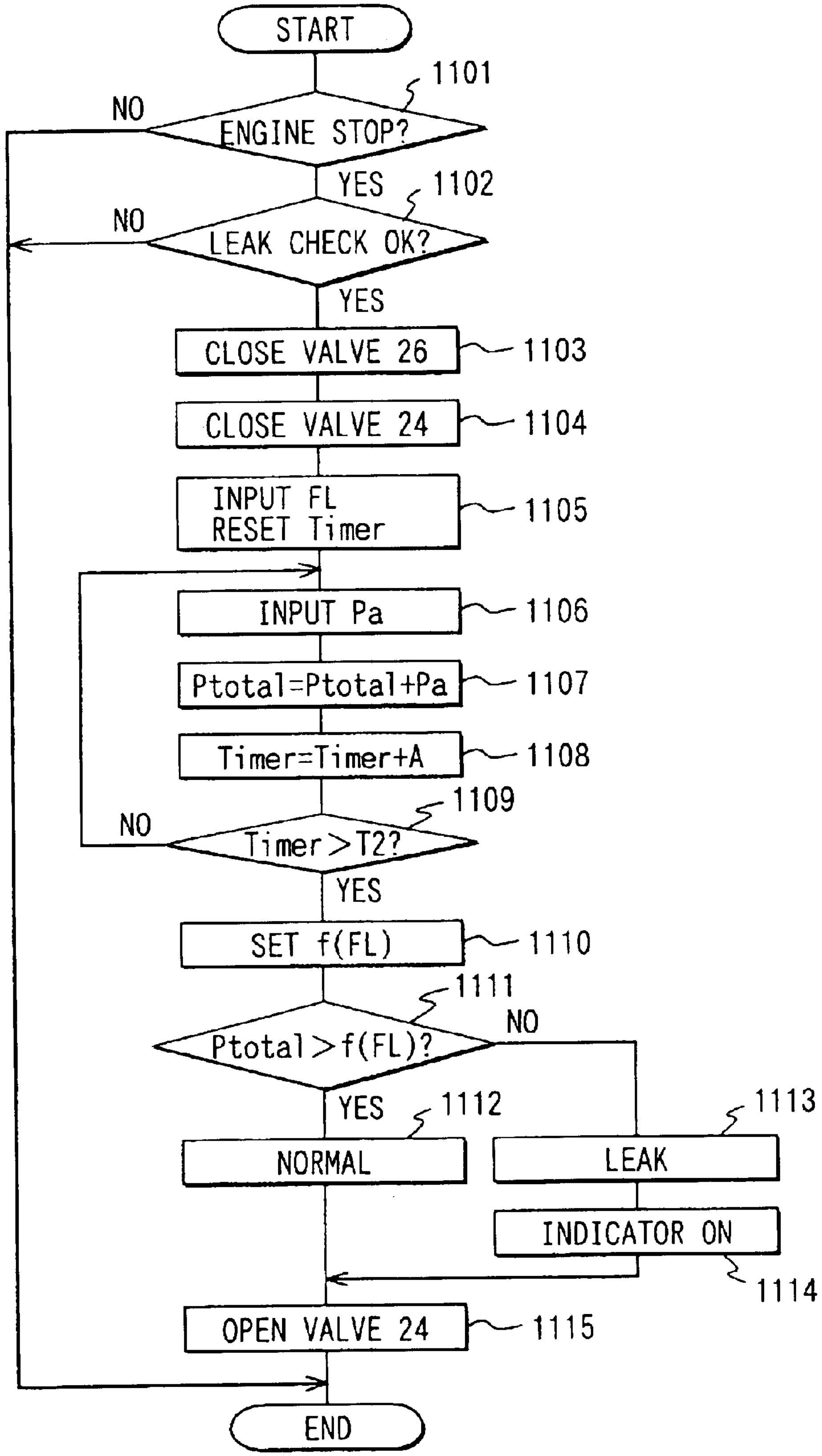
FIG. 21 shows a flowchart representing leak-check processing implemented by the seventh embodiment of the present invention.

The processing to check a leak in the fuel-vapor-processing system described above is carried out by execution of a leak-check routine represented by a flowchart shown in FIG. 21. The leak-check routine represented by the flowchart shown in FIG. 21 is executed periodically while power is being supplied to the ECU 28 in the ON state of the main relay 36 to carry out the processing to check a leak in the fuel-vapor-processing system after the engine is put in a stopped state as follows. First of all, when this routine is invoked, at the first step 1101, the state of the engine is examined to determine whether the state is a stopped state. If the engine is in a running state, the execution of this routine is ended without carrying out processing of the subsequent steps.

If the result of determination obtained at the step 1101 indicates that the engine has been put in a stopped state, on the other hand, the flow of the routine goes on to a step 1102 to determine whether a condition for execution of the leak-check processing is satisfied. An example of the condition for execution of the leak-check processing is a higher fuel temperature detected by a fuel-temperature sensor 30 than a predetermined temperature at which evaporation gas is easy to generate. If the fuel temperature is higher than the predetermined temperature, the condition for execution of the leak-check processing is determined to be satisfied.

That is, in order to carry out the processing to check a leak in the fuel-vapor-processing system after the engine is put in a stopped state, it is necessary to provide an environment in which the internal pressure of the fuel tank increases to a certain degree due to generation of evaporation gas in the case of no leak. For this reason, it is necessary to have the temperature of the fuel rise to a certain degree. If the leak-check processing is carried out with a small amount of generated evaporation gas, the internal pressure of the fuel tank increases only slightly so that a difference in tank-internal-pressure between a case of a leak and a case of no leak is also small as well, making it difficult to distinguish a case of a leak and a case of no leak from each other with a high degree of precision. Thus, by determining whether the temperature of the fuel is higher than a predetermined value to determine whether the condition for the execution of the leak-check processing is satisfied, the leak-check processing can be carried out only in evaporation gas generation state in which the difference in tank-internal-pressure between a case of a leak and a case of no leak appears obviously. As a result, the degree of precision with which the leak-check processing is carried out can be increased. The processing of the step 1102 is carried out in order to play the role of a means for determining whether the condition for the execution of the leak-check processing is satisfied.

If the result of determination obtained at the step 1102 indicates that the condition for the execution of the leak-check processing is not satisfied due to the fact that the temperature of the fuel is lower than the predetermined value, the execution of this routine is ended without carrying out processing at subsequent steps. If the condition for the execution of the leak-check processing is determined to be satisfied due to the fact that the temperature of the fuel is at least equal to the predetermined value, on the other hand, the leak-check processing is carried out at a step 1103 and subsequent steps as follows. First of all, at the step 1103, the purge valve 26 is closed. Then, at the next step 1104, the canister valve 24 is closed to hermetically seal the fuel-vapor-processing system. The processing of the steps 1103 and 1104 is carried out in order to play the role of a hermetically closing means.

Later on, the flow of the routine goes on to a step 1105 at which a signal output by the fuel-level sensor 31 is input to detect the amount of residual fuel FL in the fuel tank 18, and a timer is reset. This timer is used for measuring the lapse of time since the start of the leak-check processing or the start of the operation to hermetically seal the fuel-vapor-processing system. Then, at the next step 1106, a signal output by the tank-internal-pressure sensor 27 is input to detect the present internal pressure Pa of the fuel tank. Subsequently, at the next step 1107, the present internal pressure Pa is added to the tank-internal-pressure's cumulative value Ptotal obtained so far to update the cumulative value Ptotal of the tank-internal-pressure. The internal pressure Pa of the fuel tank is detected as a gauge pressure with the atmospheric pressure taken as a reference. That is, the gauge pressure is a difference obtained as a result of subtracting the atmospheric pressure from an absolute pressure (absolute pressure−atmospheric pressure). Then, at the next step 1108, a processing period A is added to the previous value of the timer to update the count value of the timer.

Subsequently, the flow of the routine goes on to the next step 1109 to determine whether the count value of the timer has exceeded a predetermined value T2. As described earlier, the count value of the timer represents the lapse of time since the start of the leak-check processing. If the count value of the timer has not exceeded the predetermined value T2, the flow of the routine goes back to the step 1106. In this way, the processing to add the present internal pressure Pa to the tank-internal-pressure's cumulative value Ptotal obtained so far to update the cumulative value Ptotal of the tank-internal-pressure in the processing period is carried out repeatedly till the count value of the timer exceeds the predetermined value T2. It is to be noted that, as shown in FIG. 24, the predetermined value T2 is set at a value equal to a period during which the tank-internal-pressure after the start of the stopped state of the engine in a no-leak condition is positive, or a value smaller than the length of the period of such a positive internal pressure. As an alternative, the predetermined value T2 can be set at a value equal to a period during which the tank-internal-pressure after the start of the stopped state of the engine in a no-leak condition is increasing to a maximum, or a value smaller than the length of the period of such a rising internal pressure as shown in FIG. 25.

Later on, at a point of time the count value of the timer exceeds the predetermined value T2, the flow of the routine goes on to a step 1110 at which a leak criterion value f (FL) dependent on the present residual-fuel amount FL is fetched from a map of leak criterion values. The map of leak criterion values represents a relation between the leak criterion value and the residual-fuel amount FL serving as a parameter used for selecting a leak criterion value. In place of such a map, a formula can also be used for computing a leak criterion value from the present residual-fuel amount FL. Then, the flow of the routine goes on to a step 1111 at which the cumulative value Ptotal of the tank-internal-pressure is compared with the leak criterion value f (FL). If the cumulative value Ptotal of the tank-internal-pressure is found greater than the leak criterion value f (FL), the flow of the routine goes on to a step 1112 at which no leak is determined to exist in the fuel-vapor-processing system or the state of the fuel-vapor-processing system is determined to be normal. Subsequently, at the next step 1115, the canister valve 24 is opened before the leak-check processing is ended.

If the cumulative value Ptotal of the tank-internal-pressure is found equal to or smaller than the leak criterion value f (FL) at the step 1111, on the other hand, the flow of the routine goes on to a step 1113 at which a leak is determined to exist in the fuel-vapor-processing system or the state of the fuel-vapor-processing system is determined to be abnormal. Then, at the next step 1114, the indicator 29 is turned on to give the driver a warning and an abnormality code is stored in a backup RAM employed in the ECU 28. Subsequently, at the next step 1115, the canister valve 24 is opened before the leak-check processing is ended.

It is to be noted that the processing of the steps 1106 and 1115 is carried out in order to play the role of a leak-check means.

Figure 22:
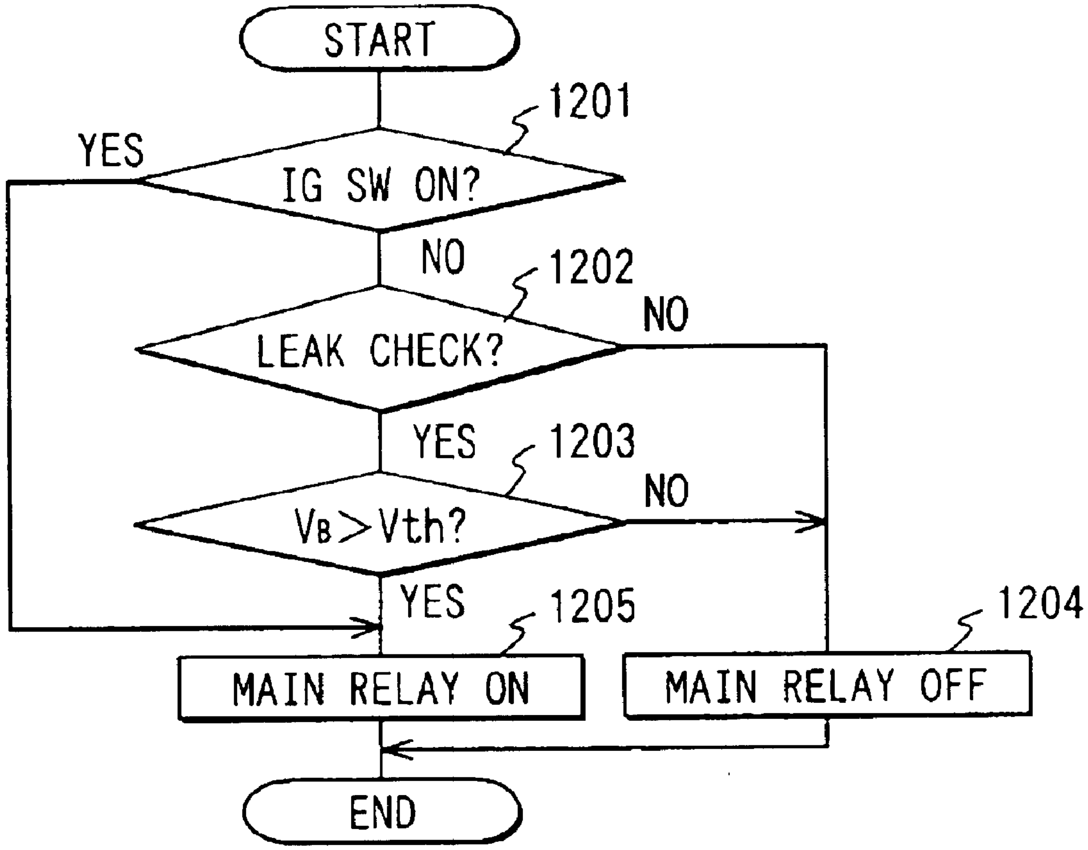
FIG. 22 shows another flowchart representing leak-check processing implemented by the seventh embodiment of the present invention.

On the other hand, a main-relay control routine represented by a flowchart shown in FIG. 22 is executed at predetermined intervals to control an operation to turn the main relay 36 on and off as follows. When this routine is invoked, the flowchart begins with a step 1201 to determine whether the ignition switch 35 has been turned on, that is, whether the engine is in a running state. In the following description, the ignition switch 35 is also referred to as an IG switch. If the ignition switch 35 has been turned on, that is, if the engine is in a running state, the flow of the routine goes on to a step 1205 at which the main relay 36 is sustained in the ON state to supply power to the ECU 28, the canister valve 24, the purge valve 26, the tank-internal-pressure sensor 27 and the fuel-level sensor 31.

Later, after a point of time the ignition switch 35 is changed from the ON state to an OFF state, the result of determination obtained at the step 1201 is a NO causing the flow of the routine to go on to a step 1202 to determine whether leak-check processing is being carried out by execution of the leak-check routine represented by the flowchart shown in FIG. 21. If such leak-check processing is not being carried out, the flow of this routine goes on to a step 1204 at which the main relay 36 is turned off to discontinue the supplying of power to the ECU 28, the canister valve 24, the purge valve 26, the tank-internal-pressure sensor 27 and the fuel-level sensor 31.

If the result of determination obtained at the step 1202 indicates that the leak-check processing is being carried out, on the other hand, the flow of this routine goes on to a step 1203 to determine whether the power-supply voltage Vb is higher than a predetermined voltage Vth, which is barely enough for assuring startability of the engine. If the power-supply voltage Vb is not higher than the predetermined voltage Vth, the flow of this routine goes on to the step 1204 at which the main relay 36 is turned off in spite of the fact that the leak-check processing is being carried out. The execution of the leak-check processing is thus terminated to discontinue the consumption of the power generated by the battery.

If the power-supply voltage Vb is found higher than the predetermined voltage Vth, on the other hand, the flow of this routine goes on to the step 1205 at which the main relay 36 is sustained in the ON state to continue the supplying of power to components required for continuation of the leak-check processing in spite of the fact that the ignition switch 35 has been turned off. The components required for continuation of the leak-check processing include the ECU 28 and the canister valve 24. Then, after this leak-check processing is ended, the result of determination obtained at the step 1202 becomes a NO, causing the flow of this routine goes on to a step 1204 at which the main relay 36 is turned off to discontinue the supplying of power to components such as the ECU 28 and the canister valve 24.

In the case of the embodiment described above, the tank-internal-pressure Pa detected by the tank-internal-pressure sensor 27 as a gauge pressure in a leak-check process period after an operation to stop the engine is cumulated over a processing period to update the cumulative value Ptotal of the tank-internal-pressure. At the end of the leak-end process, the cumulative value Ptotal of the tank-internal-pressure is compared with the leak criterion value f (FL) to determine whether a leak exists in the fuel-vapor-processing system. Thus, even if the temperature of the fuel increases only slightly after the engine is put in a stopped state, the leak-check processing can be carried out, allowing the frequency of the leak-check execution to be raised. As a result, a leak in the fuel-vapor-processing system can be detected at an early time.

In addition, in this embodiment, the fuel temperature detected by the fuel-temperature sensor 30 is examined to determine whether the fuel temperature is higher than a predetermined temperature at which evaporation gas is easy to generate. The execution of the leak-check processing is allowed or inhibited according to the result of the determination. That is, the leak-check processing is carried out only in evaporation gas's generation state in which there is an obvious difference in internal pressure between a case in which a leak exists and a case in which no leak exists. As a result, the degree of precision with which the leak-check processing is carried out can be raised.

It is to be noted that the temperature of fuel in the fuel tank 18 can also be estimated on the basis of the engine operating state prior to the stopped state or the engine running history prior to the stopped state. Main factors causing the temperature of fuel in the fuel tank 18 to rise include heat dissipated by the exhaust system and fuel returned from the fuel injection valve to the fuel tank 18. The amount of the dissipated heat and the amount of the returned fuel can be estimated from the engine operating state or the engine running history. Thus, the temperature of fuel in the fuel tank 18 can also be estimated on the basis of the engine operating state prior to the stopped state or the engine running history prior to the stopped state. As a result, since the fuel-temperature sensor 30 is not required, the low-cost requirement can be met.

Furthermore, in this embodiment, a leak criterion value f(FL) is set according to a residual-fuel amount FL detected by the fuel-level sensor 31. Thus, the leak criterion value can be properly varied to keep up with changes in tank-internal-pressure increase, which are caused by variations in residual-fuel amount FL. As a result, it is possible to carry out leak-check processing, the result of which is not affected by the residual-fuel amount FL.

It is to be noted that, instead of changing the leak criterion value, the cumulative value Ptotal of the tank-internal-pressure can be corrected by using a correction coefficient F(FL), which is dependent on the residual-fuel amount FL, typically according to the following equation:

$$Ptotal=Ptotal\times F(FL)$$

In addition, if the temperature of fuel rises, increasing the amount of generated evaporation gas even if a leak exists, it is necessary to consider the fact that the raise in rank internal pressure increases as a result of the increased amount of generated evaporation gas. In this case, the leak criterion value may be changed according to the temperature of fuel, or the cumulative value Ptotal of the tank-internal-pressure may be corrected by using a correction coefficient F (FL), that is dependent on the temperature of fuel. In this way, the leak criterion value can be changed properly according to the temperature of fuel to keep up with a change in increase in generated evaporation gas amount or a change in increase in tank-internal-pressure. As a result, it is possible to carry out leak-check processing, the result of which is not affected by the temperature of fuel.

Furthermore, in this embodiment, the cumulative value Ptotal of the tank-internal-pressure is used as a leak-check parameter. Thus, while a difference in leak-check parameter between a state with no leak and a state with a leak is being increased, leak-check processing can be carried out by considering also a time lapse of the tank-internal-pressure in a leak-check period. As a result, it is possible to raise the degree of precision with which the leak-check processing is carried out.

As described above, in this embodiment, the tank-internal-pressure detected as a gauge pressure with the atmospheric pressure used as a reference is cumulated to find a cumulative value Ptotal of the tank-internal-pressure. It is to be noted that, a cumulative value Ptotal of the tank-internal-pressure can also be found by cumulating a difference between a tank-internal-pressure detected as an absolute pressure and a reference pressure over a predetermined processing period. In this case, as a reference pressure, it is possible to use a tank-internal-pressure detected at the beginning of the leak-check processing or detected in the stopped state of the engine in addition to the atmospheric pressure. Of course, other pressures can also be used as the reference pressure. As an alternative, a cumulative value Ptotal of the tank-internal-pressure can also be found by cumulating a tank-internal-pressure detected as an absolute pressure over a predetermined processing period.

Eighth Embodiment

Figure 27:
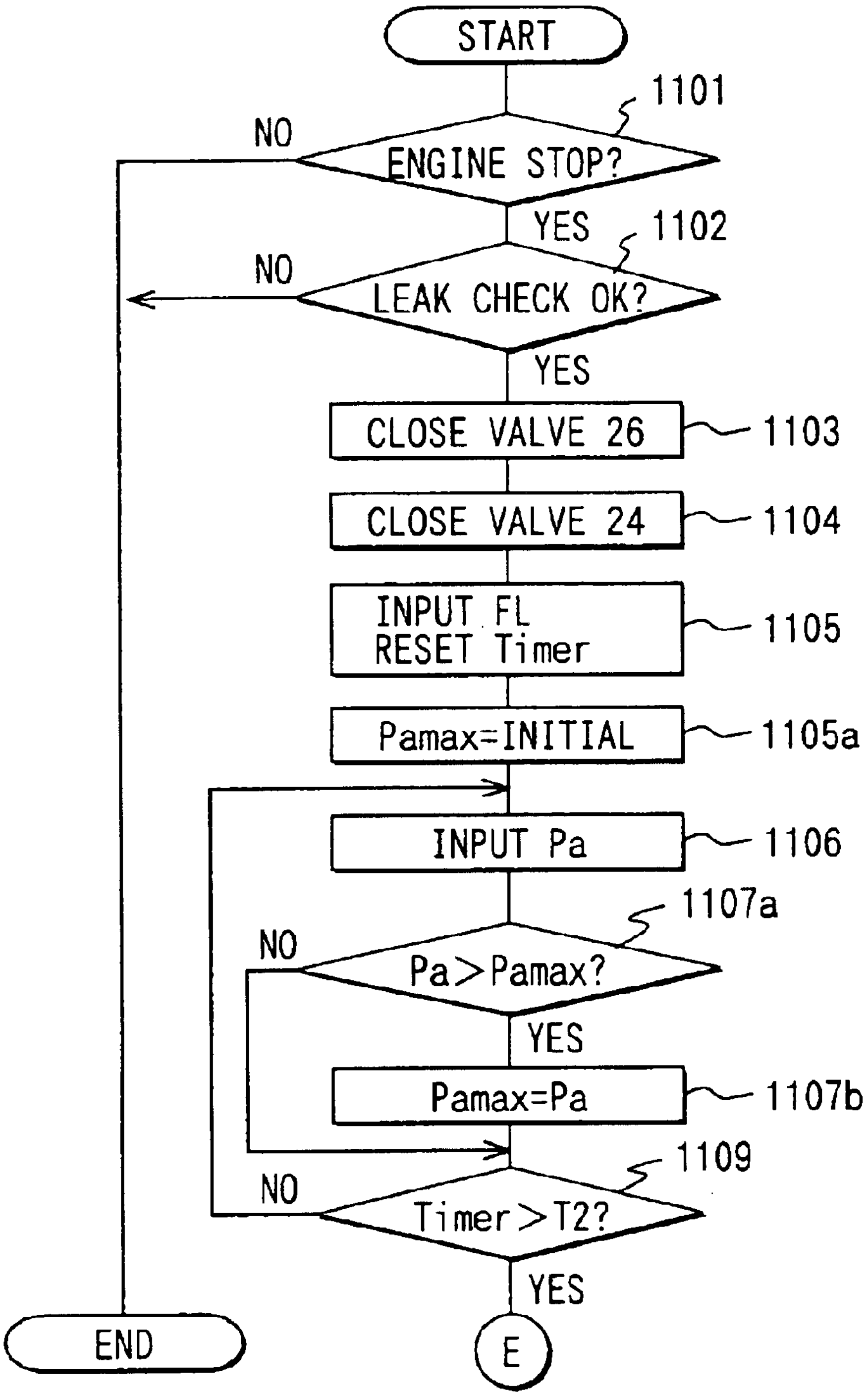
FIG. 27 shows a flowchart representing leak-check processing implemented by an eighth embodiment of the present invention.
Figure 28:
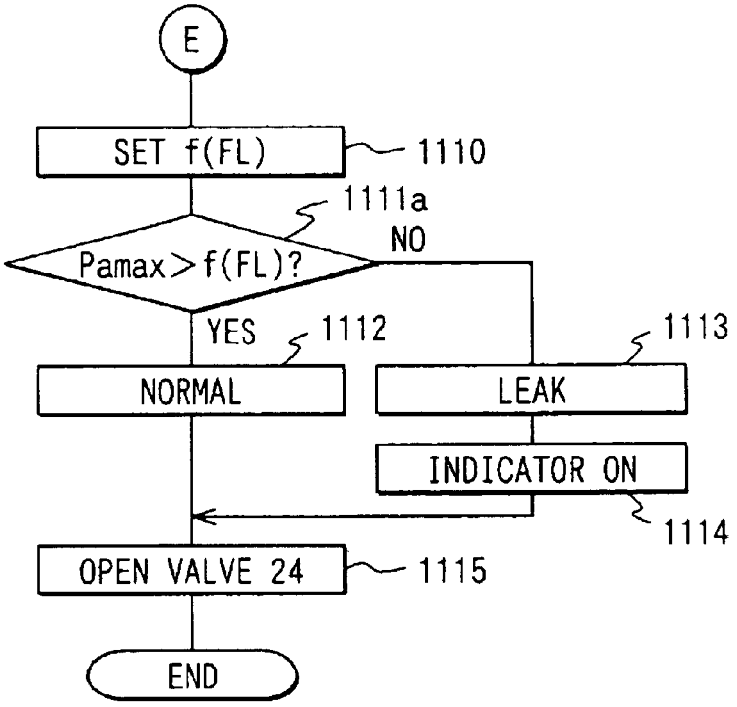
FIG. 28 shows a continuation flowchart representing the leak-check processing implemented by the eighth embodiment of the present invention.

In this embodiment, a maximum value Pamax of the tank-internal-pressure Pa for a leak-check period in the stopped state of the engine is detected by execution of a leak-check routine represented by a flowchart shown in FIGS. 27 and 28. The maximum value Pamax of the tank-internal-pressure Pa is used as a leak-check parameter.

The leak-check routine flowchart shown in FIGS. 27 and 28 is obtained by adding steps 1105*a*, 1107*a*, 1107*b* and 1111*a* to the leak-check-routine flowchart shown in FIG. 21.

At the step 1105*a*, the maximum value Pamax of the tank-internal-pressure Pa is set at an initial value of typically 0, which is the value of the atmospheric pressure. Then, at the next step 1106, a tank-internal-pressure Pa is detected. Later on, at the next step 1107*a*, the detected tank-internal-pressure Pa is compared with the tank-internal-pressure maximum value Pamax obtained so far. If the detected tank-internal-pressure Pa is found higher than the tank-internal-pressure maximum value Pamax obtained so far, the flow of the routine goes on to a step 1107*b* at which the tank-internal-pressure maximum value Pamax obtained so far is replaced by the detected tank-internal-pressure Pa. If the detected tank-internal-pressure Pa is found equal to or lower than the tank-internal-pressure maximum value Pamax obtained so far, on the other hand, the stored value of the tank-internal-pressure maximum value Pamax obtained so far is not updated.

As the value of the timer exceeds the predetermined value T2 later on, the flow of the routine goes on to the step 1110 at which a leak criterion value f (FL) is set for the present residual-fuel amount FL. Then, at the next step 1111*a*, the tank-internal-pressure maximum value Pamax is compared with the leak criterion value f (FL). If the tank-internal-pressure maximum value Pamax is found greater than the leak criterion value f (FL), the flow of the routine goes on to the step 1112 at which no leak is determined to exist in the fuel-vapor-processing system or the state of the fuel-vapor-processing system is determined to be normal. Finally, at the last step 1115, the canister valve 24 is opened to end the leak-check processing.

If the result of determination obtained at the step 1111*a* indicates that the tank-internal-pressure maximum value Pamax is equal to or smaller than the leak criterion value f (FL), on the other hand, the flow of the routine goes on to the step 1113 at which a leak is determined to exist in the fuel-vapor-processing system or the state of the fuel-vapor-processing system is determined to be abnormal. Subsequently, at the next step 1114, the indicator 29 is turned on to give a warning to the driver and an abnormality code is stored in a backup RAM employed in the ECU 28. Finally, at the last step 1115, the canister valve 24 is opened to end the leak-check processing.

The embodiment described above is capable of providing the same effects as the seventh embodiment.

The leak-check period T2 may be corrected according to the fuel temperature Ta. In this way, the leak-check period T2 can be set at a proper length to keep up with changes in increase in generated evaporation gas amount (or changes in increase in tank-internal-pressure) which are caused by changes in fuel temperature Ta.

As a leak-check parameter replacing the leak-check parameter of the seventh and eighth embodiments, it is possible to use a tank internal pressure detected after the lapse of a predetermined time since the start of the leak-check processing or since the hermetical sealing of the fuel-vapor-processing system. The length of the predetermined time needs to be set at a time required by the internal pressure of the fuel tank to decrease to a level close to the atmospheric pressure in the existence of a leak. In a no-leak state, the internal pressure of the fuel tank is sustained at a high level even after the lapse of the predetermined time since the start of the leak-check processing. It is thus possible to determine whether a leak exists by determining whether a tank internal pressure detected after the lapse of a predetermined time decreases to a level close to the atmospheric pressure. In this case, the predetermined time can be corrected according to the temperature of fuel due to the fact that the amount of evaporation gas generated in the fuel tank 18 and, hence, the internal pressure of the fuel tank 18 change in dependence on the temperature of fuel.

In addition, it is also possible to monitor changes in tank-internal-pressure after the start of the leak-check processing or after the hermetical sealing of the fuel-vapor-processing system, measure the length of time required by a rate of increase in tank-internal-pressure to drop to a value equal to or smaller than a predetermined value of typically 0 and determine whether a leak exists in the fuel-vapor-processing system by determining whether the measured time is shorter than a leak criterion value. As another alternative, it is also possible to determine whether a leak exists in the fuel-vapor-processing system by determining whether the internal pressure of the fuel tank drops to a level equal to or lower than a predetermined voltage before a predetermined time lapses since the start of the leak-check processing. The predetermined pressure is typically close to the atmospheric pressure.

Furthermore, it is also possible to estimate an amount of generated evaporation gas from a temperature of fuel in a running state of the engine as well as the operating state of the engine, and make a decision to allow or inhibit the leak-check processing on the basis of the estimated amount of generated evaporation gas. In this scheme, the leak-check processing is carried out only for evaporation gas' generation condition in which there is a clear difference in tank-internal-pressure between a state with a leak and a state with no leak. As a result, the degree of precision with which the leak-check processing is carried out can be raised.

The leak-check processing carried out by the seventh and eighth embodiments in a stopped state of the engine as described above can be used as a substitute for the tank-internal-pressure monitor programs of the first to sixth embodiments.

Ninth Embodiment

Figure 30:
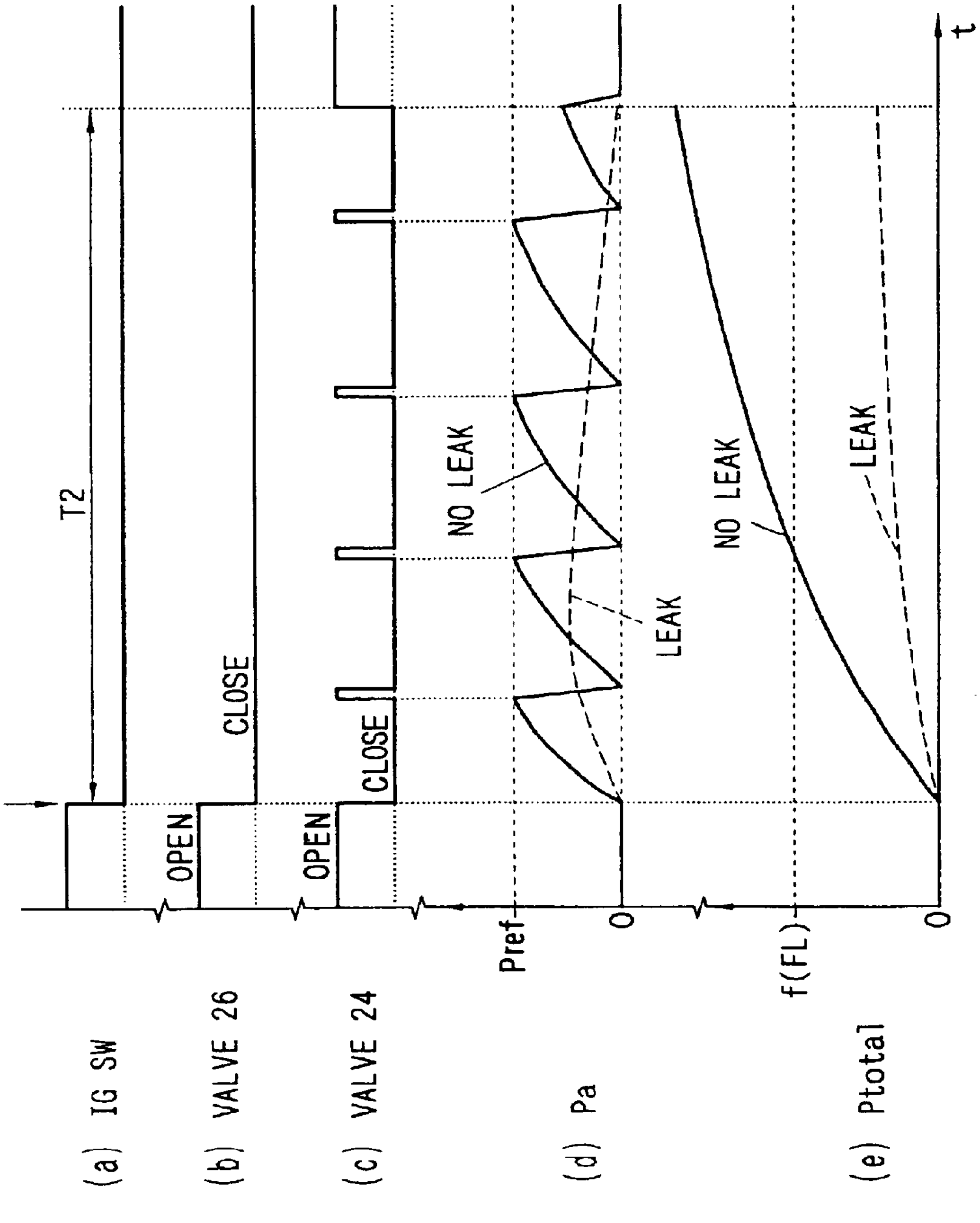
FIG. 30 shows time charts of leak-check operations according to the ninth embodiment of the present invention.

By referring to a flowchart shown in FIG. 30, the following description explains a ninth embodiment's leak-check technique for a stopped state of the engine.

In this embodiment, the fuel-vapor-processing system is hermetically sealed during a leak-check period T2. Each time the tank-internal-pressure Pa reaches a predetermined limit pressure Pref, however, the canister valve 24 is temporarily opened to introduce the atmospheric pressure into the fuel-vapor-processing system so that the tank-internal-pressure Pa drops abruptly. After the tank-internal-pressure Pa decreases to a level close to the atmospheric pressure, the canister valve 24 is again closed to hermetically seal the fuel-vapor-processing system. These operations to open and close the canister valve 24 are carried out repeatedly. In this case, the limit pressure Pref is set at a level close to the upper limit of tank-internal-pressures capable of preventing a fuel component from being blown from the canister 22 to the atmosphere by a stream of evaporation gas, which flows out from the canister 22 when the canister valve 24 is opened at the end of the leak-check processing.

In this embodiment, in an operation to cumulate a detected tank-internal-pressure Pa, the detected tank-internal-pressure Pa is corrected according to a count C representing the number of times the internal pressure of the fuel tank reaches the predetermined limit pressure.

Figure 29:
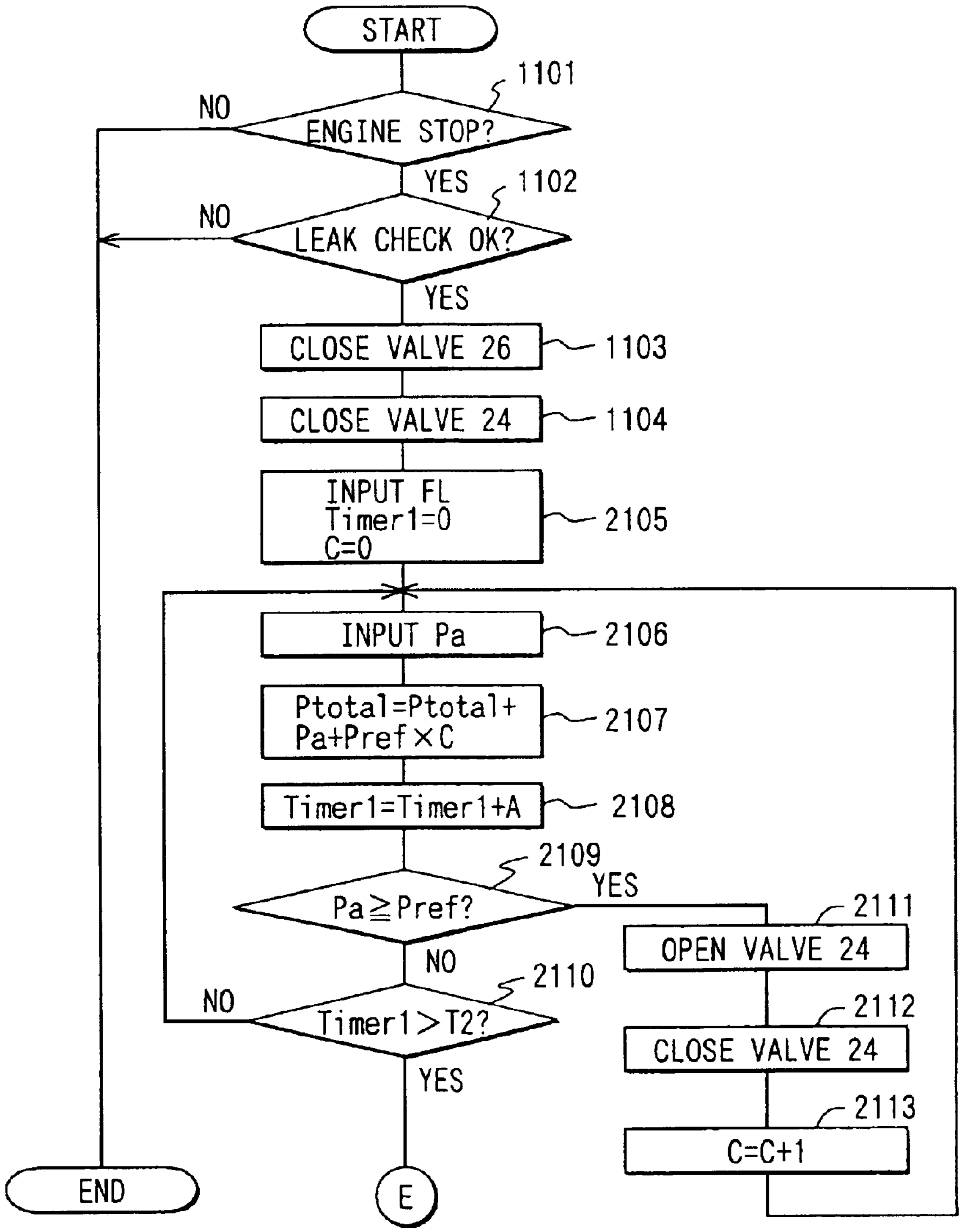
FIG. 29 shows a flowchart representing leak-check processing implemented by a ninth embodiment of the present invention.

The leak-check processing is carried out according to a procedure represented by the flowchart shown in FIG. 29. The flowchart shown in FIG. 29 is a continuation of the flowchart shown in FIG. 28. In addition, also in this embodiment, the processing represented by the flowchart shown in FIG. 22 is carried out.

At a step 2105, after a residual-fuel amount FL is detected by the fuel-level sensor 31, timer 1 and the contents of counter C are reset. Timer 1 is a timer for measuring a time lapse T2 since the start of the leak-check processing. On the other hand, counter C is a counter for counting the number of times the internal pressure Pa of the fuel tank reaches the predetermined limit pressure Pref. Then, at the next step 2106, a signal output by the tank-internal-pressure sensor 27 is read in to detect the current tank-internal-pressure Pa. Subsequently, at the next step 2107, the current tank-internal-pressure Pa is added to the tank-internal-pressure cumulative value Ptotal obtained so far in order to update the tank-internal-pressure cumulative value Ptotal. As described above, the detected tank-internal-pressure Pa is corrected according to the contents of counter C, which represent the number of times the internal pressure Pa of the fuel tank reaches the predetermined limit pressure Pref. The processing to cumulate internal pressures Pa of the fuel tank is carried out according to the following equation:

$$Ptotal=Ptotal+Pa+Pref\times C$$

Later on, at the next step 2108, a predetermined processing period A is added to the previous count value of timer 1 to update the count value. Then, the flow of the routine goes on to a step 2109 to determine whether the tank-internal-pressure Pa has reached the limit pressure Pref. If the tank-internal-pressure Pa has not reached the limit pressure Pref, the flow of the routine goes on to a step 2110 to determine whether the count value of timer 1 has reached a predetermined value T2. The count value of timer 1 represents a lapse of time since the start of the leak-check processing. If the count value of timer 1 has not reached the predetermined value T2, the flow of the routine goes back to the step 2106. In this way, the processing to cumulate tank-internal-pressures Pa over the predetermined processing period A to update the tank-internal-pressure cumulative value Ptotal is carried out repeatedly till the count value of timer 1 reaches the predetermined value T2.

As the tank-internal-pressure Pa reaches the limit pressure Pref during the leak-check period T2, the result of determination obtained at the step 2109 becomes a YES causing the flow of the routine to go on to a step 2111 at which the canister valve 24 is opened temporarily to introduce the atmospheric pressure into the fuel-vapor-processing system so that the tank-internal-pressure abruptly drops to a level close to the atmospheric level. Then, at the next step 2112, the canister valve 24 is closed again to hermetically seal the fuel-vapor-processing system. Subsequently, at the next step 2113, the contents of counter C are incremented by 1. As described above, the contents of counter C represent the number of times the tank-internal-pressure Pa reaches the limit pressure Pref. Then, the flow of the routine then goes back to the step 2106. In this way, the processing to cumulate tank-internal-pressures Pa over the predetermined processing period A to update the tank-internal-pressure cumulative value Ptotal is carried out repeatedly.

Later on, as the count value of timer 1 exceeds the predetermined value T2, the result of determination obtained at the step 2110 becomes a YES causing the flow of the routine to go on to a step 1110 of the flowchart shown in FIG. 28.

Each time the tank-internal-pressure Pa reaches the limit pressure Pref during a leak-check period in a stopped state of the engine, the embodiment described above repeatedly carries out the processing wherein the canister valve 24 is opened temporarily to introduce the atmospheric pressure into the fuel-vapor-processing system so that the tank-internal-pressure abruptly drops to a level close to the atmospheric level before the canister valve 24 is closed again to hermetically seal the fuel-vapor-processing system. Thus, at the end of the leak-check processing, the tank-internal-pressure Pa can also be limited not to exceed the limit pressure Pref. As a result, it is possible to prevent a fuel component from being strongly blown from the canister 22 to the atmosphere by a stream of evaporation gas, which flows out from the canister 22 when the canister valve 24 is opened at the end of the leak-check processing to expose the fuel-vapor-processing system to the atmosphere.

In addition, in this embodiment, in an operation to find a tank-internal-pressure cumulative value to be used as a leak-check parameter by cumulating internal pressures Pa of the fuel tank, each of the tank-internal-pressures Pa is corrected according to a count C representing the number of times the internal pressure Pa of the fuel tank reaches the predetermined limit pressure Pref. Thus, even if the internal pressure Pa of the fuel tank is limited to a level equal to or lower than the predetermined limit pressure Pref during a leak-check period, it is possible to obtain a value equivalent to a tank-internal-pressure Pa that will be obtained with an unlimited increase in tank-internal-pressure Pa. As a result, it is possible to carry out leak-check processing with a high degree of precision under all but the same conditions as a case in which increases in tank-internal-pressure Pa are not limited.

Furthermore, in this embodiment, the execution of the leak-check processing is allowed or inhibited in dependence on whether a fuel temperature detected by the fuel-temperature sensor 30 is at least equal to a predetermined temperature at which evaporation gas is easy to generate. Thus, the leak-check processing is carried out only in evaporation gas's generation state in which there is an obvious difference in internal pressure between a case in which a leak exists and a case in which no leak exists. As a result, the degree of precision with which the leak-check processing is carried out can be raised.

It is to be noted that the temperature of fuel in the fuel tank 18 can also be estimated on the basis of the engine operating state prior to the stopped state or the engine or a running history of the engine prior to the stopped state. Main factors causing the temperature of fuel in the fuel tank 18 to rise include heat dissipated by the exhaust system and fuel returned from the fuel injection valve to the fuel tank 18. The amount of the dissipated heat and the amount of the returned fuel can be estimated from the engine operating state or the engine running history. Thus, the temperature of fuel in the fuel tank 18 can also be estimated on the basis of the engine operating state prior to the stopped state or the engine running history prior to the stopped state. As a result, since the fuel-temperature sensor 30 is not required, the demand for a low cost can be met.

In the case of a fuel tank 18 made of resin as is the case with this embodiment, the fuel tank 18 does not deteriorate due to rust or the like in comparison with the conventional fuel tank made of a metal. Thus, the fuel tank 18 made of resin has a merit of a better endurance characteristic. Since fuel tank 18 made of resin has strength poorer than the conventional fuel tank made of a metal, however, the resin fuel tank 18 is deformed when the internal pressure thereof becomes too high so that it is feared that the internal pressure Pa of the fuel tank made of resin varies.

In order to solve this problem, in this embodiment, the internal pressure Pa of the fuel tank is limited to a value equal to or smaller than the predetermined limit pressure Pref during a leak-check period. Thus, it is possible to prevent the fuel tank 18 from being deformed by an increase in pressure in leak-check processing even if the fuel tank 18 is made of resin. As a result, pressure variations caused by deformation of the fuel tank 18 can be avoided so that reliability of the leak-check processing can be improved.

At any rate, it is not necessary to use the conventional fuel tank made of a metal in the present invention. Also in this aspect, the desired object of the present invention can thus be achieved satisfactorily.

Tenth Embodiment

Figure 33:
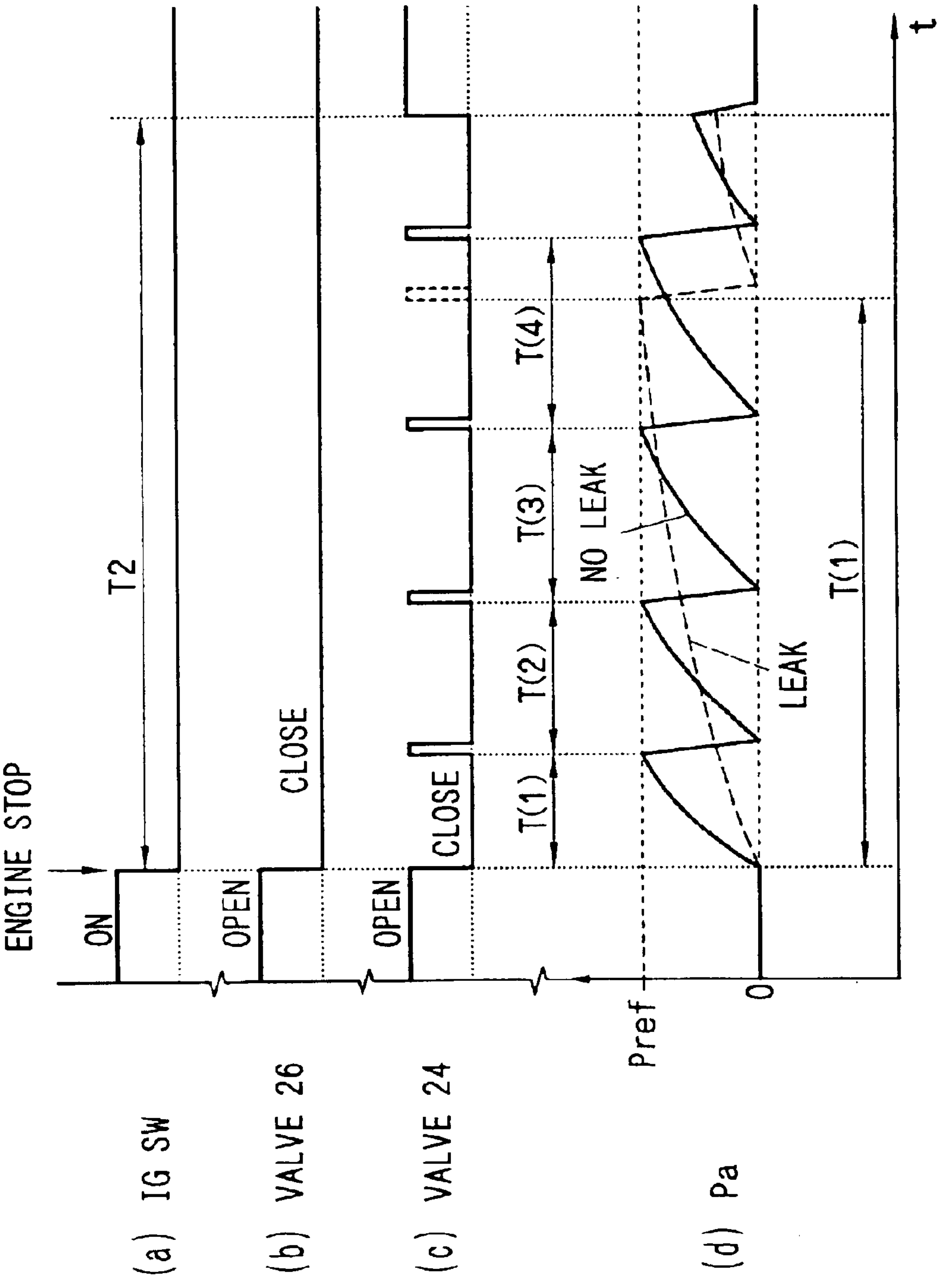
FIG. 33 shows time charts of leak-check operations according to the tenth embodiment of the present invention.

In a tenth embodiment, during a leak-check period T2, times T(j) where j=1, 2, 3 and so on are measured. As shown in FIG. 33, a time T(j) is a time required by the internal pressure Pa of the fuel tank to increase from a level close to the atmospheric pressure to a predetermined limit pressure Pref. At the end of the leak-check period T2, an average value Tav of the times T(j) where j=1, 2, 3 and so on is found and examined to determine whether the average value Tav is longer than a leak criterion value f2 (FL) in order to determine whether a leak exists in the fuel-vapor-processing system. That is, if no leak is generated in the fuel-vapor-processing system, increases in tank-internal-pressure Pa during the leak-check period are smaller, prolonging the times T(j) where j=1, 2, 3, that is, the times required by the internal pressure Pa of the fuel tank to increase from a level close to the atmospheric pressure to the predetermined limit pressure Pref. In some cases, with a big leak generated in the fuel-vapor-processing system, the internal pressure Pa of the fuel tank cannot increase at all from a level close to the atmospheric pressure to the predetermined limit pressure Pref. In either case, the average value Tav is longer than the leak criterion value f2 (FL). It is thus possible to determine whether a leak exists in the fuel-vapor-processing system by determination of whether the average value Tav (required by the internal pressure Pa of the fuel tank to increase from a level close to the atmospheric pressure to the predetermined limit pressure Pref) is longer than the leak criterion value f2 (FL).

Figure 32:
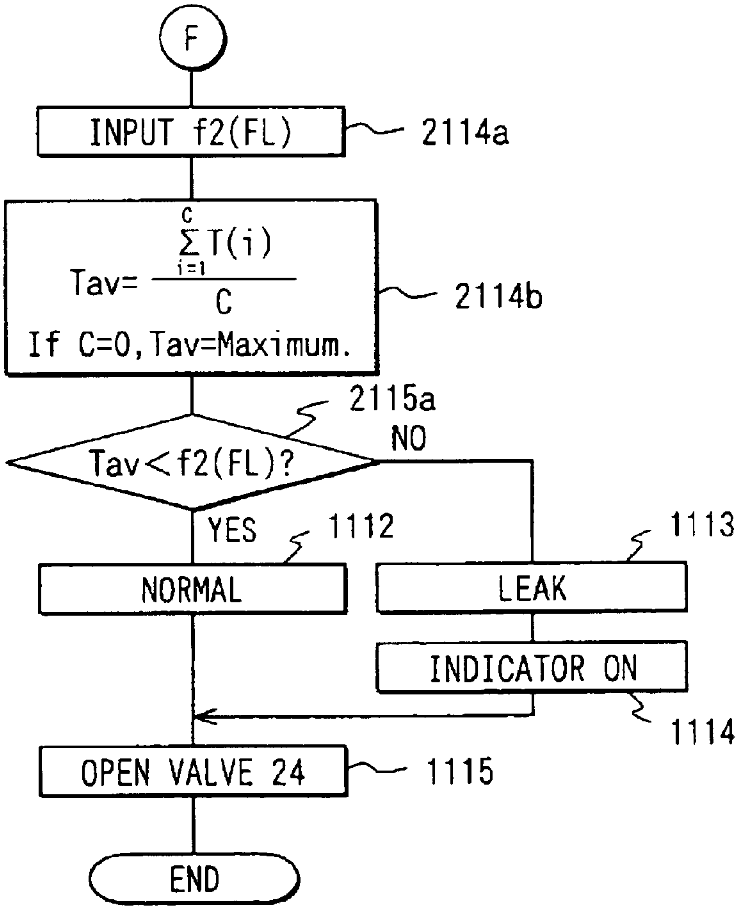
FIG. 32 shows a continuation flowchart representing the leak-check processing implemented by the tenth embodiment of the present invention.
Figure 31:
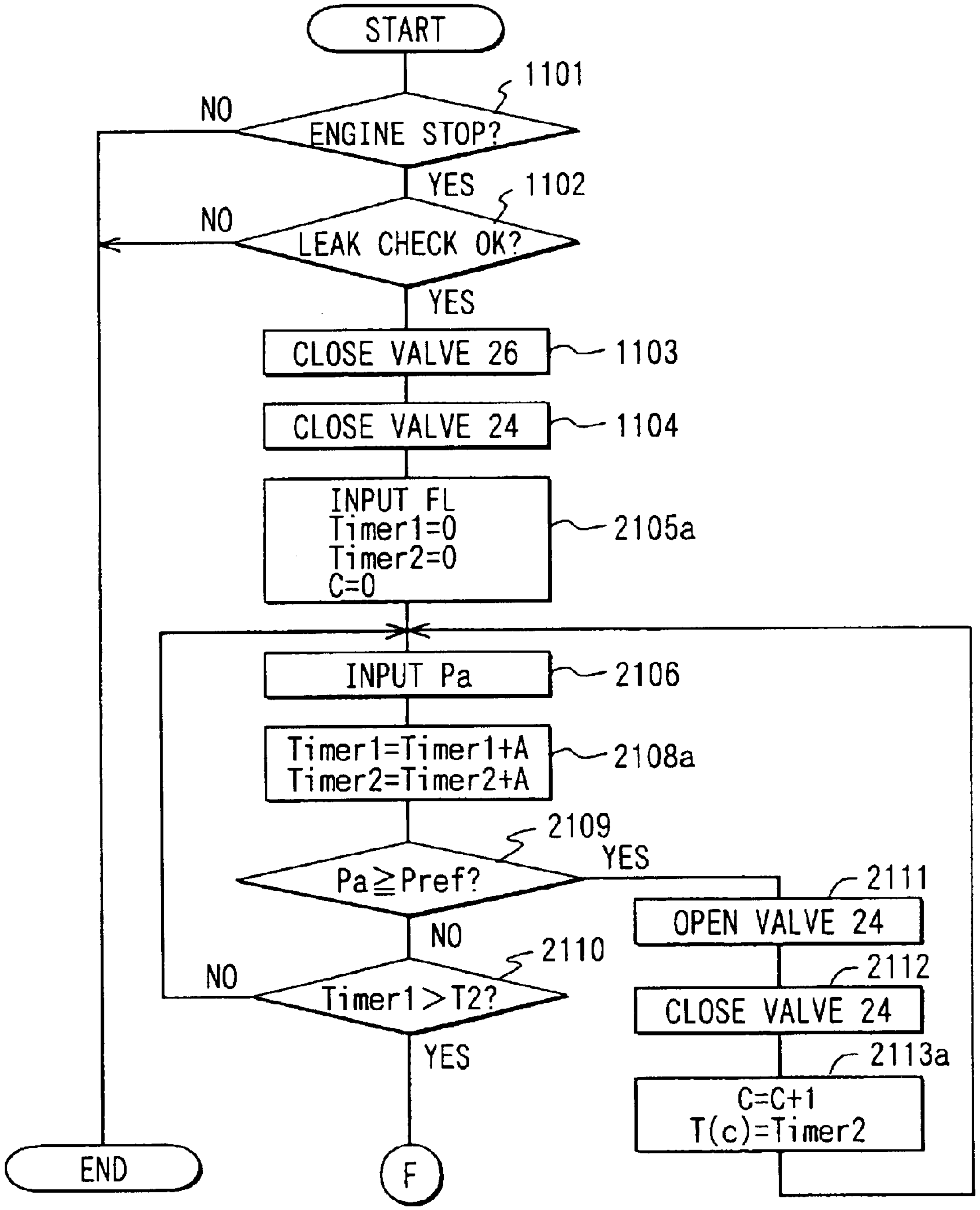
FIG. 31 shows a flowchart representing leak-check processing implemented by a tenth embodiment of the present invention.

A flowchart shown in FIGS. 31 and 32 represents a leak-check routine of this embodiment. This flowchart is obtained by removing the step 2107 from the leak-check routine shown in FIGS. 28 and 19 and changing the processing carried out at steps 2105*a*, 2108*a*, 2113*a*, 2114*a*, 2114*b* and 2115*a* or adding new operations to the processing. The rest remains unchanged.

At a step 2105*a*, a residual-fuel amount FL is found and, then, timer 1, timer 2 as well as counter C are reset. Timer 1 is a timer for measuring a lapse of time since the start of the leak-check processing. On the other hand, timer 2 is a timer for measuring a time T(C) required by the internal pressure Pa of the fuel tank to increase from a level close to the atmospheric pressure to the predetermined limit pressure Pref. The contents of counter C represent the number of times the internal pressure Pa of the fuel tank reaches the predetermined limit pressure Pref. Then, at the next step 2108*a*, a processing period A is added to the count values of timers 1 and 2 in order to update the count values. At the step 2113*a*, the count value contained in timer 2 at that time is fetched and stored as a time T(C) required by the internal pressure Pa of the fuel tank to increase from a level close to the atmospheric pressure to the predetermined limit pressure Pref.

Later on, as the count value of timer 1 exceeds the predetermined value T2, the flow of the routine goes on to a step 2114*a* of the flowchart shown in FIG. 32 to compute a leak criterion value f2 (FL) for the present residual-fuel amount FL. Subsequently, at the next step 2114*b*, an average value Tav of the times T(j) where j=1, 2, 3 and so on is found. In this case, for counter C=0 indicating that the internal pressure Pa of the fuel tank did not reach the predetermined limit pressure Pref at all, the average value Tav is set at a maximum value such as the leak-check period T2.

Then, at the next step 2115*a*, the average value Tav is compared with the leak criterion value f2 (FL). If the average value Tav is found smaller than the leak criterion value f2 (FL), the flow of the routine goes on to a step 1112. If the average value Tav is found at least equal to the leak criterion value f2 (FL), on the other hand, the flow of the routine goes on to a step 1113.

The embodiment described above also provides the same effects as the ninth embodiment.

It is also possible to determine whether a leak exists in the fuel-vapor-processing system by determination of whether the time T(1) is longer than a leak criterion value. As described earlier, the time T(1) is a time required by the internal pressure Pa of the fuel tank to increase from a level close to the atmospheric pressure to the predetermined limit pressure Pref for the first time. As another alternative, it is also possible to determine whether a leak exists in the fuel-vapor-processing system by determination of whether a time T(N) is longer than a leak criterion value where the time T(N) a time required by the internal pressure Pa of the fuel tank to increase from a level close to the atmospheric pressure to the predetermined limit pressure Pref for the Nth time. In either case, it is nice to end the leak-end processing right after measurement of the time T(1) or T(N).

In addition, a leak may be determined to exist in the fuel-vapor-processing system to be immediately followed by termination of the leak-end processing whenever the internal pressure Pa of the fuel tank does not reach the predetermined limit pressure Pref at all even after a predetermined time lapse since the start of the leak-end processing. In this way, it is possible to reduce a time required to carry out the leak-check processing after the engine is put in a stopped state and, hence, the amount of power consumed after the engine is put in a stopped state so that the load borne by the battery can be decreased by the reduction in power consumption.

Eleventh Embodiment

Figure 34:
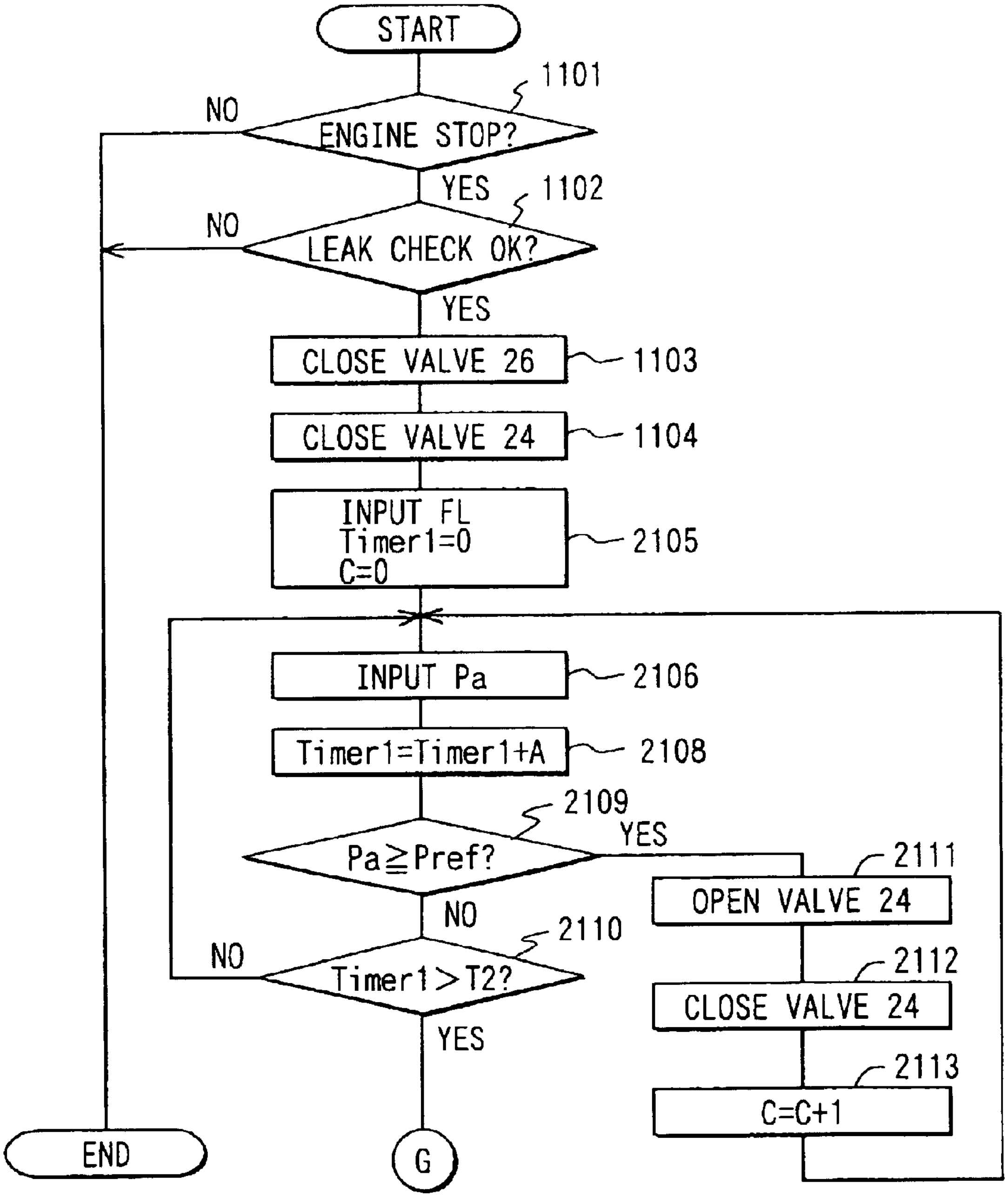
FIG. 34 shows a flowchart representing leak-check processing implemented by an eleventh embodiment of the present invention.
Figure 35:
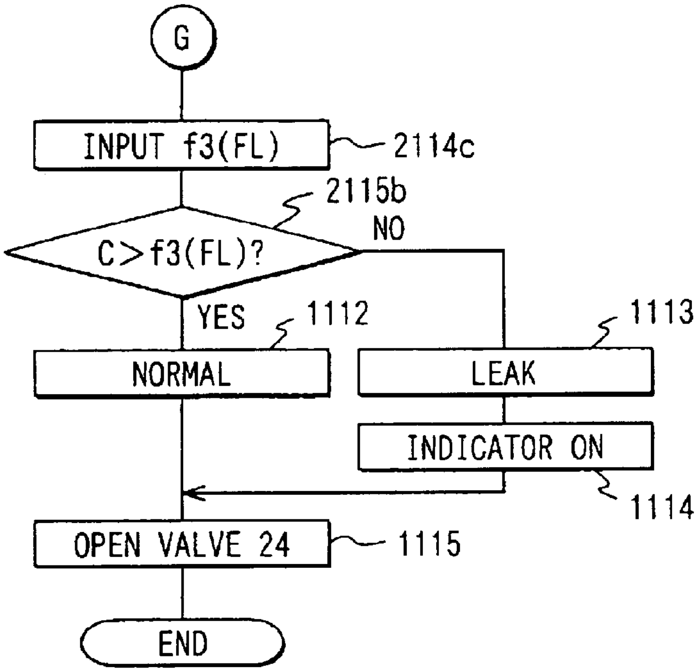
FIG. 35 shows a continuation flowchart representing the leak-check processing implemented by the eleventh embodiment of the present invention.

In an eleventh embodiment of the present embodiment, a leak-check processing is represented by a flowchart shown in FIGS. 34 and 35. A count C is a count value representing the number of times the internal pressure Pa of the fuel tank increases from a level close to the atmospheric pressure to a predetermined limit pressure Pref during a leak-check period. Then, existence of a leak in the fuel-vapor-processing system is determined by determination of whether the count C is smaller than a leak criterion value f3 (FL). That is, if a leak exists in the fuel-vapor-processing system, increases in tank-internal-pressure Pa during a leak-check period are small so that the times required by the internal pressure Pa of the fuel tank to increase from a level close to the atmospheric pressure to a predetermined limit pressure Pref each become longer. In some cases, with a big leak generated in the fuel-vapor-processing system, the internal pressure Pa of the fuel tank cannot increase at all from a level close to the atmospheric pressure to the predetermined limit pressure Pref. In either case, it is thus possible to determine whether a leak exists in the fuel-vapor-processing system by determination of whether the count C (representing the number of times the internal pressure Pa of the fuel tank increases from a level close to the atmospheric pressure to a predetermined limit pressure Pref during a leak-check period) is smaller than a leak criterion value f3 (FL).

The flowchart shown in FIGS. 34 and 35 to represent a leak-check routine executed by the eleventh embodiment is obtained by removing the step 2107 from the flowchart shown in FIG. 29 and adding steps 2114*c* and 2115*b* to the flowchart shown in FIG. 28.

At the step 2114*c* of the flowchart shown in FIGS. 34 and 35 to represent a leak-check routine, a leak criterion value f3 (FL) for the present residual-fuel amount FL is found from a map. Then, at the next step 2115*b*, the contents of counter C are compared with the leak criterion value f3 (FL). If the contents of counter C are found greater than the leak criterion value f3 (FL), the flow of the routine goes on to a step 1112. If the contents of counter C are found equal to or smaller than the leak criterion value f3 (FL), on the other hand, the flow of the routine goes on to a step 1113.

The eleventh embodiment described above also provides the same effects as the ninth embodiment.

It is to be noted that, a leak may be determined to exist in the fuel-vapor-processing system to be followed by termination of the leak-check processing at a point of time the internal pressure Pa of the fuel tank reaches the predetermined limit pressure Pref a number of times exceeding the leak criterion value f3 (FL). In this way, it is possible to reduce a time required to carry out the leak-check processing after the engine is put in a stopped state and, hence, the amount of power consumed after the engine is put in a stopped state so that the load borne by the battery can be decreased by the reduction in power consumption.

The canister valve 24 can be implemented by an atmosphere opening/closing valve that saves power by holding each of its closed and open states by using a permanent magnet. In this case, a current temporarily flows through the canister valve 24 only when the canister valve 24 is switched from an open state to a close state or vice versa. At other times, it is not necessary to flow a current to hold the closed and open states of the canister valve 24 since the permanent magnets are used for the purpose.

The leak-check processing carried out by the ninth, tenth and eleventh embodiments as described above can be used as a substitute for the tank-internal-pressure monitor programs of the first to sixth embodiments.

Twelfth Embodiment

Figure 36:
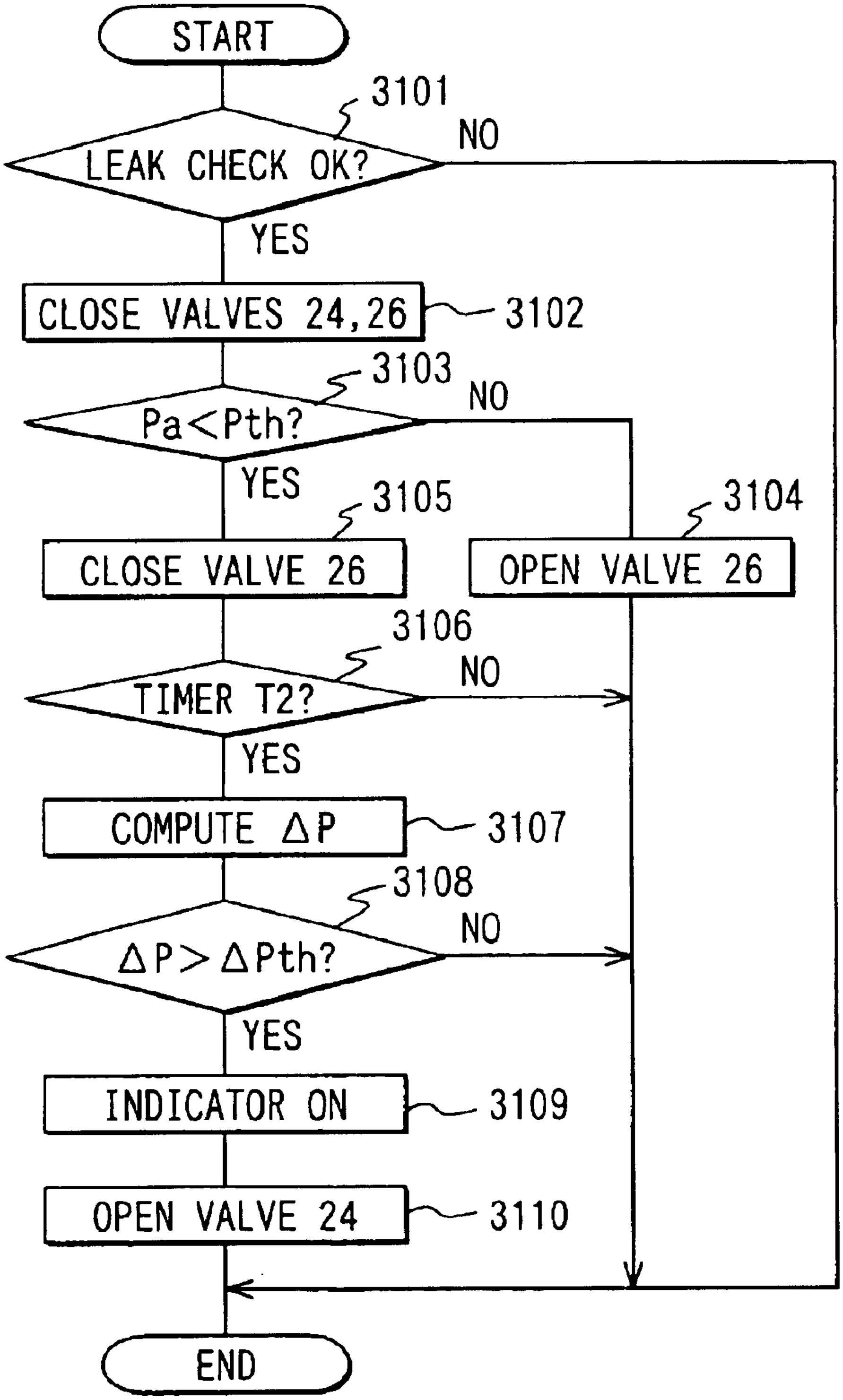
FIG. 36 shows a flowchart representing leak-check processing implemented by a twelfth embodiment of the present invention.

A leak-check routine represented by a flowchart shown in FIG. 36 is executed at intervals of typically 20 msec in order to carry out leak-check processing as follows. When this routine is invoked, the flowchart begins with a step 3101 to determine whether conditions for execution of the leak-check processing are satisfied. The conditions include:

(1) A predetermined time shall have lapsed since the start of the engine.

(2) The temperature of the cooling water shall be at least equal to a predetermined temperature of typically 70 degrees Celsius.

(3) The intake-air temperature representing the ambient temperature shall be lower than a predetermined temperature of typically 50 degrees Celsius.

(4) The engine shall be in a predetermined operating state such as an idle operating state or a low-speed running state.

If all the above conditions are satisfied, the leak-check processing is carried out. If even one of the conditions is not satisfied, on the other hand, the leak-check processing is not carried out.

Figure 38:
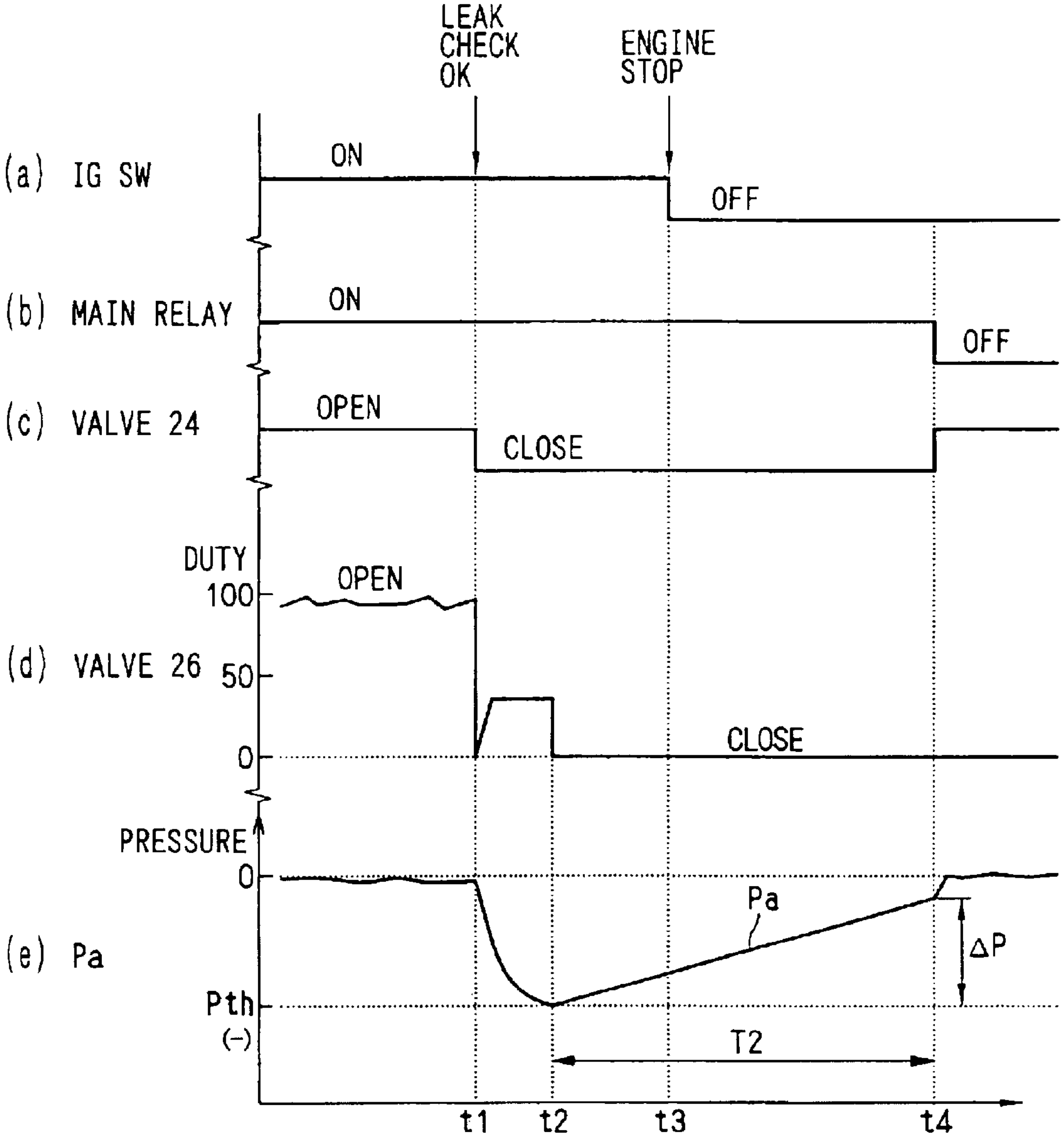
FIG. 38 shows time charts of leak-check operations according to the twelfth embodiment of the present invention.

If the conditions for execution of the leak-check processing are not satisfied, the execution of this routine is ended without carrying out the leak-check processing. At a point of time t1 the conditions for execution of the leak-check processing are satisfied, the leak-check processing is carried out by execution of pieces of processing at a step 3102 and subsequent steps as follows. For the position of the point of time t1, refer to the time charts of FIG. 38. First of all, at the step 3102, the canister valve 24 and the purge valve 26 are closed to hermetically seal the fuel-vapor-processing system. Later on, the flow of the routine goes on to the next step 3103 to determine whether the internal pressure Pa of the fuel tank 18 is lower than a predetermined pressure Pth. Referred to hereafter also as a tank-internal-pressure, the internal pressure Pa is a pressure detected by the tank-internal-pressure sensor 27. If the tank-internal-pressure Pa of the fuel tank 18 is not lower than a predetermined negative pressure Pth, the flow of the routine goes on to a step 3104 at which the purge valve 26 is opened and a negative pressure is introduced from the intake system of the engine to the fuel-vapor-processing system.

Later on, at a point of time t2 the tank-internal-pressure Pa drops to a level lower than the predetermined negative pressure Pth, the flow of the routine goes on to a step 3105 at which the purge valve 26 is closed to end the introduction of the negative pressure, and the fuel-vapor-processing system is hermetically sealed. For the position of the point of time t2, refer to the time charts of FIG. 38. Then, the flow of the routine goes on to a step 3106 to determine whether a predetermined time T2 of typically 1 to 3 minutes has lapsed since the end of the introduction of the negative pressure. If the predetermined time T2 has not lapsed since the end of the introduction of the negative pressure, the execution of the routine is ended without doing anything.

Thus, the hermetically sealed state of the fuel-vapor-processing system is sustained till the predetermined time T2 lapses since the end of the introduction of the negative pressure. At a point of time t4 another predetermined time lapses since the end of the introduction of the negative pressure, the flow of the routine goes on to a step 3107 at which a change ΔP in tank-internal-pressure over this other predetermined time is computed. For the position of the point of time t4, refer to the time charts of FIG. 38. Then, at the next step 3108, the change ΔP in tank-internal-pressure is compared with a leak criterion value ΔPth. If the change ΔP in tank-internal-pressure is not greater than the leak criterion value ΔPth, no leak is determined to exist in the fuel-vapor-processing system or the state of the fuel-vapor-processing system is determined to be normal.

If the change ΔP in tank-internal-pressure is found greater than the leak criterion value ΔPth, on the other hand, the flow of the routine goes on to a step 3109 at which the indicator 29 is turned on to give a warning to the driver and an abnormality code is stored in a backup RAM of the ECU 28. The backup RAM itself is shown in none of the figures. Then, at the next step 3110, the canister valve 24 is opened to end the execution of this routine.

In this case, the leak criterion value can be changed according to a residual fuel amount detected by the fuel-level sensor 31. This is because the change ΔP in tank-internal-pressure varies in dependence on the amount of residual fuel left in the fuel tank 18.

Control Routine of the Main Relay

Figure 37:
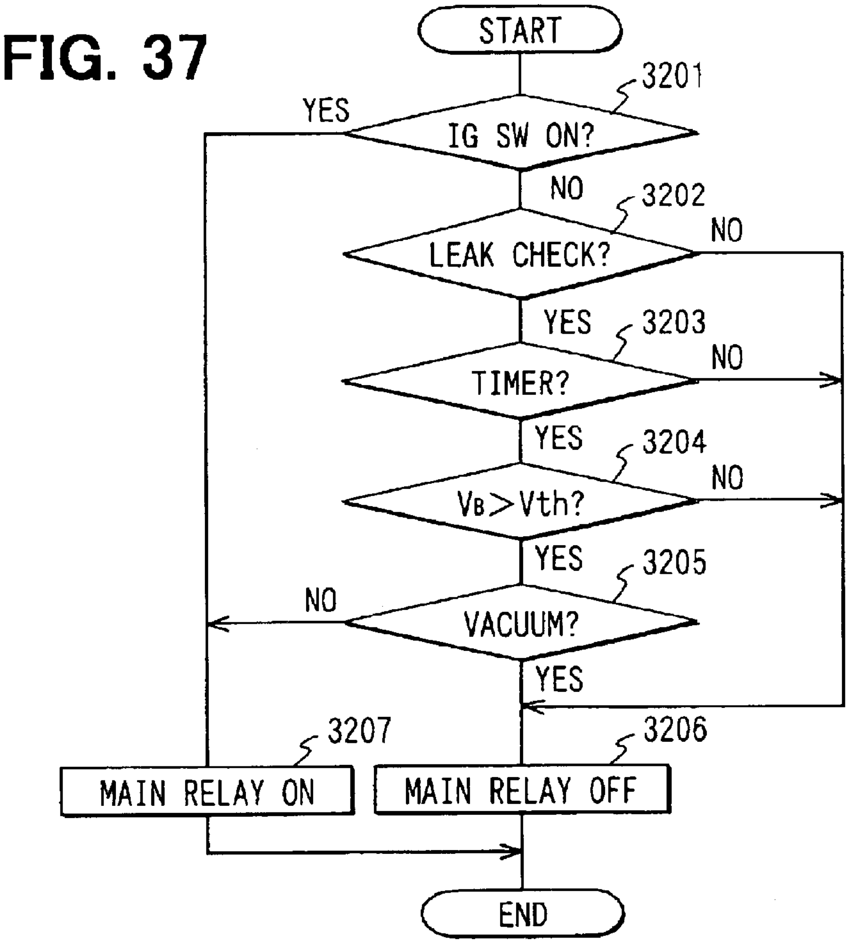
FIG. 37 shows another flowchart representing the leak-check processing implemented by the twelfth embodiment of the present invention.

A main-relay control routine represented by a flowchart shown in FIG. 37 is executed at predetermined intervals of typically 20 msec to turn the main relay 36 on and off. At invocation of this routine, the flowchart begins with a step 3201 to determine whether the ignition switch 35 has been turned on, that is, whether the engine is in a running state. In the following description, the ignition switch 35 is also referred to simply as an IG switch. If the ignition switch 35 has been turned on, that is, if the engine is in a running state, the flow of the routine goes on to a step 3207 at which the main relay 36 is sustained in the ON state.

Later on, at a point of time t3 the ignition switch 35 is changed from the ON state to an OFF state, the result of determination obtained at the step 3201 is a NO causing the flow of the routine to go on to a step 3202 to determine whether leak-check processing is being carried out by execution of the leak-check routine. For the position of the point of time t3, refer to the time charts of FIG. 38. If such leak-check processing is not being carried out, the flow of this routine goes on to a step 3206 at which the main relay 36 is turned off to discontinue the supplying of power to components.

If the result of determination obtained at the step 3202 indicates that the leak-check processing is being carried out, on the other hand, the flow of this routine goes on to a step 3203 to determine whether a predetermined time has lapsed since the ignition switch 35 was turned off, that is, since the engine was put in a stopped state to limit a period of time during which power is supplied to components after the ignition switch 35 was turned off in order to prevent power generated by the battery from being consumed. If the predetermined time has already lapsed since the ignition switch 35 was turned off, the flow of this routine goes on to the step 3206 at which the main relay 36 is turned off to discontinue the supplying of power to components in spite of the fact that the leak-check processing is being carried out and discontinue the leak-check processing in order to avoid consumption of power generated by the battery.

If the predetermined time has not lapsed yet since the ignition switch 35 was turned off, on the other hand, the flow of this routine goes on to the step 3204 to determine whether the power-supply voltage Vb is higher than a predetermined voltage Vth, which is barely enough for assuring startability of the engine. If the power-supply voltage Vb is not higher than the predetermined voltage Vth, the flow of this routine goes on to the step 3206 at which the main relay 36 is turned off in spite of the fact that the leak-check processing is being carried out. The execution of the leak-check processing is thus terminated to discontinue the consumption of the power generated by the battery.

If the power-supply voltage Vb is found higher than the predetermined voltage Vth, on the other hand, the flow of this routine goes on to the step 3205 to determine whether a negative pressure is still being introduced from the intake system of the engine to the fuel-vapor-processing system. If a negative pressure is still being introduced from the intake system of the engine to the fuel-vapor-processing system, the flow of this routine goes on to the step 3206 at which the main relay 36 is turned off. This is because, if the engine is put in a stopped state while a negative pressure is still being introduced from the intake system of the engine to the fuel-vapor-processing system, the air pressure in the intake pipe will rise to the atmospheric pressure so that a negative pressure can no longer be introduced to the fuel-vapor-processing system. As a result, it will be meaningless to continue the leak-check processing.

If the operation to introduce a negative pressure from the intake system of the engine to the fuel-vapor-processing system has been ended, on the other hand, the flow of this routine goes on to the step 3207 at which the main relay 36 is sustained in the ON state even if the ignition switch 35 is in an OFF state, that is, even if the engine is in a stopped state. In this way, even if the running state of the engine is stopped in the course of the leak-check processing, the processing to determine whether a leak exists in the fuel-vapor-processing system is continued even after the engine is put in a stopped state so that it is possible to increase the frequency, at which the leak-check processing is carried out, as well as to detect a leak with a small amount as well as detect a leak at an early time.

Then, at a point of time t4 the leak-check processing is ended, the result of determination obtained at the step 3202 is a NO, causing the flow of the routine to go on to the step 3206 at which the main relay 36 is turned off. For the position of the point of time t4, refer to the time charts of FIG. 38.

In this embodiment, when the leak-check processing is continued after the engine is put in a stopped state, the operation to supply power to the fuel-level sensor 31 is continued. It is to be noted that the operation to supply power to the fuel-level sensor 31 does not have to be continued. In a word, after the engine is put in a stopped state, it is necessary to supply power to only a minimum number components required for continuing the leak-check processing. Such components include the ECU 28, the canister valve 24, the purge valve 26 and the tank-internal-pressure sensor 27.

In addition, while a negative pressure is introduced from the intake system of the engine to the fuel-vapor-processing system at the start of the leak-check processing in this embodiment, a positive pressure can also be introduced to the fuel-vapor-processing system by using an air pump. As another alternative, the atmospheric pressure can also be introduced to the fuel-vapor-processing system.

The leak-check processing carried out by the twelfth embodiment as described above can be used as a substitute for the tank-internal-pressure monitor programs of the first to sixth embodiments.

Thirteenth Embodiment

In this embodiment, a temperature of fuel in the fuel tank 18 is estimated in the engine's running state and stopped state and the estimated temperature of fuel in the fuel tank 18 is used for determining whether a leak exists in the fuel-vapor-processing system.

In a running state of the engine, a temperature Ton(i) of fuel in the fuel tank 18 is estimated according to the following equation:

$$Ton(i)=(Tonup-Tondown)\times Fon+Ton(i-1)$$

where Tonup is an increase in fuel temperature in the fuel tank during a processing period;

Tondown is a decrease in fuel temperature in the fuel tank during the processing period;

Fon is a correction coefficient; and

Ton(i−1) is a previously estimated value of the fuel temperature.

The fuel-temperature increase Tonup, which is a fuel-temperature increase in a running state of the engine, is attributed mainly to exhaust-gas heat propagated to the inside of the fuel tank 18 in a running state of the engine. In a system provided with an exhaust-gas-temperature sensor for detecting a temperature of exhausted gas, a fuel-temperature increase caused by exhaust-gas heat can be estimated from a signal output by the exhaust-gas-temperature sensor. In a system not provided with such a exhaust-gas-temperature sensor, on the other hand, an increase in fuel temperature is found by using a map or an equation from the engine's revolution speed and load such as the intake-pipe pressure, the intake-air volume and the throttle opening. In general, since the amount of exhaust-gas heat increases in proportion to the engine's revolution speed and load, an increase in fuel temperature can be estimated from the engine's revolution speed and load.

In addition, in a fuel return system wherein an excessive portion of fuel sent by a fuel pump to a fuel injection valve is returned to the fuel tank 18, the excessive portion returned from the fuel injection valve to the fuel tank 18 also causes the temperature of fuel to increase. Thus, in the case of such a fuel return system, a fuel-temperature increase caused by returned fuel is taken into consideration besides a fuel-temperature increase attributed to exhaust-gas heat. Accordingly, Fuel-temperature increase Tonup in a fuel return system=Fuel-temperature increase caused by exhaust-gas heat+Fuel-temperature increase caused by returned fuel.

Thus, by considering exhaust-gas heat and returned fuel, which are 2 main causes of an increase in fuel temperature in a fuel return system, as described above, a fuel-temperature increase Tonup can be estimated with a high degree of precision.

It is to be noted that, in a fuel return system wherein no fuel is returned from the fuel injection valve to the fuel tank 18, on the other hand, it is not necessary to consider a fuel-temperature increase caused by returned fuel. An increase in fuel temperature needs to be estimated by considering only a fuel-temperature increase caused by exhaust-gas heat. Accordingly, Fuel-temperature increase Tonup in such a fuel return system is equal to Fuel-temperature increase caused by exhaust-gas heat.

In addition, in a fuel system with a configuration wherein a fuel pump 32 is provided in the fuel tank 18, a fuel-temperature increase caused by heat dissipated by the fuel pump 32 can also be estimated. In this case, heat dissipated by the fuel pump 32 can be estimated by using a map or a formula from power supplied to the fuel pump 32.

On the other hand, the fuel-temperature decrease Tondown, which is a decrease in fuel temperature in the fuel tank 18 in a running state of the engine, is caused by an air-cooling effect or a heat radiation effect in a running state of the engine. The air-cooling effect or the heat radiation effect is attributed to a difference in temperature between the running resistance wind (or the outside air) and the fuel (or the fuel tank 18). A fuel-temperature decrease Tondown can be computed according to a map or an equation by using a vehicle speed and/or a temperature of intake air as parameters. It is to be noted that, in place of an intake-air temperature, the ambient temperature can be used. As another alternative, it is also possible to use a difference between a temperature of intake air or the ambient temperature and a previously estimated value Ton(i−1) of the fuel temperature.

The correction coefficient Fon is a correction coefficient for correcting the present estimated value Ton(i) of the fuel temperature on the basis of the amount of residual fuel left in the fuel tank 18 and/or the previously estimated value Ton(i−1) of the fuel temperature.

In general, the change in fuel temperature varies due to the amount of residual fuel left in the fuel tank 18 even if the amount of heat exchanged by fuel in the fuel tank 18 remains the same. For example, the fuel-temperature increase Tonup caused by exhaust-gas heat and the like tends to rise in proportion to the amount of residual fuel left in the fuel tank 18. In addition, at a high temperature of fuel in the fuel tank 18, the difference in temperature between the fuel and the running resistance wind or the outside air increases, tending to raise the fuel-temperature decrease Tondown caused by an air-cooling effect or a heat radiation effect. At a low temperature of fuel in the fuel tank 18, on the contrary, the fuel-temperature increase Tonup caused by exhaust-gas heat and the like tends to decrease.

With the above characteristics taken into consideration, in this embodiment, the correction coefficient Fon is used for correcting the present estimated value Ton (i) of the fuel temperature on the basis of the amount of residual fuel left in the fuel tank 18 and/or the previously estimated value Ton(i−1) of the fuel temperature. In the case of a correction coefficient Fon set on the basis of the amount of residual fuel left in the fuel tank 18, for a residual-fuel amount of 50%, the correction coefficient Fon is set at a reference value of 1. The smaller the amount of residual fuel, the smaller the correction coefficient Fon. That is, the correction coefficient Fon is increased in proportion to the amount of residual fuel. In the case of a correction coefficient Fon set on the basis of the previously estimated value Ton(i−1) of the fuel temperature, on the other hand, the smaller the previously estimated value Ton(i−1) of the fuel temperature, the greater the correction coefficient Fon.

The initial value of the present estimated value Ton(i) of the fuel temperature in a running state of the engine, that is, the temperature of fuel at the start of the engine operation, is estimated on the basis of a fuel temperature estimated last immediately before the previous stopped state of the engine, a lapse of time since the previous stopped state of the engine to the present start of the engine operation and the ambient temperature or the temperature of intake air. In detail, a fuel-temperature decrease caused heat radiated in the stopped state of the engine is estimated on the basis of a lapse of time since the previous stopped state of the engine to the present start of the engine operation and the ambient temperature or the temperature of intake air. Then, the initial value of the fuel temperature at the present start of the engine operation is estimated by subtraction of the fuel-temperature decrease caused heat radiated in the stopped state of the engine from the fuel temperature estimated last immediately before the previous stopped state of the engine. If the fuel temperature's initial value estimated in this way is lower than the ambient temperature or the temperature of intake air, the initial value of the fuel temperature is just set at the same value as the ambient temperature or the temperature of intake air.

It is to be noted that, in this embodiment, also in a stopped state of the engine, a temperature of fuel is estimated by adoption of a method to be described later till the processing to check a leak in the fuel-vapor-processing system is ended. Thus, the initial value of the present estimated value Ton(i) of the fuel temperature in a running state of the engine can also be estimated on the basis of a fuel temperature estimated last in a stopped state of the engine, a lapse of time since the end of estimation of this fuel temperature (the end of the leak-check processing) to the present start of the engine operation and the ambient temperature or the temperature of intake air. Also in this case, if the fuel temperature's initial value estimated in this way is lower than the ambient temperature or the temperature of intake air, the initial value of the fuel temperature is just set at the same value as the ambient temperature or the temperature of intake air.

Method of Estimating a Fuel Temperature in an Engine Stopped State

A temperature of fuel in the fuel tank 18 in a stopped state of the engine is estimated by using a fuel temperature Ton(i) estimated last immediately before a stopped state of the engine.

A temperature Toff(i) of fuel in the fuel tank 18 in a stopped state of the engine is estimated by using the following equation:

$$Toff(i)=(Toffup-Toffdown)\cdot Foff+Toff(i-1)$$

where Toffup is an increase in fuel temperature in the fuel tank during a processing period;

Toffdown is a decrease in fuel temperature in the fuel tank during the processing period;

Foff is a correction coefficient; and

Toff(i−1) is a previously estimated value of the fuel temperature.

The fuel-temperature increase Toffup, which is a fuel-temperature increase in a stopped state of the engine, is attributed mainly to exhaust-gas heat propagated to the inside of the fuel tank 18 after the engine is put in a stopped state. In a system provided with an exhaust-gas-temperature sensor for detecting a temperature of exhausted gas, a fuel-temperature increase caused by exhaust-gas heat can be estimated from a signal output by the exhaust-gas-temperature sensor. In a system not provided with such a exhaust-gas-temperature sensor, on the other hand, an increase in fuel temperature is found by using a map or an equation from a lapse of time since a stopped state of the engine.

On the other hand, the fuel-temperature decrease Toffdown, which is a decrease in fuel temperature in the fuel tank 18 in a stopped state of the engine, is found by using a map or an equation from the ambient temperature or the temperature of intake air. As an alternative, the fuel-temperature decrease Toffdown can also be found by using a map or an equation from a difference between the ambient temperature or the temperature of intake air and Toff(i−1), which is a previously estimated value of the fuel temperature.

The correction coefficient Foff is a correction coefficient for correcting the present estimated value Toff(i) of the fuel temperature on the basis of the amount of residual fuel left in the fuel tank 18. The decrease in fuel temperature varies due to the amount of residual fuel left in the fuel tank 18 even for the same ambient temperature. For this reason, in this embodiment, with a fuel left in the fuel tank 18 at an amount of 50%, the correction coefficient Foff is set at a reference value of 1. The smaller the amount of residual fuel, the smaller the correction coefficient Foff. That is, the correction coefficient Foff is increased in proportion to the amount of residual fuel.

A temperature of fuel in the fuel tank 18 in a stopped state of the engine is estimated till the processing to check a leak in the fuel-vapor-processing system is ended. Thus, the main relay 36 is sustained in an ON state to provide power to components till the processing to check a leak in the fuel-vapor-processing system is ended even if the engine is put in a stopped state. As the processing to check a leak in the fuel-vapor-processing system is ended, the operation to estimate a temperature of fuel in the fuel tank 18 in a stopped state of the engine is also terminated and the main relay 36 is turned off to stop the supplying of power to the components.

The following description explains the processing to estimate a temperature of fuel as described above and processing to check a leak in the fuel-vapor-processing system, which are carried out by execution of processing routines represented by flowcharts shown in FIGS. 39 to 43.

Figure 39:
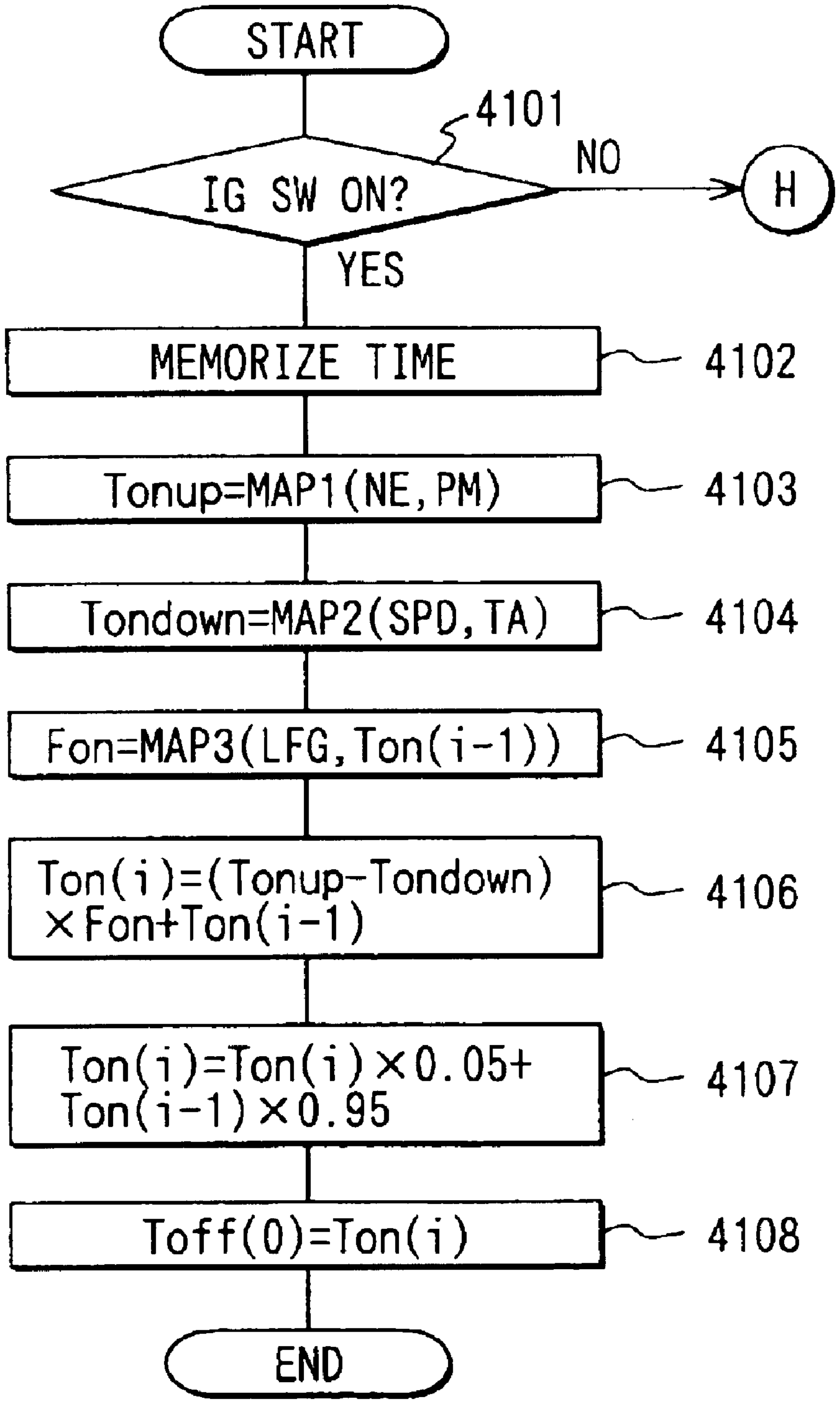
FIG. 39 shows a flowchart representing leak-check processing implemented by a thirteenth embodiment of the present invention.
Figure 40:
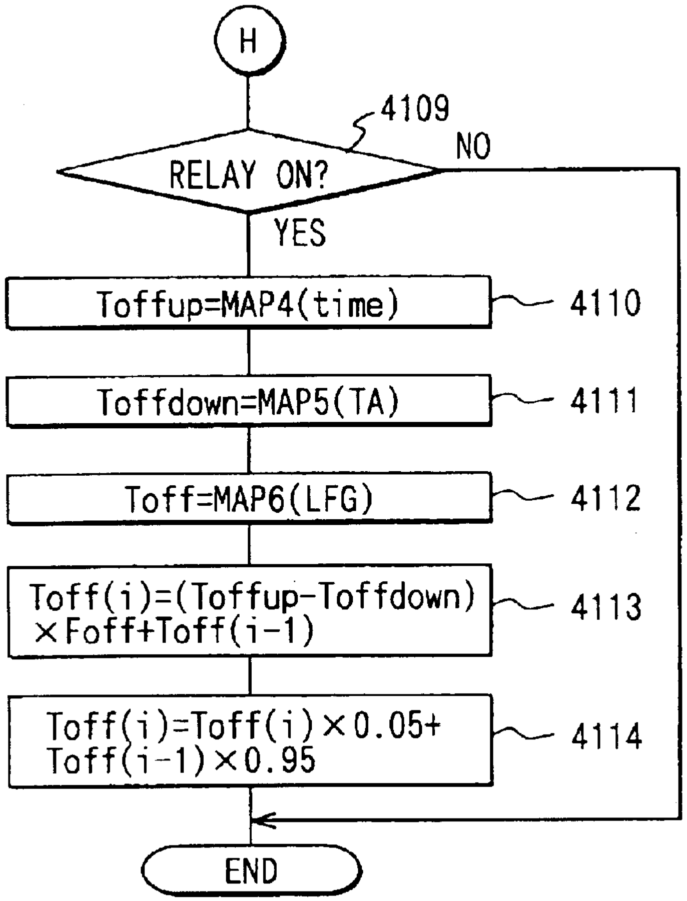
FIG. 40 shows another flowchart representing the leak-check processing implemented by the thirteenth embodiment of the present invention.

The fuel-temperature-estimating routines shown in FIGS. 39 and 40 are each executed at predetermined intervals of typically 10 second to play roles of a fuel-temperature-estimating apparatus. At invocation of one of the routines, the flowchart shown in FIG. 39 begins with a step 4101 to determine whether the ignition switch 35 has been turned on, that is, whether the engine has been put in a running state. If the ignition switch 35 has been turned on, that is, if the engine has been put in a running state, pieces of processing are carried out at steps 4102 to 4108 to estimate a fuel temperature Ton(i) of the fuel tank 18 in a running state of the engine as follows. First of all, at the step 4102, the present time is stored in a memory. In the running state of the engine, this processing is carried out repeatedly at the intervals of 10 sec so that, when the ignition switch 35 is eventually changed over from the ON state to an OFF state, the time the ignition switch 35 is changed over from the ON state to an OFF state, that is, the time the engine is put in a stopped state, is stored in a memory.

Then, at the next step 4103, a fuel-temperature increase Tonup per processing period of 10 second in a running state of the engine is found from map 1. The fuel-temperature increase Tonup is found for the present engine revolution speed NE and an intake-pipe pressure PM. Map 1 uses the present engine revolution speed NE and the intake-pipe pressure PM as parameters. The processing of the step 4104 is carried out to execute a function of a temperature-increase-estimating means.

Subsequently, at the next step 4104, a fuel-temperature decrease Tondown per processing period of 10 second in a running state of the engine is found from map 2. The fuel-temperature decrease Tondown is found for a vehicle speed SPD and an intake-air temperature TA. Map 2 uses the vehicle speed SPD and the intake-air temperature TA as parameters. The processing of the step 4104 is carried out to execute a function of a temperature-decrease-estimating means.

Then, at the next step 4105, a correction coefficient Fon is found from map 3. The correction coefficient Fon is found for a residual-fuel amount LFG and a previously estimated value Ton(i−1) of the fuel temperature. Map 3 uses the residual-fuel amount LFG and the previously estimated value Ton(i−1) of the fuel temperature as parameters. Subsequently, at the next step 4106, a present fuel-temperature estimated value Ton(i) in a running state of the engine is found by using the following equation from the fuel-temperature increase Tonup, the fuel-temperature decrease Tondown, the correction coefficient Fon and the fuel-temperature previously estimated value Ton(i−1).

$$Ton(i)=(Tonup-Tondown)\times Fon+Ton(i-1)$$

An initial value Ton(0) of the fuel-temperature previously estimated value Ton(i−1) is set by execution of an engine-start fuel-temperature initial-value setting routine represented by the flowchart shown in FIG. 41 to be described later.

After a fuel-temperature estimated value Ton(i) is found, the flow of the routine goes on to a step 4107 at which the fuel-temperature estimated value Ton(i) is subjected to a filtering process to result in a final fuel-temperature estimated value Ton(i) as follows:

$$Ton(i)=Ton(i)\times 0.05+Ton(i-1)\times 0.95$$

The pieces of processing of the steps 4105 and 4107 are carried out to execute functions of a fuel-temperature-estimating means and a correction means.

Then, at the next step 4108, the fuel-temperature estimated value Ton(i) is stored in a memory as an initial value Toff(0) of a fuel-temperature estimated value Toff in a stopped state of the engine to be described later.

By carrying out the pieces of processing at the steps 4102 to 4108 repeatedly at the predetermined intervals of 10 sec as described above as described above, the fuel-temperature estimated value Ton(i) is updated at the predetermined intervals of 10 sec. Each time, the fuel-temperature estimated value Ton(i) is updated, the stored value of the initial value Toff(0) of the fuel-temperature estimated value Toff in a stopped state of the engine is replaced by the most recently updated fuel-temperature estimated value Ton(i). In this way, a fuel-temperature estimated value Toff in a stopped state of the engine is estimated by using a fuel-temperature estimated value Ton(i) estimated last right before the stopped state of the engine as an initial value Toff(0).

Later on, when the ignition switch 35 is turned off to put the engine in a stopped state, the result of determination obtained at the step 4101 becomes a NO, causing the flow of the routine to go on to a step 4109 of the flowchart shown in FIG. 40 to determine whether the main relay 36 is in an ON state, that is, whether it is prior to the end of the processing to check a leak in the fuel-vapor-processing system. If the main relay 36 is in an ON state, pieces of processing of steps 4110 to 4114 are carried out in order to estimate a fuel temperature Toff (i) of the fuel tank 18 in a stopped state of the engine as follows.

First of all, at the step 4110, a fuel-temperature increase Toffup per processing period of 10 sec in a stopped state of the engine is found from map 4. Map 4 is a map used for finding an increase in fuel temperature for a parameter, which is a lapse of time since the engine is put in a stopped state. The lapse of time is measured by the soak timer 74. The processing of the step 4110 is carried out to play the role of a temperature-increase-estimating means described in a claim of this specification.

Then, at the next step 4111, a fuel-temperature decrease Toffdown per processing period of 10 sec in a stopped state of the engine is found from map 5. Map 5 is a map used for finding a decrease in fuel temperature for a parameter, which is the intake-air temperature. The processing of the step 4111 is carried out to play the role of a temperature-decrease-estimating means.

Subsequently, at the next step 4112, a correction coefficient Foff is found from map 6. The correction coefficient Foff is found for the present residual-fuel amount LFG. Map 6 uses the residual-fuel amount LFG as a parameter. Then, at the next step 4113, a fuel-temperature estimated value Toff(i) in a stopped state of the engine is found by using the following equation from the fuel-temperature increase Toffup, the fuel-temperature decrease Toffdown, the correction coefficient Foff and the fuel-temperature estimated value Toff(i) for the stopped state.

$$Toff(i)=(Toffup-Toffdown)\times Foff+Toff(i-1)$$

An, initial value Toff(0) of the fuel-temperature previously estimated value Toff(i−1) is the fuel-temperature estimated value Ton(i), which was obtained last immediately before the engine was put in the stopped state. The fuel-temperature estimated value Ton(i) was stored in a memory at the step 4108 of the flowchart shown in FIG. 39.

After a fuel-temperature estimated value Toff(i) is found, the flow of the routine goes on to a step 4114 at which the fuel-temperature estimated value Toff(i) is subjected to a filtering process to result in a final fuel-temperature estimated value Toff(i) as follows:

$$Toff(i)=Toff(i)\times 0.05+Toff(i-1)\times 0.95$$

The pieces of processing of the steps 4112 to 4114 are carried out to execute functions of a fuel-temperature-estimating means and a correction means.

Figure 41:
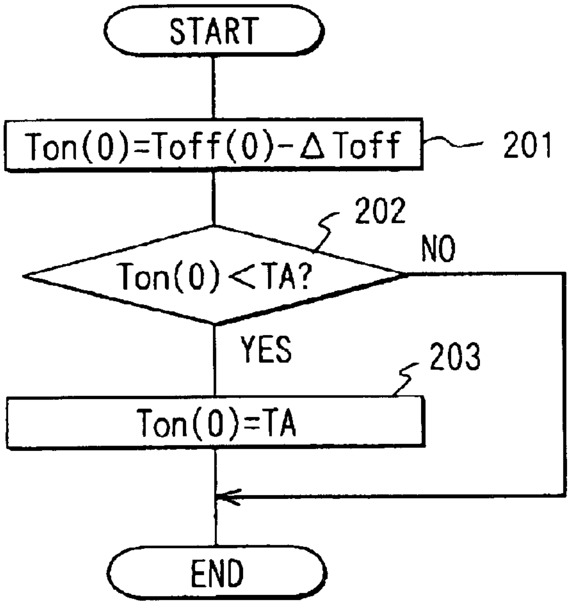
FIG. 41 shows a further flowchart representing leak-check processing implemented by the thirteenth embodiment of the present invention.

On the other hand, the routine for setting an initial value of the fuel temperature at a start of the engine according to a procedure represented by the flowchart shown in FIG. 41 is invoked when the ignition switch 35 is turned on, that is, when power is supplied to the ECU 28. When this routine is activated, the flowchart begins with a step 4201 at which an initial value Ton(0) of the fuel temperature at a start of the engine is computed according to the following equation:

$$Ton(0)=Toff(0)-\Delta Toff$$

where notation Toff(0) is a fuel-temperature estimated value Ton(i), which was estimated last immediately before the engine was put in the previous stopped state and was stored in a memory at the step 4108 of the flowchart shown in FIG. 39, whereas notation ΔToff denotes a fuel-temperature drop cause by heat dissipated since the previous stopped state of the engine till the present start of the engine. The fuel-temperature drop ΔToff is set by using a map or the like from a lapse of time since the previous stopped state of the engine to the present start of the engine and an intake-air temperature representing the ambient temperature. In the case of an intake-air temperature (ambient temperature) of 25 degrees Celsius, for example, a fuel-temperature drop ΔToff at a rate of 1 degree Celsius per hour is set.

It is to be noted that, in this embodiment, a fuel temperature Toff is estimated even in a stopped state of the engine till the processing to check a leak in the fuel-vapor-processing system is ended. Thus, an initial value Ton(0) of the fuel temperature at a start of the engine may be found by using the following equation from a fuel-temperature estimated value Toff(i) estimated last immediately before the stopped state of the engine.

$$Ton(0)=Toff(i)-\Delta Toff'$$

where notation ΔToff' denotes a fuel-temperature drop caused by heat radiated since the end of fuel-temperature estimation (that is, the end of the leak-check processing) till the present start of the engine. The fuel-temperature drop ΔToff' can be set by using a map or the like from a lapse of time since the end of fuel-temperature estimation (that is, the end of the leak-check processing) to the present start of the engine and an intake-air temperature representing the ambient temperature.

After an initial value Ton(0) of the fuel temperature at a start of the engine is found, the flow of the routine goes on to a step 4202 at which the initial value Ton(0) is compared with the intake-air temperature TS representing the ambient temperature. If the initial value Ton(0) of the fuel temperature is found lower than the intake-air temperature TS representing the ambient temperature, the flow of the routine goes on to a step 4203 at which the initial value Ton(0) of the fuel temperature is at a value equal to the intake-air temperature TS representing the ambient temperature. If the fuel-temperature initial value Ton(0) computed at the step 401 is found at least equal to the intake-air temperature TS representing the ambient temperature, on the other hand, the computed initial value Ton(0) of the fuel temperature is used as it is as an initial value Ton(0) of the fuel temperature at a start of the engine.

Figure 42:
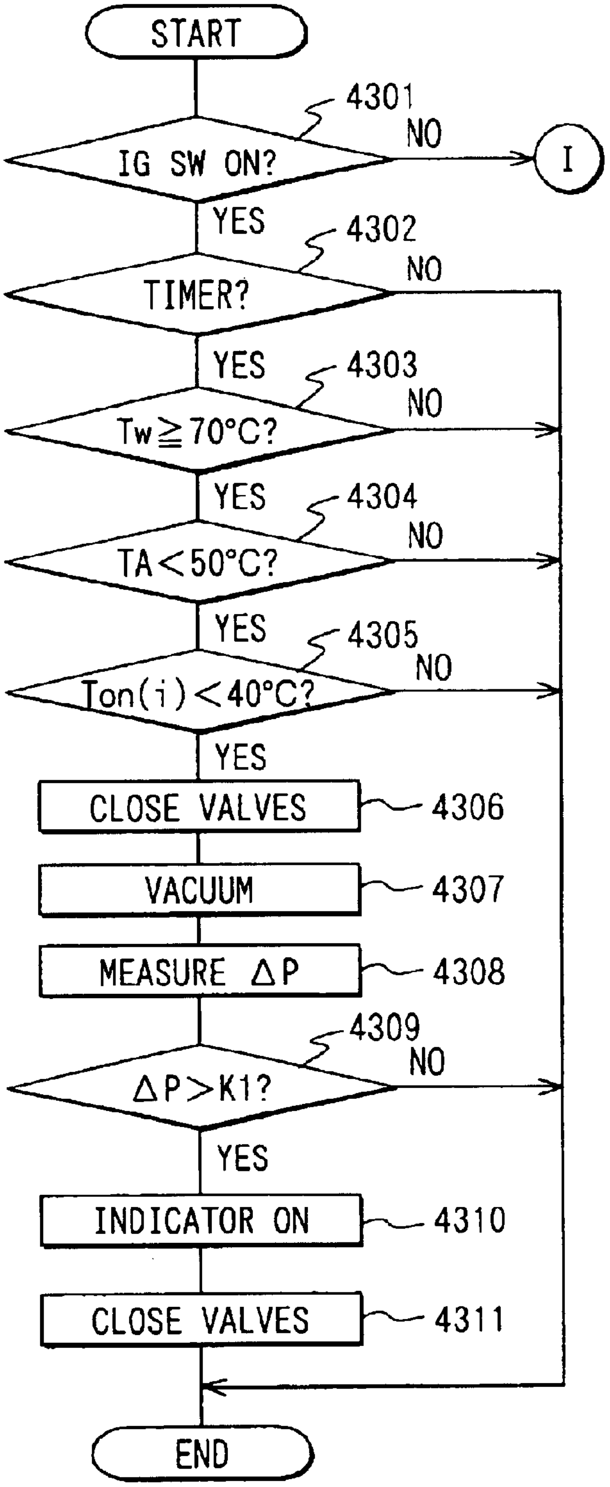
FIG. 42 shows a still further flowchart representing the leak-check processing implemented by the thirteenth embodiment of the present invention.
Figure 43:
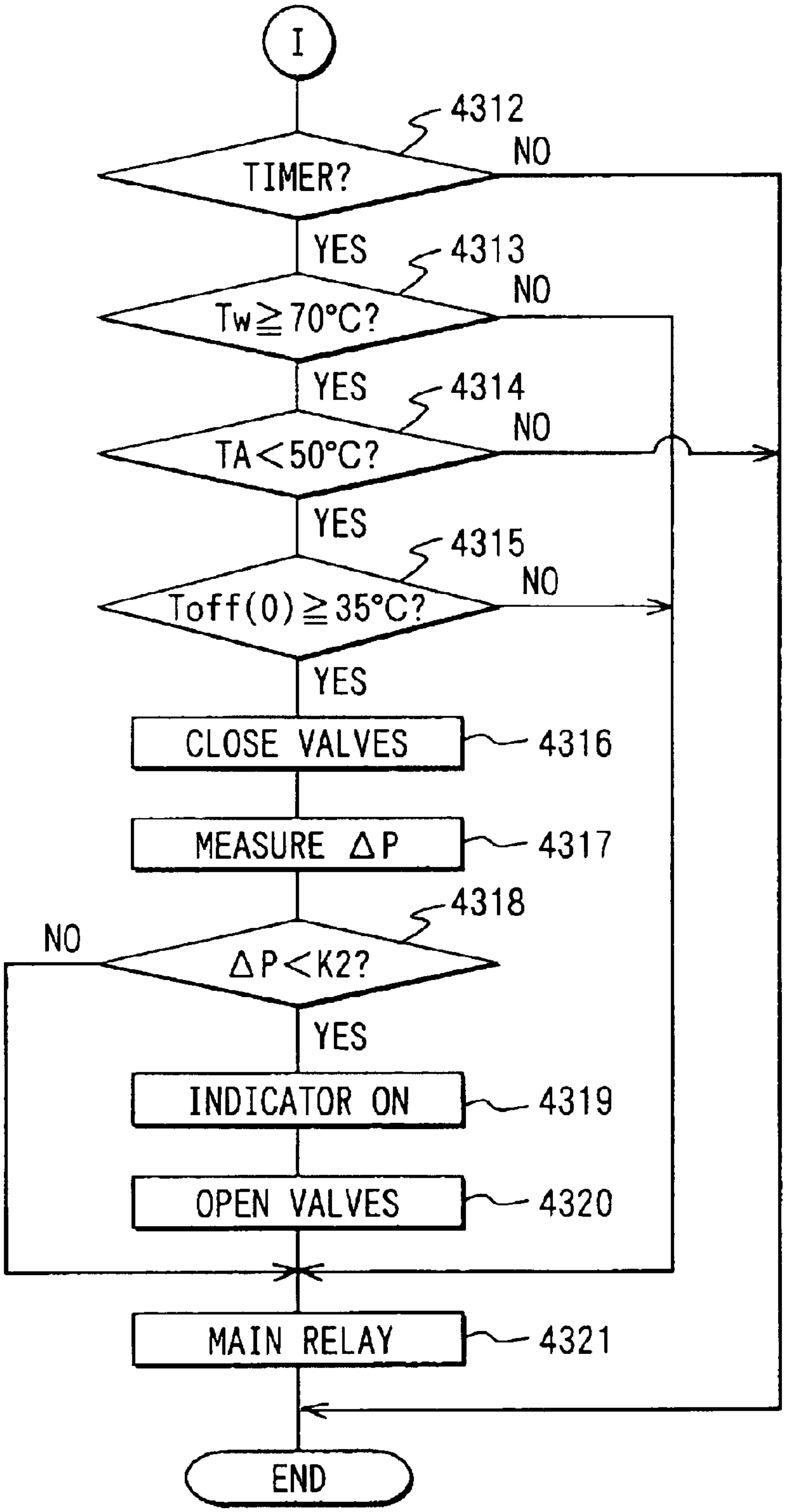
FIG. 43 shows a continuation flowchart representing the leak-check processing implemented by the thirteenth embodiment of the present invention.

The following description explains processing carried out by execution of routines to check a leak in the fuel-vapor-processing system according to procedures represented by the flowcharts shown in FIGS. 42 and 43. The routine of the processing to check a leak in the fuel-vapor-processing system according to a procedure represented by the flowchart shown in FIG. 42 is executed in a running state of the engine when predetermined conditions for execution of the leak-check processing are satisfied. On the other hand, the routine of the processing to check a leak in the fuel-vapor-processing system according to a procedure represented by the flowchart shown in FIG. 43 is executed in a stopped state of the engine when predetermined conditions for execution of the leak-check processing are satisfied. As long as power is being supplied to the ECU 28, the routines are each activated at predetermined intervals of typically 50 msec to play the role of a leak-check means.

When the engine-running-state leak-check routine is invoked, the flowchart shown in FIG. 42 begins with a step 4301 to determine whether the ignition switch 35 has been turned on, that is, whether the engine has been put in a running state. If the ignition switch 35 has been turned on, that is, if the engine has been put in a running state, pieces of processing are carried out at steps 4302 to 4305 to determine whether predetermined conditions for execution of the leak-check processing in a running state of the engine are satisfied. The predetermined conditions for execution of the leak-check processing in a running state of the engine are conditions (1) to (4) described as follows.

(1) A predetermined time of typically 100 sec shall have lapsed since the start of the engine. This condition is verified at the step 4302.

(2) The temperature of the cooling water at the present point of time shall be at least a predetermined temperature of typically 70 degrees Celsius. This condition is verified at the step 4303.

(3) The intake-air temperature representing the ambient temperature at the present point of time shall be lower than a predetermined temperature of typically 50 degrees Celsius. This condition is verified at the step 4304.

(4) The estimated value Ton(i) of the fuel temperature at the present point of time shall be lower than a predetermined temperature of typically 40 degrees Celsius. This condition is verified at the step 4305.

Conditions (1) and (2) are conditions for execution of the leak-check processing in a stable running state of the engine. If the ambient temperature and/or the temperature of fuel in the fuel tank 18 are too high, the amount of evaporation gas generated in the fuel tank 18 is excessively large so that there is a small difference between a change in fuel-tank-internal-pressure in a state with a small leak and a change in fuel-tank-internal-pressure in a normal state. As a result, it is difficult to distinguish the 2 states from each other. For this reason, conditions (3) and (4) are provided as conditions for assuring a sufficient difference between a change in fuel-tank-internal-pressure in a state with a small leak and a change in fuel-tank-internal-pressure in a normal state.

If even only one of conditions (1) to (4) is not met, the conditions for execution of the leak-check processing in a stable running state of the engine are considered to be unsatisfied. In this case, the execution of this routine is ended without carrying out the leak-check processing.

If conditions (1) to (4) are all met, on the other hand, the conditions for execution of the leak-check processing in a stable running state of the engine are considered to be satisfied. In this case, the leak-check processing is carried out at a step 4306 and the subsequent steps as follows. First of all, at the step 4306, the canister valve 24 is closed to hermetically seal the fuel-vapor-processing system. At that time, the purge valve 26 is sustained in a closed state. Then, the flow of the routine goes on to the next step 4307 at which the purge valve 26 is opened to introduce a negative pressure from the intake system of the engine into the fuel-vapor-processing system. At a point of time the internal pressure of the fuel tank drops to a predetermined level, the purge valve 26 is closed to end the introduction of the negative pressure and to restore the fuel-vapor-processing system to the hermetically closed state.

Later on, the flow of the routine goes on to the next step 4308 to measure a fuel-tank-internal-pressure change ΔP resulted in over a predetermined lapse of time of typically 15 seconds since the introduction of the negative pressure. The fuel-tank-internal-pressure change ΔP is a change in value detected by the tank-internal-pressure sensor 27. Then, at the next step 4309, the fuel-tank-internal-pressure change ΔP is compared with a leak criterion value K1 set in advance. If the fuel-tank-internal-pressure change ΔP is found equal to or smaller than the leak criterion value K1, no leak is determined to exist in the fuel-vapor-processing system or the state of the fuel-vapor-processing system is determined to be normal. Then, the execution of this routine is ended.

If the fuel-tank-internal-pressure change ΔP is found greater than the leak criterion value K1, on the other hand, a leak is determined to exist in the fuel-vapor-processing system or the state of the fuel-vapor-processing system is determined to be abnormal. In this case, the flow of the routine goes on to the next step 4310 at which the indicator 29 is turned on to give a warning to the driver and an abnormality code is stored in a backup RAM of the ECU 28. The backup RAM itself is shown in none of the figures. Then, at the next step 4311, the hermetically sealed state of the fuel-vapor-processing system is sustained before the execution of the routine is terminated.

If the ignition switch 35 is in an OFF state, indicating that the engine has been put in a stopped state, on the other hand, the result of determination obtained at the step 4301 is a NO, causing the flow of the routine to go on to a step 4312 of a flowchart shown in FIG. 43. At this step and subsequent ones including a step 4315, conditions for execution of the leak-check processing in a stopped state of the engine are examined to determine whether the conditions are satisfied. The conditions for execution of the leak-check processing in a stopped state are considered to be satisfied if all the following 4 conditions hold true:

(1) A predetermined time of typically 1,000 sec shall have lapsed since the start of the stopped state of the engine. This condition is verified at the step 4312.

(2) The temperature of the cooling water at the present point of time shall be at least a predetermined temperature of typically 70 degrees Celsius. This condition is verified at the step 4313.

(3) The intake-air temperature representing the ambient temperature at the present point of time shall be lower than a predetermined temperature of typically 50 degrees Celsius. This condition is verified at the step 4314.

(4) The estimated value Toff(0) of the fuel temperature at the present point of time shall be at least equal to a predetermined temperature of typically 35 degrees Celsius. This condition is verified at the step 4315. Obtained last right before the engine is put in the stopped state, the estimated value Toff(0) is an estimated value stored at the step 4108.

Right after the engine is put in a stopped state, the temperature of the exhaust system is high. Thus, for the time being, heat dissipated by the exhaust system keeps increasing the temperature of fuel in the fuel tank 18. Accordingly, condition (1) can be regarded as a condition for starting the leak-check processing not before the temperature of fuel in the fuel tank 18 begins to fall. On the other hand, condition (2) can be regarded as a condition for starting the leak-check processing only after the temperature of fuel in the fuel tank 18 has increased sufficiently due to exhaust-gas heat.

In addition, if the ambient temperature is too high or the temperature of fuel in the fuel tank 18 is too low, resulting in a small difference between the ambient temperature and the temperature of fuel in the fuel tank 18, the fuel-temperature decrease caused by heat radiated in the stopped state of the engine becomes smaller so that it is difficult to assure a fuel-temperature decrease large enough for carrying out the leak-check processing. In order to avoid such too a small decrease in fuel temperature, conditions (3) and (4) are established. These conditions are conditions for assuring a fuel-temperature decrease large enough for carrying out the leak-check processing.

Even if only one of conditions (1) to (4) does not hold true, the conditions for starting the leak-check processing are considered to be unsatisfied. Specifically, if condition (2) or (4) is not satisfied, that is, if the result of determination obtained at the step 4313 or 4315 is a NO, the flow of the routine goes on to a step 4321 at which the main relay 36 is turned off to discontinue the supplying of power to the ECU 28 prior to the end of the execution of this routine. This is because, once the result of determination obtained at the step 4313 or 4315 turns out to be a NO, it is out of the bounds of possibility that the result of determination obtained at the step 4313 or 4315 becomes a YES no matter how much time lapses since the start of the present stopped state of the engine. If condition (1) or (3) is not satisfied, that is, if the result of determination obtained at the step 4312 or 4314 is a NO, the execution of this routine is ended without turning off the main relay 36 at the step 4321. This is because, even if the result of determination obtained at the step 4312 or 4314 turns out to be a NO this time, it is quite within the bounds of possibility that the result of determination obtained at the step 4312 or 4314 becomes a YES after the lapse of some time since the start of the present stopped state of the engine.

If all conditions (1) to (4) are met, on the other hand, the conditions for execution of the leak-check processing are deemed satisfied. In this case, processing is carried out at a step 4316 and subsequent steps as follows. First of all, at the step 4316, the canister valve 24 is closed to hermetically seal the fuel-vapor-processing system. At that time, the purge valve 26 is sustained in a closed state. Then, the flow of the routine goes on to the next step 4317 to calculate a fuel-tank-internal-pressure change ΔP over a period beginning from the start of the stopped period of the hermetical sealing of the fuel-vapor-processing system and ending at a time the estimated value Toff of the fuel temperature drops to a value not exceeding a predetermined temperature of typically 10 degrees Celsius. The fuel-tank-internal-pressure change ΔP is a change in signal detected by the tank-internal-pressure sensor 27.

Figure 44:
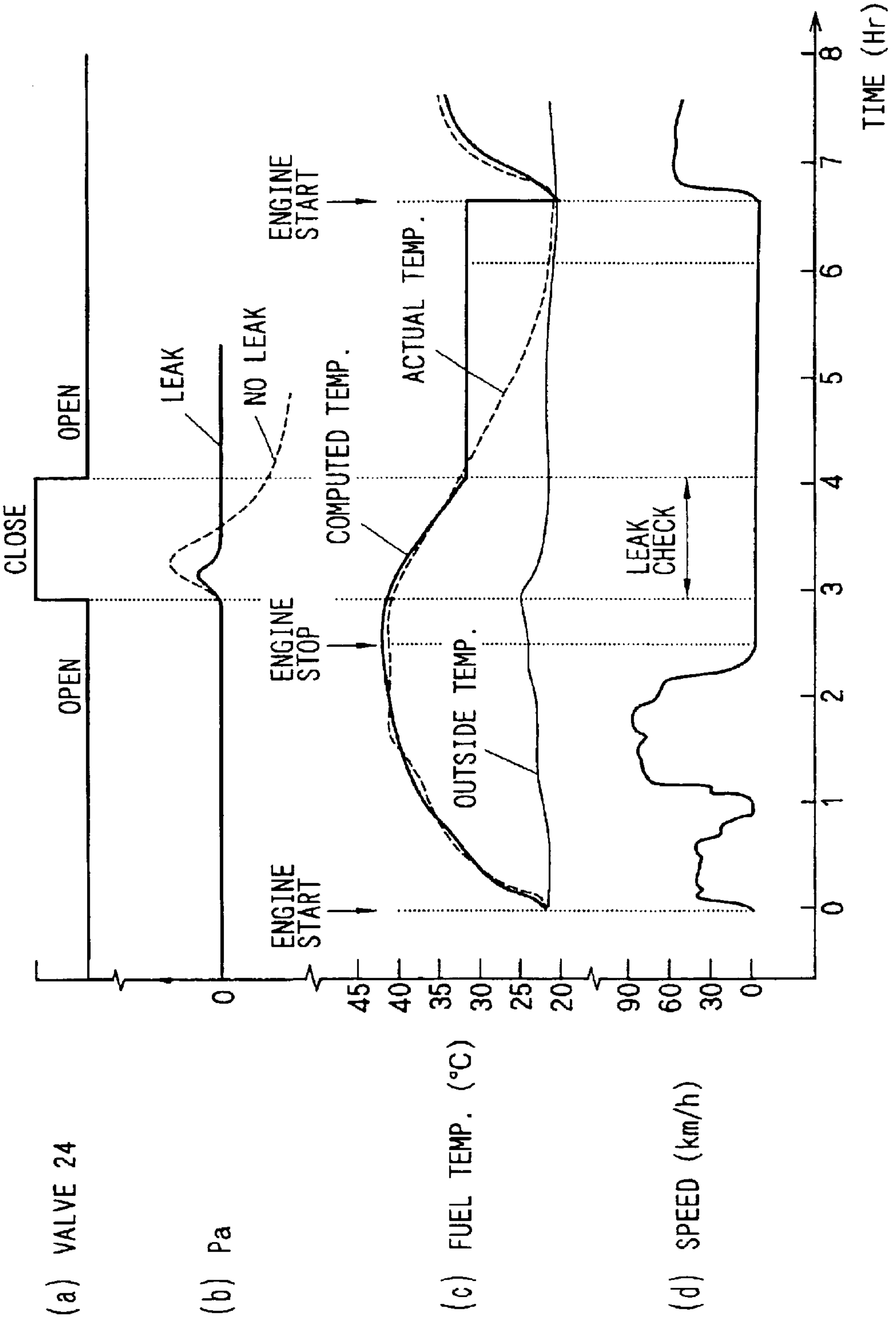
FIG. 44 shows time charts of leak-check operations according to the thirteenth embodiment of the present invention.

Then, at the next step 4318, the fuel-tank-internal-pressure change ΔP is compared with a leak criterion value K2 determined in advance in order to check a leak in the fuel-vapor-processing system. As shown in FIG. 44, if a leak exists in the fuel-vapor-processing system, the fuel-tank-internal-pressure change ΔP during the leak-check period is extremely small. If no leak exists in the fuel-vapor-processing system, on the other hand, the fuel-tank-internal-pressure change ΔP during the leak-check period increases to a certain degree. As is obvious from such a characteristic, if the fuel-tank-internal-pressure change ΔP is found at least equal to the leak criterion value K2, no leak is determined to exist in the fuel-vapor-processing system or the fuel-vapor-processing system is determined to be in a normal state. In this case, the flow of the routine goes on to a step 4321 at which the main relay 36 is tuned off to discontinue the supplying of power to the ECU 28. Finally, the execution of this routine is ended.

If the fuel-tank-internal-pressure change ΔP is found smaller than the leak criterion value K2, on the other hand, a leak is determined to exist in the fuel-vapor-processing system or the fuel-vapor-processing system is determined to be in an abnormal state. In this case, the flow of the routine goes on to a step 4319 at which the indicator 29 is turned on to give a warning to the driver and an abnormality code is stored in a backup RAM of the ECU 28. The backup RAM itself is shown in none of the figures. Then, at the next step 4320, the canister valve 24 is opened to terminate the hermetically sealed state of the fuel-vapor-processing system. Subsequently, the flow of the routine goes on to the step 4321 at which the main relay 36 is tuned off to discontinue the supplying of power to the ECU 28. Finally, the execution of this routine is ended.

In the embodiment described above, a temperature of the fuel can be found in both a running state and a stopped state of the engine without the need to install a fuel-temperature sensor. Thus, the demand for a lower cost can be met. In addition, processing to check a leak in the fuel-vapor-processing system can be carried out by finding a temperature of the fuel without the need to install a fuel-temperature sensor. It is thus possible to raise the degree of precision with which the leak-check processing is carried out.

Furthermore, in this embodiment, processing to check a leak in the fuel-vapor-processing system can be carried out by finding a temperature of the fuel in a stopped state of the engine in addition to processing to check a leak in the fuel-vapor-processing system in a running state of the engine. Thus, the frequency at which the processing to check a leak in the fuel-vapor-processing system is carried out can be increased. As a result, it is possible to meet a demand for detection of a leak at an early time. Nevertheless, the present invention allows processing to check a leak in the fuel-vapor-processing system to be carried only in a running or stopped state of the engine.

Moreover, in this embodiment, processing to check a leak in the fuel-vapor-processing system is carried out on the basis of a fuel-tank-internal-pressure change ΔP over a period beginning from the start of the stopped period of the hermetical sealing of the fuel-vapor-processing system and ending at a time the estimated value Toff of the fuel temperature drops to a value not exceeding a predetermined temperature. However, processing to check a leak in the fuel-vapor-processing system can also be carried out on the basis of the rate of a decrease in fuel-temperature estimated value Toff (or the decreasing gradient of the fuel-temperature estimated value Toff) and the rate of a change in fuel-tank-internal-pressure (or the variation gradient of the fuel-tank-internal-pressure) over a predetermined period beginning from the start of the hermetically closed state of the fuel-vapor-processing system. In a word, processing to check a leak in the fuel-vapor-processing system can also be carried out on the basis of a relation between a change in fuel-temperature value Toff estimated in a stopped state of the engine and a change in fuel-tank-internal-pressure. In addition, it is also possible to properly change the method adopted in the leak-check processing in a running state of the engine.

Fourteenth Embodiment

In the embodiment described above, the fuel temperature's value estimated in a running or stopped state of the engine is used in the processing to check a leak in the fuel-vapor-processing system. However, the estimated value of the fuel temperature is used not only in the processing to check a leak in the fuel-vapor-processing system. For example, the estimated value of the fuel temperature can also be used in engine control such as air-fuel-ratio control (that is, control of the fuel injection volume).

In addition, the present invention can also be applied to a system provided with a fuel sensor for detecting a temperature of fuel in the fuel tank 18. By referring to FIGS. 45 and 46, the following description explains an embodiment implementing the application of the present invention to such a system. In this embodiment, the estimated value of the fuel temperature is used for diagnosing a fuel-temperature sensor.

Figure 45:
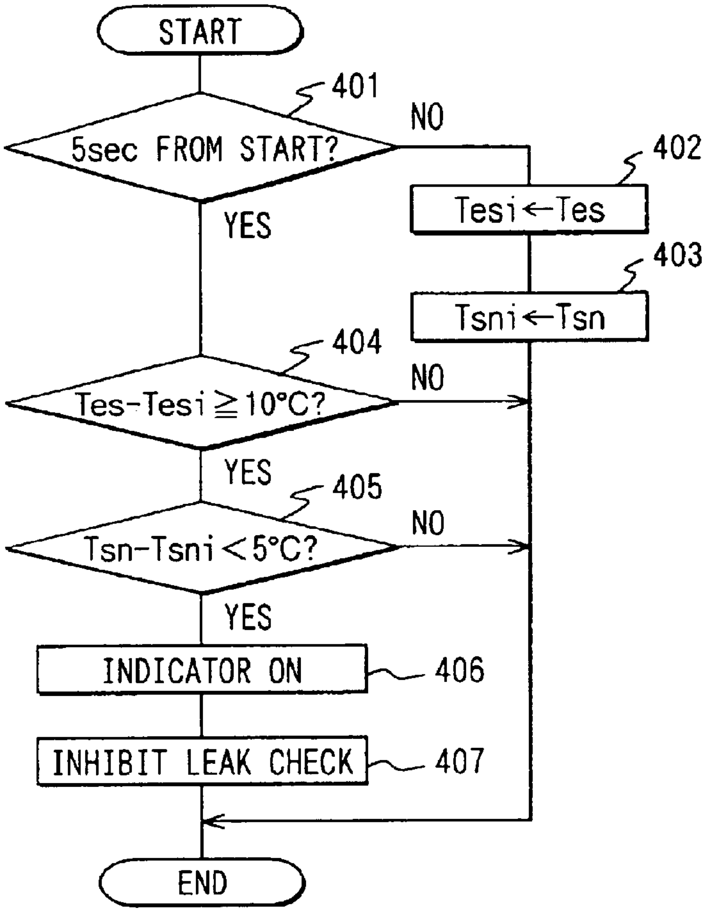
FIG. 45 shows a continuation flowchart representing the leak-check processing implemented by a fourteenth embodiment of the present invention.
Figure 46:
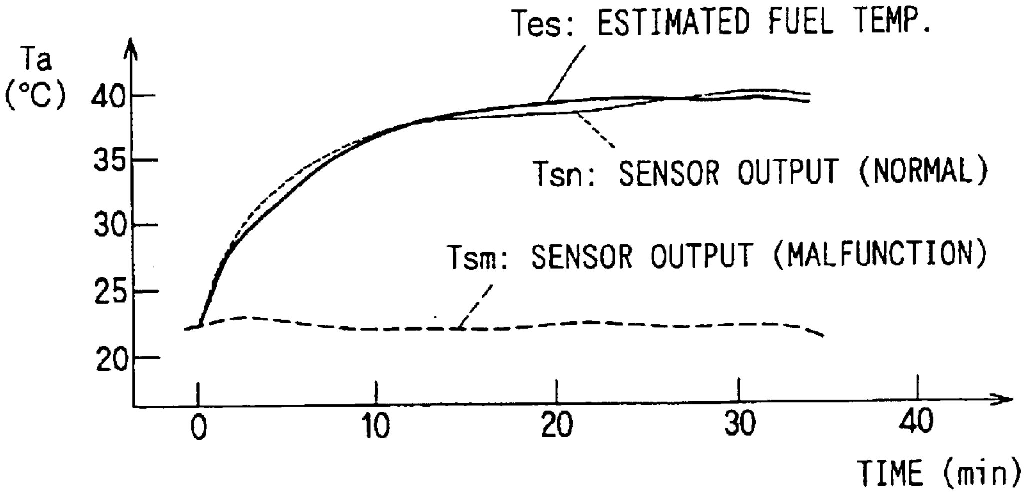
FIG. 46 shows time charts of leak-check operations according to the fourteenth embodiment of the present invention.

As shown in FIG. 46, if the fuel-temperature sensor is normal, the difference between the fuel-temperature estimated value Tes and the fuel-temperature detected value Tsn is small. If the fuel-temperature sensor is abnormal, however, the difference between the fuel-temperature estimated value Tes and the fuel-temperature detected value Tsm is big. In this embodiment, the fuel-temperature sensor is diagnosed on the basis of the difference between the fuel-temperature estimated value Tes and the fuel-temperature detected value Tsn according to a fuel-temperature-diagnosing routine represented by a flowchart shown in FIG. 45.

The fuel-temperature-diagnosing routine represented by a flowchart shown in FIG. 45 is invoked at intervals of typically 50 msec after the ignition switch 35 is turned on to play the role of a sensor-abnormality-diagnosing means. It is to be noted that this embodiment adopts the same method to estimate a value of the fuel temperature as the embodiment described above.

When this routine is activated, the flowchart begins with a step 4401 to determine whether a predetermined time of typically 5 sec has lapsed since the start of the engine. If the predetermined time has not lapsed yet, the flow of the routine goes on to a step 4402 at which an initial value Tesi of the fuel-temperature estimated value is set at the fuel-temperature estimated value Tes obtained at the present point of time. Then, at the next step 4403, an initial value Tsni of the fuel-temperature detected value is set at the fuel-temperature estimated value Tsn obtained at the present point of time.

Later on, as the predetermined time of typically 5 sec has lapsed since the start of the engine, the flow of the routine goes on from the step 4401 to a step 4404 to determine whether an increase in fuel-temperature estimated value (Tes−Tesi) becomes at least equal to a predetermined value of typically 10 degrees Celsius. If the increase in fuel-temperature estimated value (Tes−Tesi) is smaller than 10 degrees Celsius, the execution of the routine is ended without carrying out processing at subsequent steps.

If increase in fuel-temperature estimated value (Tes−Tesi) becomes at least equal to 10 degrees Celsius later on, the flow of the processing goes on to a step 4405 to determine whether an increase in fuel-temperature detected value (Tsn−Tsni) is smaller than a predetermined value of typically 5 degrees Celsius. An increase in fuel-temperature detected value (Tsn−Tsni) at least equal to 5 degrees Celsius means that a difference between the increase in fuel-temperature estimated value (Tes−Tesi) and the increase in fuel-temperature detected value (Tsn−Tsni) is within an error range for a normal state of the fuel-temperature sensor. In this case, the fuel-temperature sensor is determined to be normal and the execution of this routine is ended.

On the other hand, an increase in fuel-temperature detected value (Tsn−Tsni) smaller than 5 degrees Celsius means that a difference between the increase in fuel-temperature estimated value (Tes−Tesi) and the increase in fuel-temperature detected value (Tsn−Tsni) is outside the error range for a normal state of the fuel-temperature sensor. In this case, the fuel-temperature sensor is determined to be abnormal and the flow of this routine goes on to a step 4406 at which the indicator 29 is turned on to give a warning to the driver and an abnormality code is stored in the RAM of the ECU 28. The RAM itself is shown in none of the figures. Then, at the next step 4407, the execution of the leak-check processing is inhibited and, finally, the execution of this routine is ended.

It is to be noted that, in this embodiment, the processing to check a leak in the fuel-vapor-processing system can be carried out in the same way as the embodiment described above by using a value output by the fuel-temperature sensor in place of the estimated value of the fuel temperature.

As described above, in this embodiment, the fuel-temperature sensor is diagnosed for an abnormality by using the estimated value of the fuel temperature. Thus, the reliability of a system employing the fuel-temperature sensor is improved.

In this embodiment, existence or non-existence of an abnormality of the fuel-temperature sensor is determined according to a relation between an increase in fuel-temperature estimated value and an increase in fuel-temperature detected value in a stopped state of the engine. It is to be noted, however, that existence or non-existence of an abnormality of the fuel-temperature sensor can also be determined according to a relation between a change in fuel-temperature estimated value and a change in fuel-temperature detected value in a stopped state of the engine. As another alternative, existence or non-existence of an abnormality of the fuel-temperature sensor can also be determined by finding a difference between an estimated value of the fuel temperature and a fuel-temperature value, which is detected by the fuel-temperature sensor, from time to time in a running or stopped state of the engine and then determining whether the difference is in an error range for the normal condition of the sensor.

The processing carried out by the thirteenth or fourteenth embodiment can be combined with those of the preceding embodiments. For example, the estimated value of the fuel temperature can be used in place of the fuel-temperature value detected by the fuel-temperature sensor 30.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A leak-check apparatus for an engine's fuel-vapor-processing system wherein:

a canister is provided on a connecting pipe linking a fuel tank to an intake pipe of the engine;

fuel evaporation gas resulting from evaporation of fuel in the fuel tank is absorbed into the canister;

the amount of the fuel evaporation gas purged from the canister to the intake pipe is controlled by opening and closing a purge valve provided on the downstream side of the canister according to a running state of the engine; and a fresh air passage of the canister is opened and closed by a canister valve, the leak-check apparatus comprising:

an engine-running-state leak-check means for checking a leak in the fuel-vapor-processing system in a running state of the engine; and an engine-stopped-state leak-check means for checking a leak in the fuel-vapor-processing system in a stopped state of the engine, wherein the engine-stopped-state leak-check means checks a leak in the fuel-vapor-processing system when the engine-running-state leak-check means determines existence of a leak in the fuel-vapor-processing system.

2. A leak-check apparatus provided for a fuel-vapor-processing system of an engine according to claim 1 wherein:

the engine-running-state leak-check means has a leak-magnitude detection means for determining a detected leak of evaporated fuel in the fuel-vapor-processing system to be a high-degree leak or as a low-degree leak;

if leak-magnitude detection means determines that a detected leak of evaporated fuel in the fuel-vapor-processing system is a high-degree leak, the detected leak is regarded as an abnormality of the fuel-vapor-processing system;

if leak-magnitude detection means determines that a detected leak of evaporated fuel in the fuel-vapor-processing system is a low-degree leak, the detected leak is regarded as a preliminarily leak determination; and the engine-stopped-state leak-check means checks a leak in the fuel-vapor-processing system when the engine-running-state leak-check means determines existence of a preliminarily leak determination in the fuel-vapor-processing system.

3. A leak-check apparatus provided for a fuel-vapor-processing system of an engine according to claim 1, the leak-check apparatus further having:

an engine-running-state-leak-check-execution-condition determination means for determining whether a condition for execution of leak-check processing in a running state of the engine is satisfied;

a pressure detection means for detecting a pressure in the fuel-vapor-processing system;

a negative-pressure introduction means for introducing a negative pressure into the fuel-vapor-processing system by opening the purge valve; and an engine-running-state hermetically sealing means for hermetically sealing the fuel-vapor-processing system after introduction of a negative pressure into the fuel-vapor-processing system by the negative-pressure introduction means by closing the purge valve and the canister valve, wherein, if the engine-running-state-leak-check-execution-condition determination means determines that the condition for execution of leak-check processing in a running state of the engine is satisfied, then the negative-pressure introduction means introduces a negative pressure into the fuel-vapor-processing system by opening the purge valve; then the engine-running-state hermetically sealing means hermetically seals the fuel-vapor-processing system by closing the purge valve and the canister valve; and then the engine-running-state leak-check means checks a leak in the fuel-vapor-processing system on the basis of a pressure, which is detected in the fuel-vapor-processing system while the fuel-vapor-processing system is being hermetically sealed, and an engine-running-state criterion value.

4. A leak-check apparatus provided for a fuel-vapor-processing system of an engine according to claim 3, the leak-check apparatus further having:

an engine-stopped-state-leak-check-execution-condition determination means for determining whether a condition for execution of leak-check processing in a stopped state of the engine is satisfied;

a pressure detection means for detecting a pressure in the fuel-vapor-processing system; and an engine-running-state hermetically sealing means for hermetically sealing the fuel-vapor-processing system by closing the purge valve and the canister valve, wherein engine-stopped-state leak-check means checks a leak in the fuel-vapor-processing system on the basis of a pressure, which is detected in the fuel-vapor-processing system while the fuel-vapor-processing system is being hermetically sealed by the engine-running-state hermetically sealing means, and an engine-running-state criterion value.

5. A leak-check apparatus provided for a fuel-vapor-processing system of an engine according to claim 4, the leak-check apparatus further having a residual-fuel-amount detection means for detecting an amount of residual fuel left in the fuel tank, wherein the engine-running-state criterion value and/or the engine-stopped-state criterion value are corrected on the basis of the amount of residual fuel left in the fuel tank.

6. A leak-check apparatus provided for a fuel-vapor-processing system of an engine according to claim 4, the leak-check apparatus further having:

a return pipe for returning an excessive portion of fuel supplied by a fuel pump back to the fuel tank; and a fuel-temperature detection means for detecting a fuel temperature of the fuel tank, wherein the engine-running-state criterion value and/or the engine-stopped-state criterion value are corrected on the basis of the fuel temperature.

7. A leak-check apparatus provided for a fuel-vapor-processing system of an engine according to claim 1, the leak-check apparatus further having a first leak-check-processing-allowing timer for measuring the lapse of a first predetermined time by carrying out a counting operation, wherein leak-check processing is executed when a result of the count operation carried out by the first leak-check-processing-allowing timer indicates that the first predetermined time has lapsed since detection of a leak of fuel evaporation gas by the engine-stopped-state leak-check means or the engine-running-state leak-check means.

8. A leak-check apparatus provided for a fuel-vapor-processing system of an engine according to claim 4, the leak-check apparatus further having a second leak-check-processing-allowing timer for measuring the lapse of a second predetermined time by carrying out a counting operation since immediately preceding detection of a leak of fuel evaporation gas by the engine-stopped-state leak-check means or the engine-running-state leak-check means, wherein, if the engine-stopped-state leak-check means has not carried out leak-check processing after immediately preceding detection of a leak of fuel evaporation gas by the engine-stopped-state leak-check means or the engine-running-state leak-check means and a result of the count operation carried out by the second leak-check-processing-allowing timer indicates that the second predetermined time has lapsed since the immediately preceding detection of a leak, the leak-check-execution condition to be determined by the engine-stopped-state-leak-check-execution-condition determination means is made more lenient.

9. A leak-check apparatus for an engine's fuel-vapor-processing system wherein:

a canister is provided on a connecting pipe linking a fuel tank to an intake pipe of the engine;

fuel evaporation gas resulting from evaporation of fuel in the fuel tank is absorbed into the canister;

the amount of the fuel evaporation gas purged from the canister to the intake pipe is controlled by opening and closing a purge valve provided on the downstream side of the canister according to a running state of the engine; and a fresh air passage of the canister is opened and closed by a canister valve, the leak-check apparatus comprising:

an engine-running-state leak-check means used for checking a leak in the fuel-vapor-processing system in a running state of the engine and provided with a means for determining a normal state of the fuel-vapor-processing system; and an engine-stopped-state leak-check means used for checking a leak in the fuel-vapor-processing system in a stopped state of the engine and provided with a means for determining a normal state of the fuel-vapor-processing system, wherein, when the engine-stopped-state leak-check means confirms existence of a leak in the fuel-vapor-processing system in a stopped state of the engine, only the engine-running-state leak-check means determines a normal state of the engine.

* * * * *